(12) United States Patent
Ishikawa et al.

(10) Patent No.: US 9,694,598 B2
(45) Date of Patent: Jul. 4, 2017

(54) IMAGE PROCESSING APPARATUS, INK JET PRINTING APPARATUS, AND IMAGE PROCESSING METHOD

(75) Inventors: Tomokazu Ishikawa, Kawasaki (JP); Fumitaka Goto, Tokyo (JP); Mitsuhiro Ono, Tokyo (JP); Akitoshi Yamada, Yokohama (JP); Tohru Ikeda, Yokohama (JP); Nobutaka Miyake, Yokohama (JP); Makoto Torigoe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 12/966,799

(22) Filed: Dec. 13, 2010

(65) Prior Publication Data

US 2011/0285778 A1   Nov. 24, 2011

(30) Foreign Application Priority Data

May 24, 2010 (JP) .................. 2010-118672

(51) Int. Cl.
  *B41J 2/21* (2006.01)
  *H04N 1/401* (2006.01)
  *H04N 1/60* (2006.01)

(52) U.S. Cl.
  CPC .......... *B41J 2/2139* (2013.01); *B41J 2/2142* (2013.01); *B41J 2/2146* (2013.01); *H04N 1/4015* (2013.01); *H04N 1/6033* (2013.01)

(58) Field of Classification Search
  CPC .................................................. B41J 2/2121
  (Continued)

(56) References Cited

U.S. PATENT DOCUMENTS

| 5,748,858 A | * | 5/1998 | Ohtsuka | ................. | H04N 1/603 |
|   |   |   |   |   | 358/1.9 |
| 6,025,929 A | | 2/2000 | Nakajima et al. | | |

(Continued)

FOREIGN PATENT DOCUMENTS

| JP | 10-13674 | 1/1998 |
| JP | 2004-205701 | 7/2004 |

(Continued)

OTHER PUBLICATIONS

U.S. Appl. No. 12/966,781, filed Dec. 13, 2010. Applicants: Fumitaka Goto, et al.

(Continued)

*Primary Examiner* — Manish S Shah
*Assistant Examiner* — Jeffrey C Morgan
(74) *Attorney, Agent, or Firm* — Fitzpatrick, Cella, Harper & Scinto

(57) ABSTRACT

Printing heads of combinations of four ink colors and seven printing characteristic ranks are previously used to print an image for measurement, and table parameters corresponding to all of the combinations of nozzle ink colors and printing characteristic ranks are obtained on the basis of a measurement result of this image for measurement and stored in a memory. Then, when printing is actually performed in a printer, a primary color image for measurement is printed for each nozzle of a printing head for each of four ink colors. A printing characteristic rank for each nozzle is obtained for each of four ink colors based on a measurement result of this image for measurement, and a table parameter is selected that corresponds to the same combination as the combination of the obtained printing characteristic rank of each nozzle of four ink colors, by referring to the memory.

23 Claims, 35 Drawing Sheets

(58) Field of Classification Search
USPC .......................................................... 347/15
See application file for complete search history.

(56) References Cited

U.S. PATENT DOCUMENTS

| | | | |
|---|---|---|---|
| 6,980,326 | B2 | 12/2005 | Tsuchiya et al. |
| 7,016,530 | B2 | 3/2006 | Saito et al. |
| 7,034,844 | B2 | 4/2006 | Akiyama et al. |
| 7,075,679 | B2 | 7/2006 | Goto et al. |
| 7,079,152 | B2 | 7/2006 | Akiyama et al. |
| 7,266,239 | B2 | 9/2007 | Akiyama et al. |
| 7,274,491 | B2 | 9/2007 | Yamada et al. |
| 7,290,845 | B2 * | 11/2007 | Tanaka ............................ 347/15 |
| 7,342,684 | B2 | 3/2008 | Imafuku et al. |
| 7,411,707 | B2 * | 8/2008 | Ikeda ............................ 358/518 |
| 7,420,705 | B2 | 9/2008 | Yamada et al. |
| 7,450,281 | B2 | 11/2008 | Torigoe et al. |
| 7,529,006 | B2 | 5/2009 | Itagaki et al. |
| 7,636,178 | B2 | 12/2009 | Nakatani et al. |
| 7,639,399 | B2 | 12/2009 | Ikeda |
| 7,643,178 | B2 | 1/2010 | Yamada et al. |
| 7,688,489 | B2 | 3/2010 | Nagoshi et al. |
| 7,750,921 | B2 | 7/2010 | Akiyama et al. |
| 7,869,092 | B2 | 1/2011 | Nakatani et al. |
| 7,912,280 | B2 | 3/2011 | Miyagi et al. |
| 2005/0128498 | A1 * | 6/2005 | Matzusaki ............ H04N 1/603 358/1.9 |
| 2008/0144060 | A1 | 6/2008 | Ishikawa |
| 2008/0239353 | A1 | 10/2008 | Hori et al. |
| 2008/0239355 | A1 | 10/2008 | Goto et al. |
| 2008/0239410 | A1 | 10/2008 | Hashii et al. |

FOREIGN PATENT DOCUMENTS

| | | |
|---|---|---|
| JP | 2006088531 A | 4/2006 |
| JP | 2006-157416 | 6/2006 |
| JP | 2008263448 A | 10/2008 |

OTHER PUBLICATIONS

U.S. Appl. No. 12/966,823, filed Dec. 13, 2010. Applicants: Akitoshi Yamada, et al.
U.S. Appl. No. 12/966,757, filed Dec. 13, 2010. Applicants: Makoto Torigoe, et al.
U.S. Appl. No. 12/966,265, filed Dec. 13, 2010. Applicants: Nobutaka Miyake, et al.
U.S. Appl. No. 12/966,769, filed Dec. 13, 2010. Applicants: Tohru Ikeda, et al.
U.S. Appl. No. 12/966,743, filed Dec. 13, 2010. Applicants: Ryosuke Iguchi, et al.
U.S. Appl. No. 12/966,848, filed Dec. 13, 2010. Applicants: Senichi Saito, et al.
U.S. Appl. No. 12/966,837, filed Dec. 13, 2010. Applicants: Mitsuhiro Ono, et al.

* cited by examiner

FIG.19

| FIG.19A |
|---------|
| FIG.19B |
| FIG.19C |

| REPRESENTATIVE MCS PROCESSING PARAMETER | BLACK | CYAN | MAGENTA | YELLOW |
|---|---|---|---|---|
| PARAMETER NUMBER | PRINTING CHARACTERISTIC RANK $R_K[Y]$ | PRINTING CHARACTERISTIC RANK $R_C[Y]$ | PRINTING CHARACTERISTIC RANK $R_M[Y]$ | PRINTING CHARACTERISTIC RANK $R_Y[Y]$ |
| 0 | 0 | 0 | 0 | 0 |
| 1 | 0 | 0 | 0 | 3 |
| 2 | 0 | 0 | 0 | 6 |
| 3 | 0 | 0 | 3 | 0 |
| 4 | 0 | 0 | 3 | 3 |
| 5 | 0 | 0 | 3 | 6 |
| 6 | 0 | 0 | 6 | 0 |
| 7 | 0 | 0 | 6 | 3 |
| 8 | 0 | 0 | 6 | 6 |
| 9 | 0 | 3 | 0 | 0 |
| 10 | 0 | 3 | 0 | 3 |
| 11 | 0 | 3 | 0 | 6 |
| 12 | 0 | 3 | 3 | 0 |
| 13 | 0 | 3 | 3 | 3 |
| 14 | 0 | 3 | 3 | 6 |
| 15 | 0 | 3 | 6 | 0 |
| 16 | 0 | 3 | 6 | 3 |
| 17 | 0 | 3 | 6 | 6 |
| 18 | 0 | 6 | 0 | 0 |
| 19 | 0 | 6 | 0 | 3 |
| 20 | 0 | 6 | 0 | 6 |
| 21 | 0 | 6 | 3 | 0 |
| 22 | 0 | 6 | 3 | 3 |
| 23 | 0 | 6 | 3 | 6 |

FIG.19A

| | | | | |
|---|---|---|---|---|
| 24 | 0 | 6 | 6 | 0 |
| 25 | 0 | 6 | 6 | 3 |
| 26 | 0 | 6 | 6 | 6 |
| 27 | 3 | 0 | 0 | 0 |
| 28 | 3 | 0 | 0 | 3 |
| 29 | 3 | 0 | 0 | 6 |
| 30 | 3 | 0 | 3 | 0 |
| 31 | 3 | 0 | 3 | 3 |
| 32 | 3 | 0 | 3 | 6 |
| 33 | 3 | 0 | 6 | 0 |
| 34 | 3 | 0 | 6 | 3 |
| 35 | 3 | 0 | 6 | 6 |
| 36 | 3 | 3 | 0 | 0 |
| 37 | 3 | 3 | 0 | 3 |
| 38 | 3 | 3 | 0 | 6 |
| 39 | 3 | 3 | 3 | 0 |
| 40 | 3 | 3 | 3 | 3 |
| 41 | 3 | 3 | 3 | 6 |
| 42 | 3 | 3 | 6 | 0 |
| 43 | 3 | 3 | 6 | 3 |
| 44 | 3 | 3 | 6 | 6 |
| 45 | 3 | 6 | 0 | 0 |
| 46 | 3 | 6 | 0 | 3 |
| 47 | 3 | 6 | 0 | 6 |
| 48 | 3 | 6 | 3 | 0 |
| 49 | 3 | 6 | 3 | 3 |
| 50 | 3 | 6 | 3 | 6 |
| 51 | 3 | 6 | 6 | 0 |
| 52 | 3 | 6 | 6 | 3 |

| | | | | |
|---|---|---|---|---|
| 53 | 3 | 6 | 6 | 6 |
| 54 | 6 | 0 | 0 | 0 |
| 55 | 6 | 0 | 0 | 3 |
| 56 | 6 | 0 | 0 | 6 |
| 57 | 6 | 0 | 3 | 0 |
| 58 | 6 | 0 | 3 | 3 |
| 59 | 6 | 0 | 3 | 6 |
| 60 | 6 | 0 | 6 | 0 |
| 61 | 6 | 0 | 6 | 3 |
| 62 | 6 | 0 | 6 | 6 |
| 63 | 6 | 3 | 0 | 0 |
| 64 | 6 | 3 | 0 | 3 |
| 65 | 6 | 3 | 0 | 6 |
| 66 | 6 | 3 | 3 | 0 |
| 67 | 6 | 3 | 3 | 3 |
| 68 | 6 | 3 | 3 | 6 |
| 69 | 6 | 3 | 6 | 0 |
| 70 | 6 | 3 | 6 | 3 |
| 71 | 6 | 3 | 6 | 6 |
| 72 | 6 | 6 | 0 | 0 |
| 73 | 6 | 6 | 0 | 3 |
| 74 | 6 | 6 | 0 | 6 |
| 75 | 6 | 6 | 3 | 0 |
| 76 | 6 | 6 | 3 | 3 |
| 77 | 6 | 6 | 3 | 6 |
| 78 | 6 | 6 | 6 | 0 |
| 79 | 6 | 6 | 6 | 3 |
| 80 | 6 | 6 | 6 | 6 |

IMAGE PROCESSING APPARATUS, INK JET PRINTING APPARATUS, AND IMAGE PROCESSING METHOD

BACKGROUND OF THE INVENTION

Field of the Invention

The present invention relates to an image processing apparatus, a printing apparatus and an image processing method, and more particularly, to image processing for reducing a density unevenness caused by ink ejection volume variations among a plurality of nozzles that eject ink.

Description of the Related Art

A printing head used in an inkjet printing apparatus may have ink ejection volume variations among a plurality of nozzles due to, for example, a manufacturing error. Such ink ejection volume variations are likely to cause a density unevenness in a printed image.

It has been well known to employ head shading technique as described in Japanese Patent Laid-Open No. H10-013674 (1998) in order to reduce such a density unevenness. The head shading corrects image data, based on information about an ink ejection volume of each nozzle. This correction increases or decreases the number of ink dots eventually printed, thereby adjusting a density of the printed image.

However, even by using the head shading, when a certain color is represented by overlapping two or more inks, there may occur a color shift, that is, a color printed with nozzles having ink ejection volume variations is different from the color that should be printed. For example, when a blue image is printed by the dots of cyan ink and the dots of magenta ink, the dots of magenta ink are formed in bigger size than a standard size in a region where a magenta ink ejection volume is more than a standard volume due to the variations. Along with this, the number of the dots is less than a standard number by correction of head shading. As a result, cyan dots, as well as dots each being composed of a blue area and a magenta area surrounding the blue area exit in this region. A color of this region is different from the color that should be printed, that is, the color of the region where blue dots are printed by cyan and magenta ink without ink ejection volume variations.

SUMMARY OF THE INVENTION

The object of the present invention is to provide an image processing apparatus, a printing apparatus, and an image processing method that can reduce a color shift due to printing characteristic variations among a plurality of nozzles when an image is printed with a plurality types of inks.

In a first aspect of the present invention, there is provided an image processing apparatus that generates print data used for performing printing by using a printing head provided with a plurality of nozzle arrays that eject inks of different colors, based on image data, the apparatus comprising: a correcting unit configured to correct a value of the image data on the basis of correction parameter; and a selecting unit configured to, from a memory retaining the correction parameters to be made correspond to respective combinations of printing characteristic ranks of nozzles with respect to inks of different colors, select the correction parameter of the same combination of printing characteristic ranks as a combination of printing characteristic ranks that is obtained correspondingly to respective one or plurality of nozzles for ejecting inks of different colors to a same area of a printing medium, wherein the correcting unit corrects the value of image data on the basis of the correction parameter that is selected by the selecting unit correspondingly to the respective one or plurality of nozzles.

In a second aspect of the present invention, there is provided an ink jet printing apparatus that performs printing by using a printing head provided with a plurality of nozzle arrays that eject inks of different colors, based on printing data generated from an image data, the apparatus comprising: a correcting unit configured to correct a value of the image data on the basis of correction parameter; and a selecting unit configured to, from a memory retaining the correction parameters to be made correspond to respective combinations of printing characteristic ranks of nozzles with respect to inks of different colors, select the correction parameter of the same combination of printing characteristic ranks as a combination of printing characteristic ranks that is obtained correspondingly to respective one or plurality of nozzles for ejecting inks of different colors to a same area of a printing medium, wherein the correcting unit corrects the value of image data on the basis of the correction parameter that is selected by the selecting unit correspondingly to the respective one or plurality of nozzles.

In a third aspect of the present invention, there is provided an image processing method of generating print data used for performing printing by using a printing head provided with a plurality of nozzle arrays that eject inks of different colors, based on image data, the method comprising: a correcting step of correcting a value of the image data on the basis of correction parameter; and a selecting step of, from a memory retaining the correction parameters to be made correspond to respective combinations of printing characteristic ranks of nozzles with respect to inks of different colors, select the correction parameter of the same combination of printing characteristic ranks as a combination of printing characteristic ranks that is obtained correspondingly to respective one or plurality of nozzles for ejecting inks of different colors to a same area of a printing medium, wherein the correcting step corrects the value of image data on the basis of the correction parameter that is selected by the selecting step correspondingly to the respective one or plurality of nozzles.

With the structure described above, a color shift due to printing characteristic variations among a plurality of nozzles can be reduced when an image is printed with a plurality of colors of inks.

Further features of the present invention will become apparent from the following description of exemplary embodiments (with reference to the attached drawings).

BRIEF DESCRIPTION OF THE DRAWINGS

FIG. 19 is a diagram showing a relationship between FIGS. 19A to 19C; and FIGS. 19A to 19C are tables illustrating an example of parameter numbers of MCS processing parameters corresponding to representative printing characteristic ranks according to the fourth variation of the first embodiment;

DESCRIPTION OF THE EMBODIMENTS

In the following, embodiments of the present invention will be explained in detail with reference to the drawings.

Figure 1:
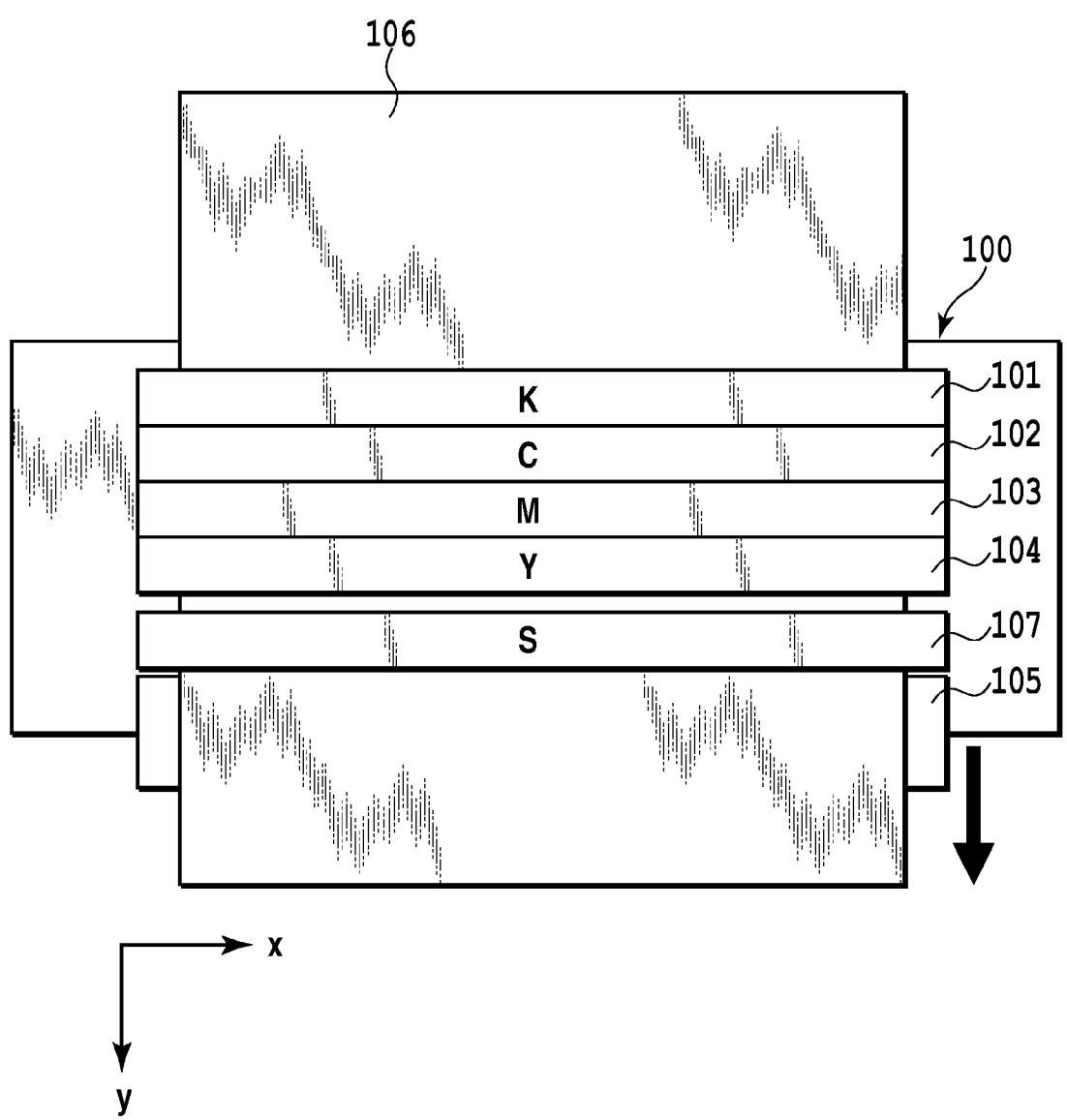
FIG. 1 is a schematic view of an inkjet printer according to one embodiment of the present invention.

FIG. 1 is a schematic view of an inkjet printer (an inkjet printing apparatus) according to one embodiment of the present invention. As illustrated in FIG. 1, a printer 100 has printing heads 101 to 104 on a frame that is a structural material of the printer. Each of the printing heads 101 to 104 is a full-line type printing head, that is, has a plurality of nozzles for ejecting black (K), cyan (C), magenta (M) and yellow (Y) inks respectively, the nozzles being arranged along the X direction over the width of the printing paper 106. A nozzle arrangement of nozzle array of each ink color has a resolution of 1200 dpi.

Figure 10:
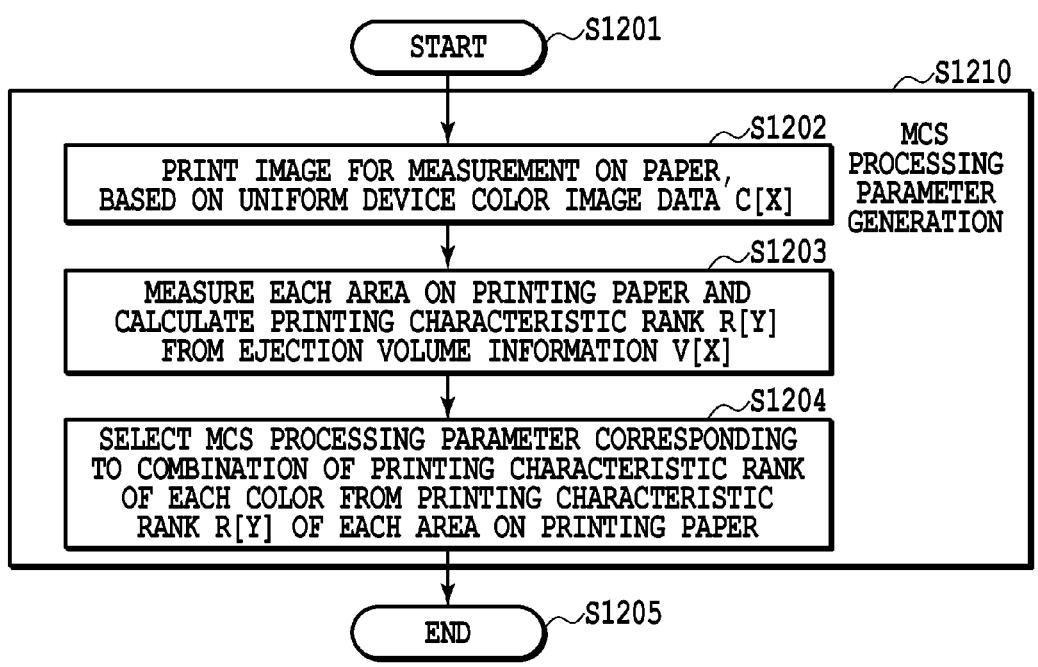
FIG. 10 is a flow chart illustrating processing for using the printing characteristic ranks to select table parameters suitable for a printing head that is actually used according to the first embodiment.

The printing paper 106 as a printing medium is conveyed in the y-arrow direction in FIG. 10 by a conveying roller 105 (and other not shown rollers) rotated by a driving force of a motor (not shown). While the printing paper 106 is conveyed, ink is ejected from the plurality of nozzles of each of the printing heads 101 to 104, according to print data. By this, one raster image corresponding to the nozzle array of each of the printing heads is sequentially printed. At a position downstream of the printing heads 101 to 104 in the y-direction, a scanner 107 having reading elements arranged in a predetermined pitch is disposed in parallel with the printing heads 101 to 104. The scanner 107 can read an image printed by the printing heads 101 to 104 and output the image as RGB multi-valued data. In this way, each of the printing heads repeats such an ink ejection operation to a printing paper that is being conveyed, thereby printing, for example, one page of image. A printing apparatus to which the present invention can be applied is not limited to the full-line type apparatus as described above. It will be apparent from the following description that the present invention can be applied to a serial type printing apparatus in which printing is performed by scanning a printing head in a direction that crosses the conveying direction of a printing paper, for example.

Figure 2:
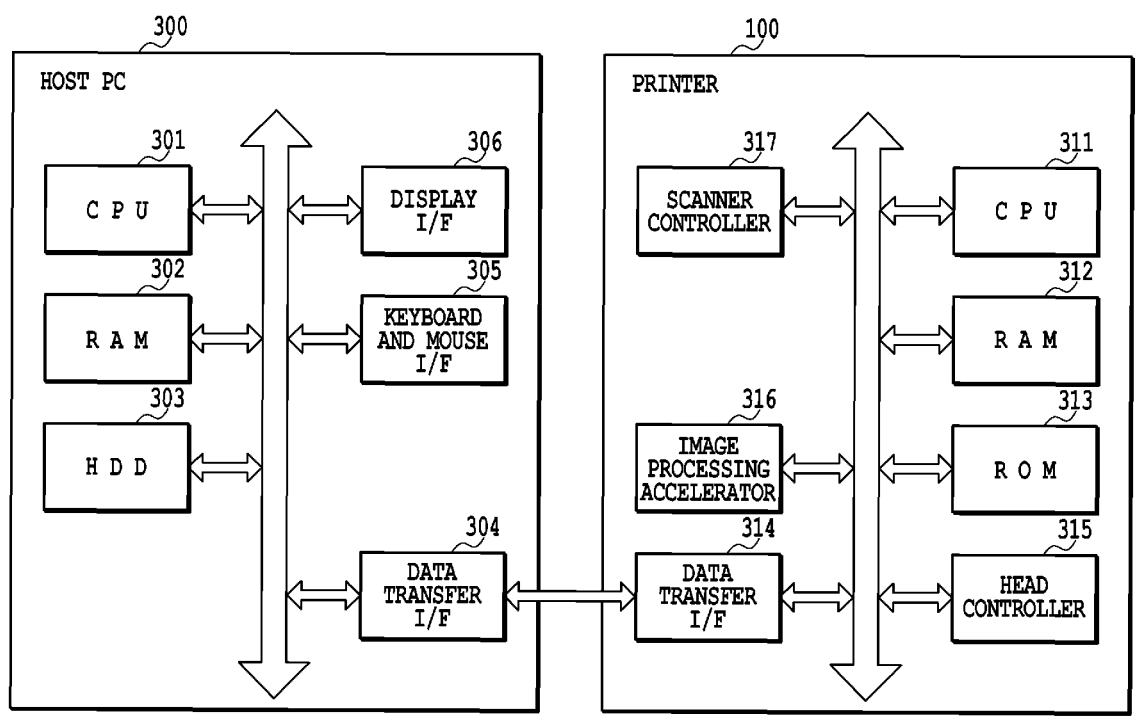
FIG. 2 is a block diagram illustrating a configuration of a printing system according to one embodiment of the present invention.

FIG. 2 is a block diagram illustrating a configuration of a printing system according to one embodiment of the present invention. As illustrated in FIG. 2, this printing system has the printer 100 illustrated in FIG. 1 and a personal computer (PC) 300 as a host device of the printer 100.

The host PC 300 mainly has the following elements. A CPU 301 performs processing according to programs stored in a HDD 303 and a RAM 302. The RAM 302 is a volatile storage and temporally stores programs and data. The HDD 303 is a nonvolatile storage and stores programs and data. A data transfer interface (I/F) 304 controls sending and receiving data to and from the printer 100. As a connection for sending and receiving data, USB, IEEE1394, LAN, etc. can be used. A keyboard and mouse I/F 305 is an interface to control a human interface device (HID) such as a keyboard and a mouse, and a user can input via this I/F device. A display I/F 306 controls display on a display (not shown).

The printer 100 mainly has the following elements. A CPU 311 performs processing of respective embodiments that will be described with reference to FIGS. 4A to 4D and later FIGS., according to programs stored in a ROM 313 and a RAM 312. The RAM 312 is a volatile storage and temporally stores programs and data. The ROM 313 is nonvolatile storage and can store table data, which are generated by processing of respective embodiments that will be described with reference to FIGS. 4A to 4D and later FIGS, and programs.

A data transfer I/F 314 controls sending and receiving to and from the PC 300. A head controller 315 supplies print data to the printing heads 101 to 109 illustrated in FIG. 1 and controls an ejection operation of the printing heads. Specifically, the head controller 315 can be configured to read control parameters and print data from a predetermined address in the RAM 312. When the CPU 311 writes control parameters and print data to the predetermined address in the RAM 312, the head controller 315 initiates processing and ink is ejected from the printing heads. An image processing accelerator 316 is composed of a hardware and performs image processing faster than the CPU 311. Specifically, the image processing accelerator 316 can be configured to read parameters and data required for image processing from a predetermined address in the RAM 312. When the CPU 311 writes parameters and data to the predetermined address in the RAM 312, the image processing accelerator 316 is started to perform predetermined image processing. According to the present embodiment, a software in the CPU 311 performs processing for generating parameters of a table to be used in the MCS processing section, which will be described with reference to FIGS. 4A to 4D and later FIGS. Image processing that includes processing in the MCS processing section in printing is performed by hardware processing of the image processing accelerator 316. It should be appreciated that the image processing accelerator 316 is not necessarily an essential element, but processing to generate the aforementioned table parameters and image processing can be performed by only processing of the CPU 311 depending on the specification of a printer. A scanner controller 317 controls respective reading elements of the scanner 107 illustrated in FIG. 1 and outputs RGB data obtained from these reading elements to the CPU 311.

Several embodiments to reduce a color shift due to ejection volume variations among a plurality of nozzles in the case where an image is printed with a plurality types of inks in the aforementioned printing system, will be described below. In a conventional head shading technique in which data of a plurality of different types of inks is individually corrected, if a certain color is represented by overlapping a plurality of different types of inks, the represented color may be different from the color that should be represented, that is, a color shift may occur.

Figure 3A:
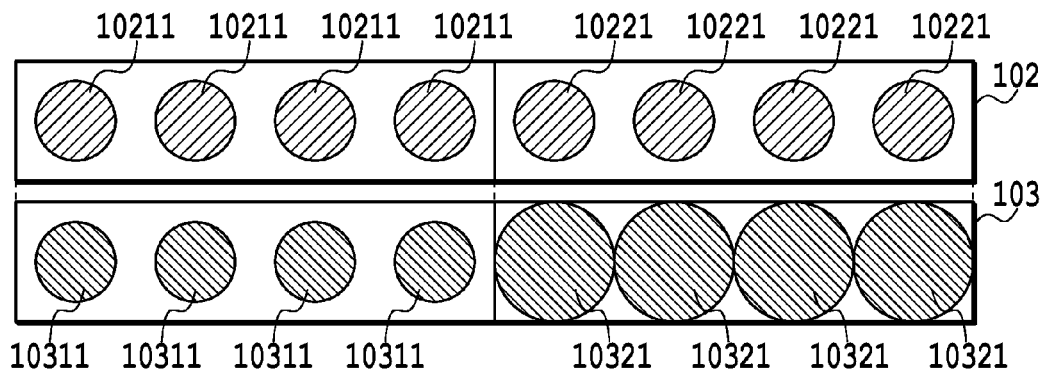
FIGS. 3A to 3C are diagrams illustrating occurrence of a color shift when a certain color is represented by overlapping a plurality of different types of inks.
Figure 3B:
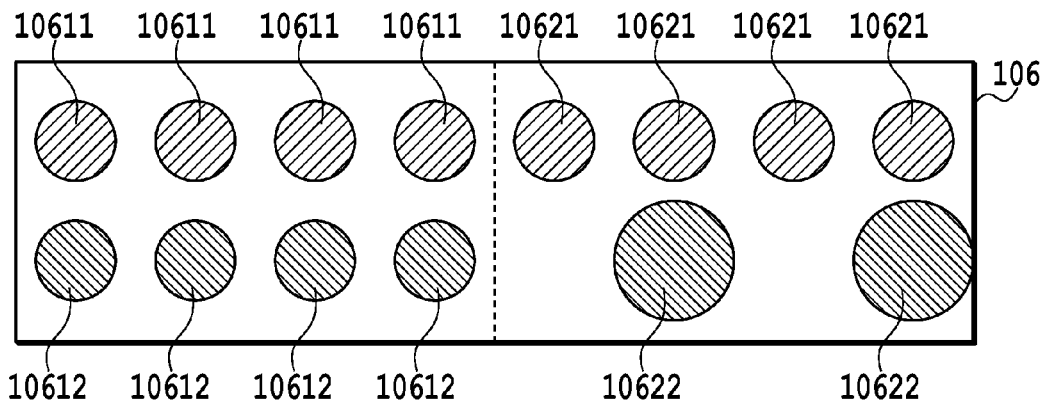
Figure 3C:
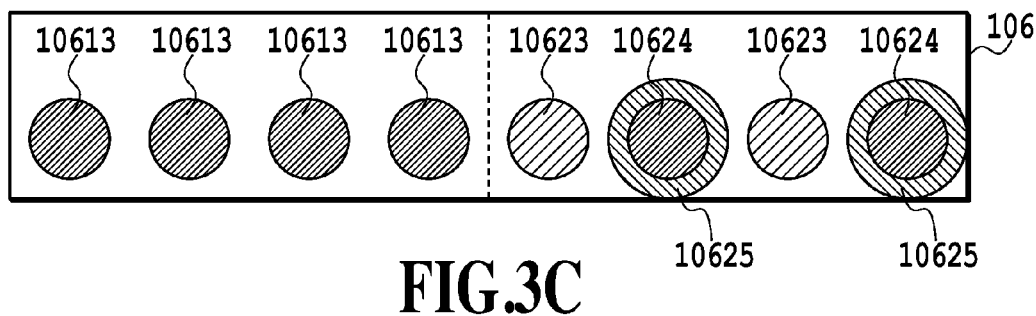

FIGS. 3A to 3C are diagrams illustrating occurrence of the color shift. In FIG. 3A, reference numeral 102 denotes a printing head ejecting cyan ink and reference numeral 103 denotes a printing head ejecting magenta ink. In FIG. 3A, eight nozzles among a plurality of nozzles of each of the printing heads are illustrated in order to make explanation and illustration simple, and by way of example only two printing heads are illustrated to describe a color shift that occurs when blue color is printed with cyan and magenta inks.

The eight nozzles 10211 and 10221 of the cyan ink printing head 102 all have a standard ejection volume. Meanwhile, among eight nozzles of the magenta ink printing head 103, four nozzles 10311 on the left in FIG. 3A have a standard ejection volume and four nozzles 10321 on the right in FIG. 3A have a larger ejection volume than a standard ejection volume. In FIG. 3A, the four nozzles on the right of the magenta ink printing head 103 are illustrated with a bigger size than of those on the left side. The difference of sizes is for making a difference of ejection volumes easy to be understood, but does not indicate a relation of actual nozzle sizes.

In the case where a printing head having such ejection volume characteristics is used, when image data is corrected using a conventional head shading, binary data (dot data) corresponding to the nozzle can be finally obtained. If these cyan and magenta dot data are printed on the printing paper 106 individually without overlapping on the basis of these data, they are represented by an illustration in FIG. 3B. An example in FIG. 3B illustrates dots printed in such a way that solid images, that is, cyan image data of 100% duty and magenta image data of 100% duty, are subject to head shading processing, and then binarization.

FIG. 3B shows cyan dots 10611 and 10621 corresponding to the nozzles of the cyan ink printing head 102 and magenta dots 10612 and 10622 corresponding to the nozzles of the magenta ink printing head 103. Among them, the number of magenta dots 10622, which corresponds to the four nozzles 10321 with a larger magenta ink ejection volume, is reduced as the result of correcting image data of its corresponding region by head shading. FIG. 3B illustrates an example in which an area of each dot formed by ink ejected from magenta ink nozzles 10321 that has a larger ejection volume is twice as large as that of each dot formed by ink of a standard ejection volume. In this case, correction by head shading reduces the number of dots by half (from four dots to two dots). When the area of each dot doubles, the number of dots reduces by half, in order to make explanation simple. It should be appreciated that practically the number of dot data is determined so that increase (decrease) of density due to increase (decrease) of a dot area caused by ejection volume variations can be suppressed to a standard density.

FIG. 3C illustrates an example in which cyan and magenta inks are ejected from the respective printing heads to print a blue image on the printing paper 106 on the basis of dot data obtained as described above. In FIG. 3C, standard-sized blue dots 10613 are formed by overlapping cyan and magenta inks and printed on the region on the printing paper 106 that is illustrated on the left in FIG. 3C, whereas standard-sized cyan dots 10623 as well as dots, each of which is composed of a blue area 10624 formed by overlapping cyan and magenta inks and a magenta area 10625 surrounding the blue area 10624, are printed on the region of the right in FIG. 30 corresponding to four nozzles 10321 having a larger magenta ink ejection volume.

In this way, a region for printing (a solid image of) blue on the right in FIG. 3C corresponding to the magenta nozzles 10321 having a larger ejection volume is composed of the following three types of dots or areas.

Two Standard-Sized Cyan Areas (Dots) 10623

Two blue areas 10624, each being formed by a standard-sized cyan dot within a magenta dot having a larger size than a standard size Two magenta areas 10625, each surrounding a standard-sized blue area 10624

As described above, in the conventional head shading, cyan and magenta image data is individually corrected to adjust the number of the respective dots. As a result, the relation will be that an area of two cyan areas (dots) 10623=an area of two blue areas 10624=an area of two magenta areas 10625. In this case, if a color that can be observed on the whole due to light absorption characteristics of the cyan areas 10623 and light absorption characteristics of the magenta areas 10625 are identical to a color that can be observed due to light absorption characteristics of the blue areas 10624, the entire region has the same color as that of the blue areas 10624.

However, in the case where an area, such as the blue areas 10624, is formed by overlapping a plurality of different types of inks, a color that is observed due to light absorption characteristics of the area is often different from a color that is observed on the whole due to combining of the light absorption characteristics of the respective areas of the plurality of inks. As a result, the entire region has a color shift from a targeted standard color, and on the printing paper 106 a blue image on the left half region in FIG. 3C and a blue image on the right half region in FIG. 3C appear to have different colors.

For example, even in a multi-valued printing apparatus in which a size of a dot can be variable, such as a four-valued printing apparatus to perform printing with three-sized dots, that is, large, medium and small dots, there may be dot size variations due to ejection volume variations among nozzles. In this case, even by performing correction by the conventional head shading, a color shift may occur due to the same reason as above. Accordingly, the present invention can be applied to not only a binary printing apparatus but also a three-valued or more-valued printing apparatus.

Embodiments of the present invention that will be described below reduce the aforementioned color shift by correction processing on image data composed of a plurality of color signal sets prior to being subject to quantization.
(First Embodiment)

Figure 4A:
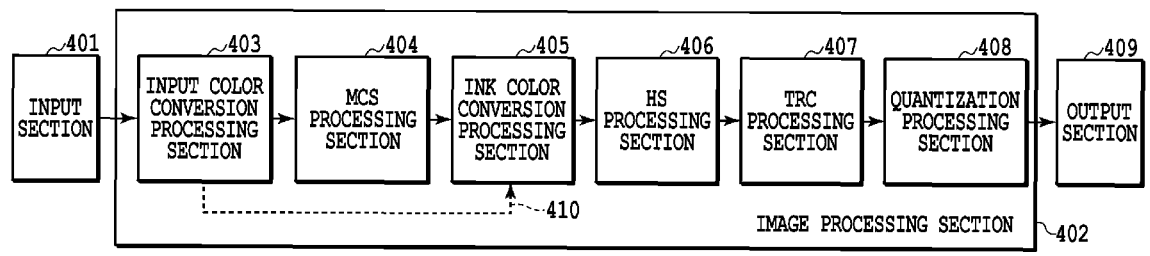
FIGS. 4A to 4D are block diagrams, each illustrating a configuration of an image processing section of an inkjet printer according to a first embodiment of the present invention or variations thereof.

FIG. 4A is a block diagram illustrating a configuration of an image processing section in an inkjet printer according to a first embodiment of the present invention. More specifically, in the present embodiment, the image processing section is composed of the respective elements for control and processing of the printer 100 illustrated in FIG. 2. It should be appreciated that application of the present invention is not limited to this embodiment. For example, the image processing section may be configured in the PC 300 illustrated in FIG. 2, or part of the image processing section may be configured in the PC 300 and other parts thereof may be configured in the printer 100.

As illustrated in FIG. 4A, an input section 401 receives input image data transmitted from the host PC 300 and passes the image data to an image processing section 402. The image processing section 402 includes an input color conversion processing section 403, a multi color shading (MCS) processing section 404, an ink color conversion processing section 405, a head shading (HS) processing section 406, a tone reproduction curve (TRC) processing section 407, and a quantization processing section 408.

In the image processing section 402, first, the input color conversion processing section 403 converts image data inputted by the input section 401 to image data corresponding to a color reproduction range of the printer. In the present embodiment, inputted image data is data indicative of color coordinates (R, G, B) in an color space coordinate, such as sRGB that is expression colors of a monitor. The input color conversion processing section 403 converts this 8-bit input image data R, G, B to image data (R', G', B') of a color reproduction range of a printer that is a color signal composed of three elements by a known method such as matrix operation processing or processing using a three-dimensional lookup table. In the present embodiment, the conversion processing is performed by using a three-dimensional lookup table together with interpolation operation. The 8-bit image data dealt with in the image processing section 402 has a resolution of 600 dpi. Binary data obtained by quantization in the quantization processing section 408 has a resolution of 1200 dpi, as will be described later.

The multi color shading (MCS) processing section 404 performs correction processing on the image data converted by the input color conversion processing section 403. This processing is performed using a three-dimensional lookup table, as will be described later. This correction processing can reduce the above described color shift even due to ejection volume variations even if there is the ejection volume variations among the nozzles of the printing head in an output section 409. The concrete content of the table for this MCS processing section 404 and correction processing using the table will be described later.

The ink color conversion processing section 405 converts the 8-bit image data of each of R, G, B processed by the MCS processing section 404 to image data composed of color signal data of inks used in a printer. Since the printer 100 according to the present embodiment uses black (K), cyan, (C), magenta (M) and yellow (Y) inks, image data of RGB signals is converted to image data composed of 8-bit color signals of each of K, C, M and Y. This color conversion is performed using a three-dimensional lookup table and interpolation operation, as the aforementioned input color conversion processing section. As another conversion method, matrix operation processing may be used as the above.

The head shading (HS) processing section 406 receives the input image data of ink color signals and converts the 8-bit data of each ink color to the image data of ink color signals corresponding to an ejection volume of each nozzle composing the printing head. That is, this processing is the same as the aforementioned conventional head shading processing. In the present embodiment, this HS processing is performed using a one-dimensional lookup table. In applying the present invention, this HS processing section does not need to be provided, unless otherwise noted. That is, there are cases where the accuracy of correction processing by the MCS processing section is sufficient relative to memory capacity, depending on the specification of a printer. In such cases, processing by the HS processing section can be included in the correction processing by the MCS processing section.

The tone reproduction curve (TRC) processing section 407 performs correction to adjust the number of dots to be printed by the output section 409 for each ink color on the image data composed of the respective 8-bit ink color signals that has been subjected to HS processing. More specifically, there are cases where a relation between the number of dots to be printed on a printing medium and a lightness realized by the number of dots is not linear. The TRC processing section 407 corrects image data composed of the respective 8-bits so as to make this relation linear, adjusting the number of dots to be printed on the printing medium.

The quantization processing section 408 performs quantization processing on the image data composed of the respective 8-bit (256 values) ink color signals processed in the TRC processing section 407 to obtain one-bit binary data. In this processing, according to the present embodiment, the 8-bit data is first converted to 3-bit, 5-valued index data ("0" to "4") for each color. This index data "0" to "4" corresponds to a pattern in which zero to four dots are arranged in 2×2 pixels at a resolution of 1200 dpi. It should be appreciated that a mode of quantization 408 is not limited to this mode in applying the present invention. For example, 8-bit image data may be directly binarized to obtain binary data (dot data). As a method for quantization processing, the present embodiment uses an error diffusion method, but other pseudo halftone processing such as a dithering method may be used.

The output section 409 drives the printing head to eject each color ink on the printing medium on the basis of the dot data obtained by quantization to perform printing. Specifically, the output section 409 includes a printing mechanism having the printing heads 101 to 104 illustrated in FIG. 1.

Figure 5A:
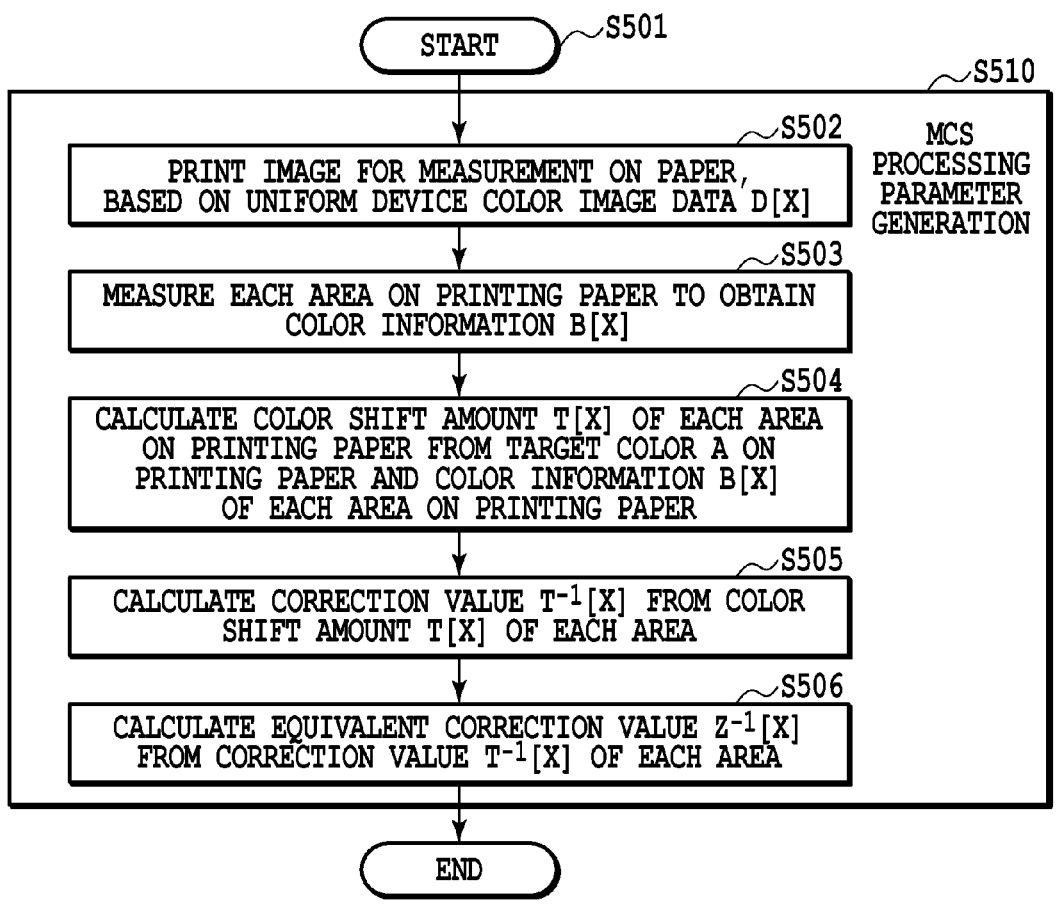
FIGS. 5A and 5B are flow charts, illustrating processing for generating parameters of a table to be used by an MCS processing section 404 illustrated in FIG. 4A and processing by the MCS processing section 404 using the table in image processing to generate print data, respectively.
Figure 5B:
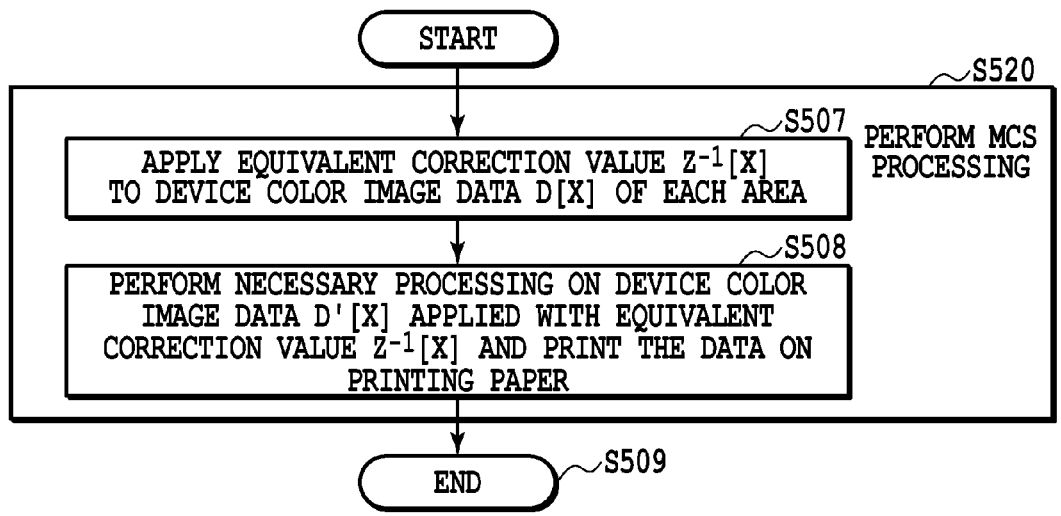

FIGS. 5A and 5B are flow charts illustrating processing for generating parameters of a table to be used by an MCS processing section 404 illustrated in FIG. 4A and processing by the MCS processing section 404 using the table in image processing for generating print data, respectively.

In FIG. 5A, processing S510 generates parameters of a three-dimensional lookup table to be used by the MCS processing section 404 and has steps S502 to S506. In the present embodiment, processing S510 is performed when a printer is manufactured, has been used for a predetermined period, or has performed a predetermined amount of printing. That is, processing S510 also may be performed as calibration, which updates table parameters that are the content of the lookup table. A processing S520 illustrated in FIG. 5B is performed by the MCS processing section 404, which is part of image processing performed by the image processing section 402 illustrated in FIG. 4A in order to generate print data when printing is performed by a printer. This processing has steps S507 and S508. It should be appreciated that timing for performing generation processing of table parameters is not limited to the aforementioned timing in applying the present invention. For example, the generation processing may be performed before processing S520 for printing are performed.

First, processing S510 to generate table parameters illustrated in FIG. 5A will be described.

In the present embodiment, after table parameters for the HS processing section 406 are generated, table parameters for the MCS processing section are generated. Therefore, at the time point of step S501 on which this processing is started, table parameters for the HS processing section have been already generated (updated). If there are ejection volume variations among the nozzles of the magenta ink printing head 103 as illustrated in FIG. 3A, table parameters for the HS processing section are generated so that the number of dots in a region corresponding to four nozzles 10321 on the right half are half the number of dots in a region corresponding to four nozzles 10311 on the left half, as illustrated in FIG. 33. If each nozzle of the cyan ink printing head 102 has ejection volume characteristics illustrated in FIG. 3A, that is, if all the nozzles have a standard ejection volume, table parameters for the HS processing section are parameters so as to convert image data as what it is. In this way, according to the present embodiment, when table parameters for the MCS processing section are generated or updated, the table parameters for the HS processing section are generated prior to this. This can properly reduce a color shift due to the variations among nozzles by total processing of the MCS processing section and HS processing section.

First, in step S502, for each set of R, G, B representing a color whose color shift tends to be large, an image for measurement (patch) is printed on a printing medium by ejecting ink from the nozzles of the printing head illustrated in FIG. 1. Specifically, 0 to 255 of each of R, G, B are divided by, e.g. 17 to obtain values; among lattice points set by combinations of the obtained values, lattice points whose color shift tendency is significantly changing are selected; and images for measurement are printed for sets of R, G, B corresponding to these lattice points. This lattice point having a large color shift tendency can be selected from among the lattice points set by combinations of the values obtained by dividing by 17 in such a way that a color having a significant color shift, such as a set of R=0, G=0, B=255 corresponding to a blue image described with reference to FIGS. 3A to 3C, is previously known. Selecting lattice points of color for printing an image for measurement is not limited to the above example. For example, sets of R, G, B having a larger color shift than a predetermined color shift may be set, and images for measurement may be printed for all of these sets. In other words, sets of color signals for printing an image for measurement can be set depending on operation load and memory capacity.

According to the present embodiment, in each data of an image for measurement, a resolution of a plurality of pixels composing the data is 600 dpi. In the data of the plurality of pixels, when sets of R, G, B values of data of the image for measurement are the same, the color is uniform. Image data of the image for measurement is inputted, as 8-bit image data (hereinafter referred to as device color image data D[X]) that has been subjected to processing by the input color conversion processing section 403 illustrated in FIG. 4A, through a bypass processing path indicated by a dashed line 410 in FIG. 4A to the ink color conversion processing section 405, without being subject to processing by the MCS processing section 404. Specifically, the MCS processing section 404 performs correction processing on the device color image data D[X], using a table in which a correction amount indicated by a table parameter is zero. After that, the image data proceeds to the HS processing section 406, TRC processing section 407 and quantization processing section 408, and then is printed on the printing paper 106 in the output section 409. In this process, image data of the image for measurement is converted to image data of ink color signals by the ink color conversion processing section 405, and data having 100% cyan duty and 100% magenta duty that composes the blue described above, can be obtained as one of the data of the image for measurement. That is, data of (K, C, M, Y)=(0, 255, 255, 0) is obtained as image data of the image for measurement. Then, the obtained data is subject to processing by the HS processing section 406 and later processing, resulting in the image data for measurement composed of dot data illustrated in FIG. 3B. In the following description, generation processing will be described on only table parameters corresponding to lattice points indicative of image data of this blue image for measurement, to simplify description.

In device color image data D[X], X is a value to specify pixels with a resolution of 600 dpi in an image data for measurement. In other words, X is a value for specifying, as a section of 300 dpi, a pixel area (hereinafter simply referred to as an area) corresponding to contiguous four nozzles in a nozzle arrangement of each ink color printing head illustrated in FIG. 1. Accordingly, since a resolution of dots printed corresponds to the resolution of the nozzle arrangement and is 1200 dpi, two pixels of the image data D[X] having a 600 dpi resolution corresponds to one of the aforementioned area and is specified as X. As described above, this device color image data D[X] is subject to processing of the ink color conversion processing section 905 and later processing, and the image for measurement of the data is printed in the output section 409.

Figure 6A:
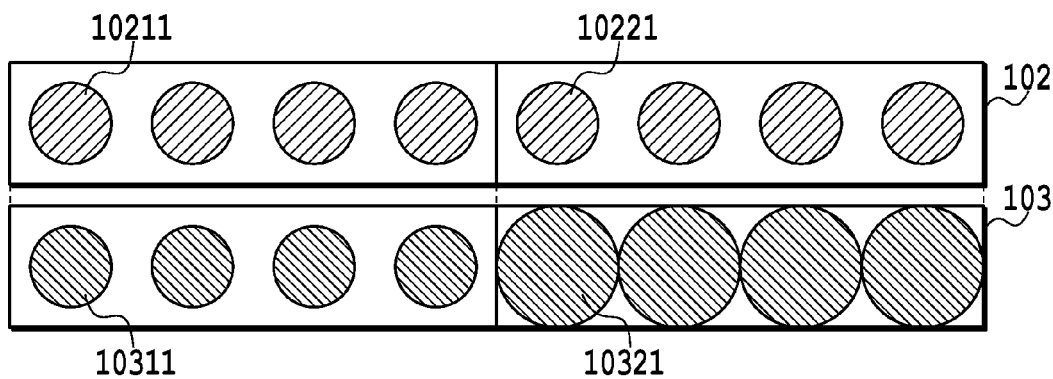
FIGS. 6A and 6B are diagrams illustrating printing of an image for measurement in step S502 of FIG. 5A.
Figure 6B:
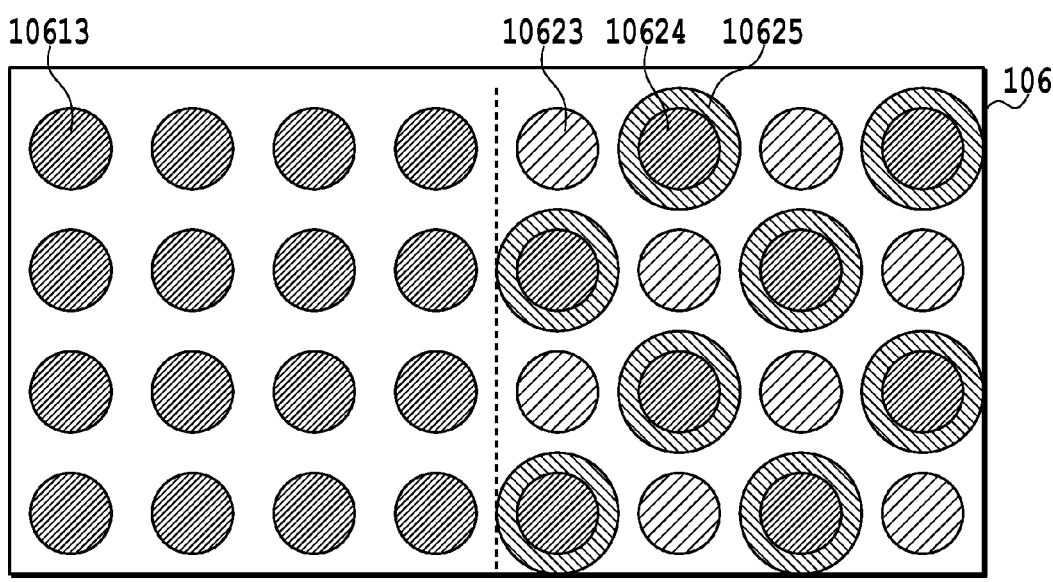

FIGS. 6A and 6B are diagrams illustrating printing of an image for measurement in step S502. In FIGS. 6A and 6B, elements identical to those illustrated in FIGS. 3A to 3C have the same reference numerals and are not described here.

FIG. 6A, similarly to the example illustrated in FIG. 3A, illustrates an example in which four nozzles on the right in FIG. 6A among nozzles of the magenta printing head 103 have a larger ejection volume than a standard ejection volume. In this case, a blue image for measurement illustrated in FIG. 6B is printed. That is, an image for measurement is printed in which a region on the right in FIG. 6B has a color shift and the blue of the region is different from the blue on the left region in FIG. 6B.

Returning to FIG. 5A, in the next step S503, as described above, the color of an image for measurement printed on the printing paper 106 is measured to obtain color information B[X]. According to the present embodiment, this color measurement is performed in such a way that an image for measurement is measured by the scanner 107 provided in the printer. Accordingly, this processing in step S503 includes processing to receive the data measured by the scanner. A scanner separate from a printer may be used to perform measurement by the operation of a user. The scanner and printer may be connected by signals and the measurement results may be automatically inputted from the scanner to the printer, for example. In the present embodiment, color information B[X] is represented by sets of RGB values read by the scanner. However, any data format, such as L*a*b* measured by a colorimeter, can be used.

In the present embodiment, the resolution of the aforementioned measurement is 600 dpi. Meanwhile, the resolution of printed dots is 1200 dpi that corresponds to the resolution of the nozzles. Accordingly, in the aforementioned color measurement, a region corresponding to four nozzles illustrated in FIG. 6B is measured as two pixels. Then, the color information B[X] is obtained as a section of a region corresponding to the two pixels of the measurement (the aforementioned area). That is, in the color information B[X], X is a value to specify the area, and the color information B[X] is obtained as an average value of the measurement results of the two pixels of the measurement. In the example illustrated in FIG. 6B, in such a way that the area corresponding to four nozzles on the left side and the area corresponding to four nozzles on the left side are different areas, the color information B[X] is obtained for each of the areas.

In this way, a blue image for measurement of a lattice point whose device color image data D[X] is (R, G, B)=(0, 0, 255) is printed by ejecting each of inks from all of the nozzles of the cyan and magenta printing heads 102 and 103 illustrated in FIG. 1. Then, color information B[X] is obtained for each area corresponding to the four nozzles. FIG. 6B illustrates a part of the areas; hereinafter an area on the left in FIG. 6B will be referred to as a first area (X=1) and an area on the right in FIG. 6B will be referred to as a second area (X=2). Color information of the first area is set to be B[1]=(R1, G1, B1) and color information of the second area is set to be B[2]=(R2, G2, B2). An example illustrated on the right in FIG. 6B illustrates a case where all the four magenta nozzles have a larger ejection volume than a standard ejection volume. There is also a case where three of among four nozzles may have a larger ejection volume than a standard ejection volume and remaining one has a standard ejection volume, for example. In this case, naturally, values of the color information B[2] of the second area are different from the aforementioned case.

Next, in step S504 of FIG. 5A, a color shift amount T[X] of each area [X] is calculated from a target color A=(Rt, Gt, Bt) and the color information B[X] obtained in step S503. Here, the target color A is color data obtained in such a way that an image is printed by the respective color printing heads having a standard ejection volume in the output section 409 on the basis of the same blue image data represented by (R, G, B)=(0, 0, 255) and the printed image is scanned by a scanner. In the present embodiment, the resolution of the measured color data is 300 dpi, as described above. Therefore, also in processing to generate table parameters by the MCS processing section in the aforementioned step S504 and the later described steps S505 and S506, data having a pixel resolution of 300 dpi is processed.

That is, a color shift amount T is represented as follows:

Color shift amount $T[1]=B[1]-A=(R1-Rt, G1-Gt, B1-Bt)$

Color shift amount $T[2]=B[2]-A=(R2-Rt, G2-Gt, B2-Bt)$

Here, the color shift amount T[1] is a difference between a blue color by overlapping a standard ejection volume of cyan ink and a standard ejection volume of magenta ink in an area on the left in the example of FIG. 6B and a blue color of the target color data A. Except of a measurement error, the color shift amount T[1] is ideally zero, that is, the relations of R1=Rt, G1=Gt, B1=Bt are fulfilled.

On the other hand, the color shift amount T[2] is a difference between a blue color by combination of a standard ejection volume of cyan ink and a larger ejection volume of magenta ink than a standard volume on the right in the example of FIG. 6B and a blue color of the target color data A. For example, if the blue color obtained by combination of a cyan area 10623 and a magenta area 10625 has a cyan cast blue in comparison with the target blue color, the color shift amount T[2] is a color shift amount whose cyan color is large. That is represented by R2<Rt, G2=Gt, B2=Bt, for example.

Returning to FIG. 5A, in the next step S505, a correction value $T^{-1}[X]$ is calculated from the color shift amount T[X] of each area [X]. In the present embodiment, an inverse transformation equation is simply used as follows:

$T^{-1}[X]=-T[X]$

Accordingly, a correction value for each area is:

Correction value $T^{-1}[1]=-T[1]=A-B[1]=(Rt-R1, Gt-G1, Bt-B1)$

Correction value $T^{-1}[2]=-T[2]=A-B[2]=(Rt-R2, Gt-G2, Bt-B2)$

Here, the correction value $T^{-1}[1]$ corresponds to the area on the left in FIG. 6B and is ideally zero. On the other hand, the correction value $T^{-1}[2]$ corresponds to the area on the right in FIG. 6B and reduces cyan color in the aforementioned example. That is, in the case of R2<Rt, Rt−R2 is a positive value, which increases redness and reduces cyan color.

Next, in step S506 of FIG. 5A, an equivalent correction value $Z^{-1}[X]$ is calculated from the correction value $T^{-1}[X]$ of each area [X]. More specifically, since the correction value $T^{-1}[X]$ is a correction value of blue color in a measurement color space, an equivalent correction value $Z^{-1}[X]$ to correct blue color in a device color space by the same amount of this correction value $T^{-1}[X]$ is calculated. Here, an equivalent correction value $Z^{-1}[1]$ corresponds to the area on the left in FIG. 6B and is ideally zero. On the other hand, an equivalent correction value $Z^{-1}[2]$ corresponds to the area on the right in FIG. 6B and reduces cyan color.

If a measurement color space perfectly coincides with a device color space, the relation is as follows:

$$Z^{-1}[1] = T^{-1}[1] = -T[1] = A - B[1] = (Rt-R1, Gt-G1, Bt-B1)$$

$$Z^{-1}[2] = T^{-1}[2] = -T[2] = A - B[2] = (Rt-R2, Gt-G2, Bt-B2)$$

However, they do not coincide with each other in most cases. In these cases, color space conversion is performed. That is, if linear conversion can be performed between the both color spaces, a known method such as the following matrix conversion can be used.

$$Z^{-1}[1] = \begin{bmatrix} a1 & a2 & a3 \\ a4 & a5 & a6 \\ a7 & a8 & a9 \end{bmatrix} \times \begin{bmatrix} Rt - R1 \\ Gt - G1 \\ Bt - B1 \end{bmatrix} \quad \text{[Expression 1]}$$

Here, a1 to a9 are conversion coefficients for converting a measurement color space to a device color space. If linear conversion cannot be performed between the both color spaces, a known method such as a three-dimensional lookup table can be used to obtain the value as follows:

$$Z^{-1}[1] = F(Rt-R1, Gt-G1, Bt-B1)$$

$$Z^{-1}[2] = F(Rt-R2, Gt-G2, Bt-B2)$$

where F is a function for converting a measurement color space to a device color space. Conversion relation of the lookup table is in conformity to the function F.

If the relation between a correction value $T^{-1}[X]$ and an equivalent correction value $Z^{-1}[X]$ varies depending on a color, a known method such as a three-dimensional lookup table can be similarly used to obtain the value as follows:

$$Z^{-1}[1] = F(Rt, Gt, Bt) - F(R1, G1, B1)$$

$$Z^{-1}[2] = F(Rt, Gt, Bt) - F(R2, G2, B2)$$

where F is also a function for converting a measurement color space to a device color space.

In this way, for a lattice point selected as a color whose color shift tendency is significantly changing, a table parameter that is lattice point data can be obtained for an area [X] corresponding to nozzles. Table parameters of lattice points other than the selected lattice points can be obtained by interpolation between the selected lattice points. As a method using interpolation, a well-known method can be used and the description will be omitted.

An equivalent correction value $Z^{-1}[X]$, which is a table parameter of each lattice point, obtained as described above is associated with the lattice point for each area [X] and stored in the HDD 303 (FIG. 2) of the host PC.

Next, processing S520 performed by the MCS processing section 404 illustrated in FIG. 5B will be described. That is, in a series of image processing by the respective processing sections illustrated in FIG. 4A, the MCS processing section 404 corrects image data using the three-dimensional lookup table for each area that has a correction value obtained as described above as lattice point data.

First, in step S507, correction is performed in such a way that an equivalent correction value $Z^{-1}[X]$, which is a table parameter of the MCS processing section, generated as described above is applied to device color image data D[X].

In this step, first, it is determined in which area of the aforementioned areas [X] an object pixel that is subject to image processing is included. Here, a pixel of image processing has a resolution of 600 dpi. An area [X] is specified by a resolution of 300 dpi. Accordingly, two pixels correspond to or belong to one area [X].

When the area [X] that includes the object pixel, a value X=n, is obtained, an equivalent correction value $Z^{-1}[n]$ corresponding to a set of R, G, B and the area is obtained by referring to the table stored in the HDD 303 through the set of R, G, B indicated by the image data of the object pixel and the area [n]. For example, when the set of R, G, B indicated by image data of the object pixel is (0, 0, 255) and represents a blue image, an equivalent correction value $Z^{-1}[n]$ of blue is obtained as described above. Then, correction is performed in such a way that the equivalent correction value $Z^{-1}[n]$ is applied to the image data of the object pixel.

Specifically, the MCS processing section 404 applies an equivalent correction value $Z^{-1}[X]$ to device color image data D[X] corresponding to an area [X] that a object pixel belongs to, thereby generating a corrected device color image data D'[X] according to the following expression.

device color image data $D'[1] = D[1] + Z^{-1}[1]$ device color image data $D'[2] = D[2] + Z^{-1}[2]$ where $Z^{-1}[1]$ is a correction value corresponding to an area [1] on the left in a blue example of FIG. 6B and is ideally zero, as described above. Accordingly, the corrected device color image data D'[1] represents the same blue as the target color A. On the other hand, $Z^{-1}[2]$ is a correction value corresponding to an area [2] on the right in a blue example of FIG. 6B and is a correction value reducing cyan color, as described above. Accordingly, the corrected device color image data D'[2] represents blue whose cyan color is reduced by correction relative to the target color A.

Next, in step S508, the device color image data corrected as above proceeds through the ink color conversion processing section 405, HS processing section 406, TRC processing section 407 and quantization processing section 408 to the output section 409, where the image data is printed on the printing paper 106.

Figure 7A:
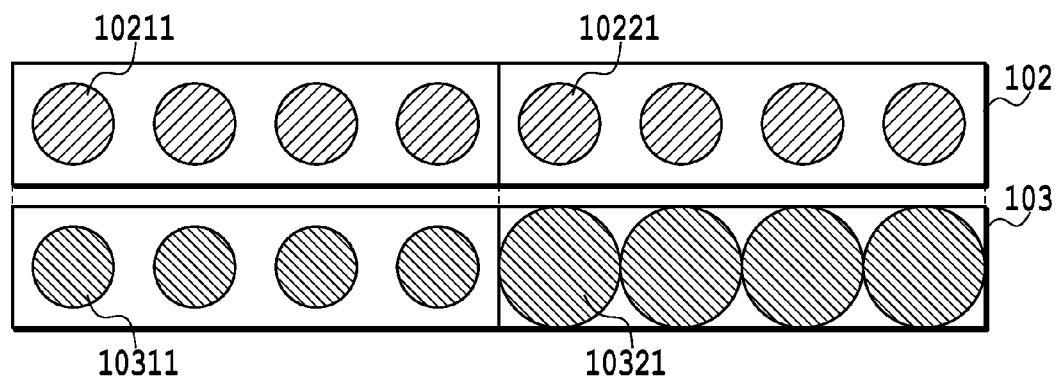
FIGS. 7A and 7B are diagrams illustrating printing of an image printed in step S508 of FIG. 5B.
Figure 7B:
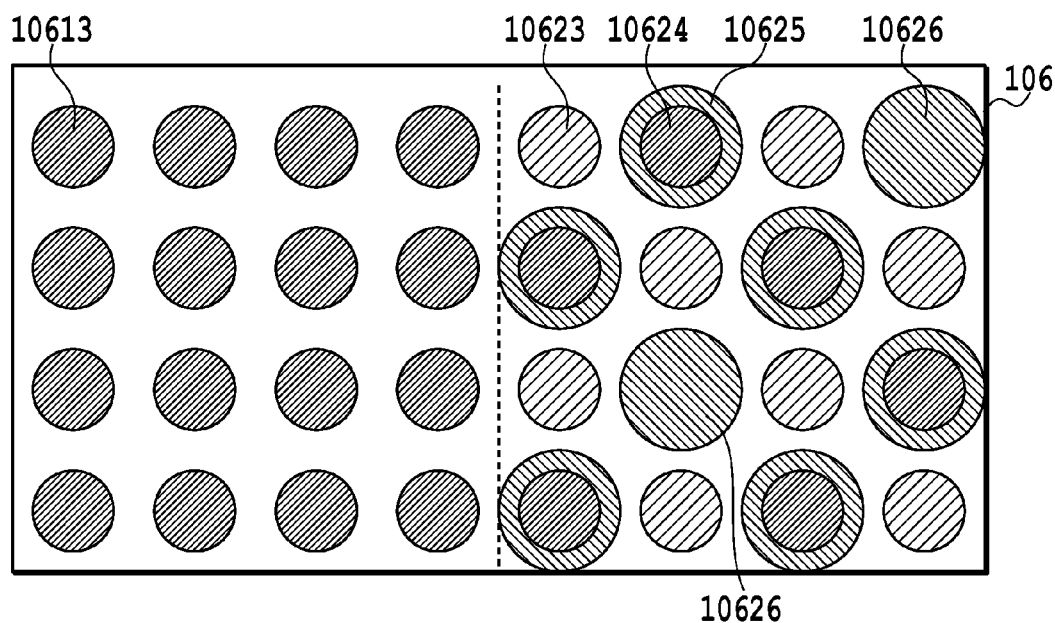

FIGS. 7A and 7B are diagrams illustrating an image printed in step S508 of FIG. 5B. FIG. 7A, similarly to FIG. 6A, illustrates ejection volume characteristics of nozzles of the cyan printing head 102 and magenta printing head 103. When correction is performed based on the characteristic illustrated in FIG. 7A by the MCS processing, dots without overlapping of cyan dots, such as magenta dots 10626 in an area on the right in FIG. 7B exist. That is, cyan dots are still printed on the magenta dots 10626 in the case that image data is subjected only to the HS processing as the printed result shown in FIG. 6B. On the other hand, the image data D'[2] has a reduction of cyan color relative to the target color A, resulting in decrease of the number of the cyan dots that are printed on the magenta dots.

Here, in each printing area illustrated in FIG. 7B, a color shift amount T[X] occurs due to ejection volume variations and so on in printing. That causes the following relations:

color information of an area on the left≈color on
printing paper corresponding to $D'[1]+T[1]≈A$ color information of an area on the right≈color on
printing paper corresponding to $D'[2]+T[2]≈A$ where, D'[1] is ideally the same blue color as the target color A and T[1] is ideally zero. D'[2] is a blue color whose cyan color reduces by T[2] relative to the target color A, and T[2] is a color shift amount to increase cyan color. In this way, the blue color of the area on the left and the blue color on the area on the right become almost the same, so that a color unevenness due to the color shift can be reduced.

As described above, in the present embodiment, for color (a set of R, G, B) whose color shift tendency is significantly changing, images for measurement (patches) are printed on a printing medium and a table parameter is obtained on the basis of the measurement result of the images for measurement. This is because a color shift amount that causes a color shift depends on both of (1) a color printed on a printing region and (2) a combination of printing characteristics of respective ink colors to be printed on the printing region, due to the principle of color shift occurrence. Here, (2) the printing characteristics of respective ink colors include factors that affect a dot diameter, such as a dot shape, an ink penetration rate and a printing medium type, in addition to the ejection volume described above. It is obvious that the color shift amount depends on a combination of printing characteristics of ink colors used to print the ink color and does not depend on printing characteristics of ink colors that are not used. Accordingly, the type and number of ink colors varies depending on the color of an object pixel. Therefore, in some colors, only one ink color is involved and the color shift does not occur.

Here, by way of example, the case where a measurement color space perfectly coincides with a device color space will be described. For example, since cyan one-color (R=0, G=255, B=255) has already a uniform density by HS processing and does not have the color shift, it is preferable not to perform correction in the MCS processing section 404. Therefore, the equivalent correction value is preferably $Z^{-1}[1]=Z^{-1}[2]=0=(0, 0, 0)$. Since magenta one-color (R=255, G=0, B=255) also has a uniform density by HS processing and does not have the color shift, it is preferable not to perform correction in the MCS processing section 404. Therefore, the equivalent correction value is $Z^{-1}[1]=Z^{-1}[2]=0=(0, 0, 0)$. On the other hand, blue color (R=0, G=, B=255) has a high possibility of color shift even if it has been subjected to HS processing, as described with reference to FIGS. 3A to 3C. Therefore, in the example illustrated in FIG. 6B, an equivalent correction values are as follows:

equivalent correction value $Z^{-1}[1]=0=(0, 0, 0)$ equivalent correction value $Z^{-1}[2]=T^{-1}[2]=(Rt-R2, Gt-G2, Bt-B2)$ That is, even if the color signal value B satisfies B=255, a color shift amount varies depending on a combination of other colors R, G and therefore a suitable equivalent correction value also varies.

In other words, in generating the table as described above, a lattice point of color whose color shift tendency is significantly changing is selected so that each lattice point in the table has the aforementioned suitable equivalent correction value as lattice point data. Then, the MCS processing section 404 uses a three-dimensional lookup table that is obtained on the basis of the measurement result of the image for measurement of the color of the lattice point suitably selected as described above.

Another example of processing S510 to generate table parameters for the MCS processing section may as follows.

Figure 8:
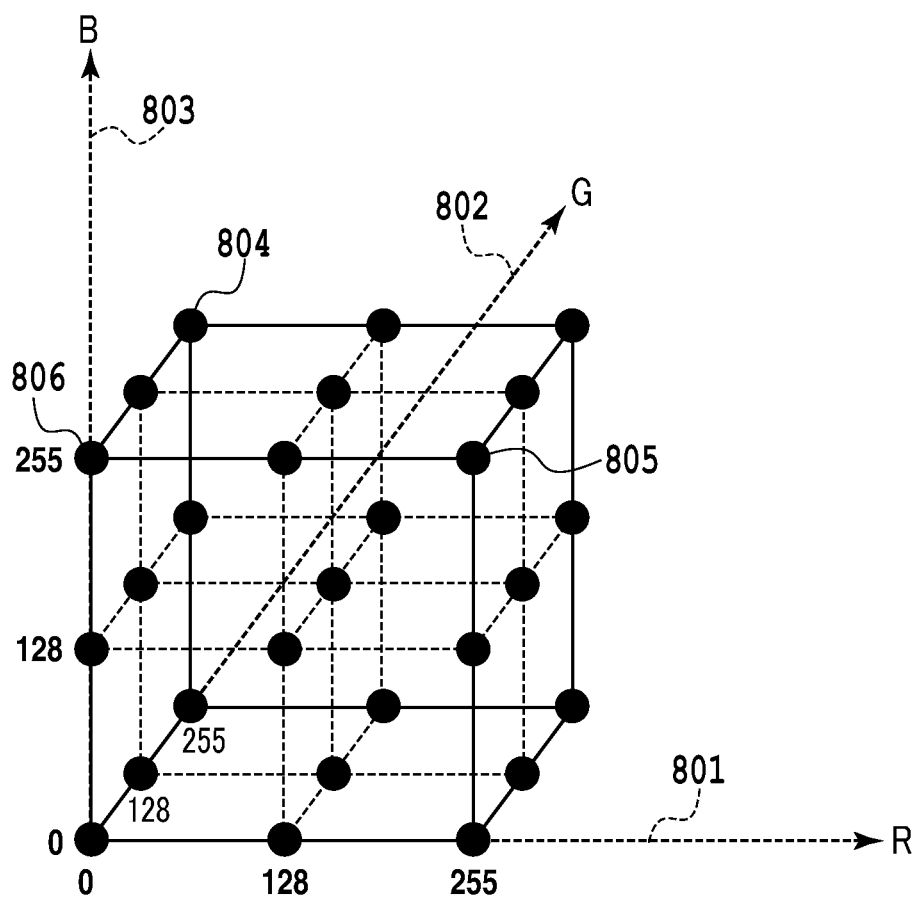
FIG. 8 is a diagram illustrating another example of processing for generating table parameters for the MCS processing section.

First, a plurality of patches (images for measurement) in which values of device colors R, G, B are independently changed are printed by the printing heads illustrated in FIG. 1. FIG. 8 illustrates distribution of colors of lattice points in a device color space, the lattice points having the number of total 3×3×3=27 and the colors of lattice points being printed on the basis of combinations of three gradation values (0, 128, 255) of respective colors. FIG. 8 illustrates a RGB color space in which reference numerals 801, 802 and 803 indicate red axis, green axis and blue axis, respectively. Lattice points indicated by filled circles represent colors to perform patch printing. Lattice points indicated by reference numerals 804 to 806 are the colors described as examples in the aforementioned embodiment; the reference numerals 804, 805 and 806 indicate cyan, magenta and blue colors, respectively. A table structure indicated by these lattice points in FIG. 8 is the same as that described with reference to FIGS. 5A and 5B, except for how to generate correction data for points other than the 27 lattice points as follows. First, a patch is printed on the basis of device colors (Rn, Gn, Bn) for each of the 27 lattice points, and each patch is subject to colorimetry to obtain a measurement value (Rp, Gp, Bp) for each patch. Next, a patch is printed on the basis of device colors (Ri, Gi, Bi) for the points other than the 27 lattice points, and these patches are measured to obtain measurement values (Rt, Gt, Bt). Next, the patch colors (Rp, Gp, Bp) that are most similar to the measurement values (Rt, Gt, Bt) are selected to obtain device colors (Rn, Gn, Bn) corresponding to the selected patch colors. How to select the most similar patch colors is as follows:

$$\sqrt{(Rt-Rp)^2+(Gt-Gp)^2+(Bt-Bp)^2} \quad \text{[Expression 2]}$$

A patch to print (Rp, Gp, Bp) is selected such that the solution of the above expression is minimum. Then, for device colors (Ri, Gi, Bi), a correction table is generated on the basis of a correction table of device colors (Rn, Gn, Bn) and is used as a table to be used in the MCS processing section. Practically, accuracy of correction other than the 27 lattice points can be improved by printing in more gradation values than those illustrated in FIG. 8, or by using a known method, such as interpolating a plurality of patches during estimation. A known interpolation method includes tetrahedral interpolation and cubic interpolation. In tetrahedral interpolation, calculation may be performed by interpolating from surrounding four lattice points forming a tetrahedral containing measurement values (Rt, Gt, Bt). In cubic interpolation, calculation may be performed by interpolating from surrounding eight lattice points forming a cube containing measurement values (Rt, Gt, Bt).

The aforementioned configuration is a basic configuration for color shift correction. In the present embodiment, a range of variations of nozzle ejection volumes is divided into a plurality of ranks, table parameters for the MCS processing section 404 are previously obtained, corresponding to a combination of each of the ranks and an ink color. Then, a patch is printed with each ink color in order to obtain a rank, and an optimal table parameter is selected from the previously obtained table parameters, on the basis of the obtained rank.

Specifically, for each of K, C, M, Y ink printing heads, table parameters for the MCS processing section corresponding to all combinations of printing characteristic ranks R[Y] are generated as described with respect to processing 510 in FIG. 5A. Then, the generated table parameters are stored in the HDD 303 of the host PC 300 (hereinafter referred to as a first processing).

Next, when table parameters for the MCS processing section are generated for the respective color printing heads actually used in the printing apparatus, the printing heads print respective images for measurement of their ink colors (primary colors). Then, these images for measurement are measured to obtain printing characteristic ranks R[Y] of the respective printing heads (rank acquisition). Then, a table parameter corresponding to the same combination as that of the obtained printing characteristic ranks R[Y] of the respective printing heads is selected and read from the HDD 303 of the host PC 300 (hereinafter referred to as a second processing).

This can reduce processing time for generating table parameters for the MCS processing section in an individual printing apparatus. In printing images for measurement, since images for measurement of only primary colors has only to be printed, the number of images can be reduced, and thereby the cost of printing papers can be reduced.

First, the first processing, that is, processing to generate table parameters for the MCS processing section corresponding to all combinations of printing characteristic ranks R[Y] will be described in detail.

Figure 9A:
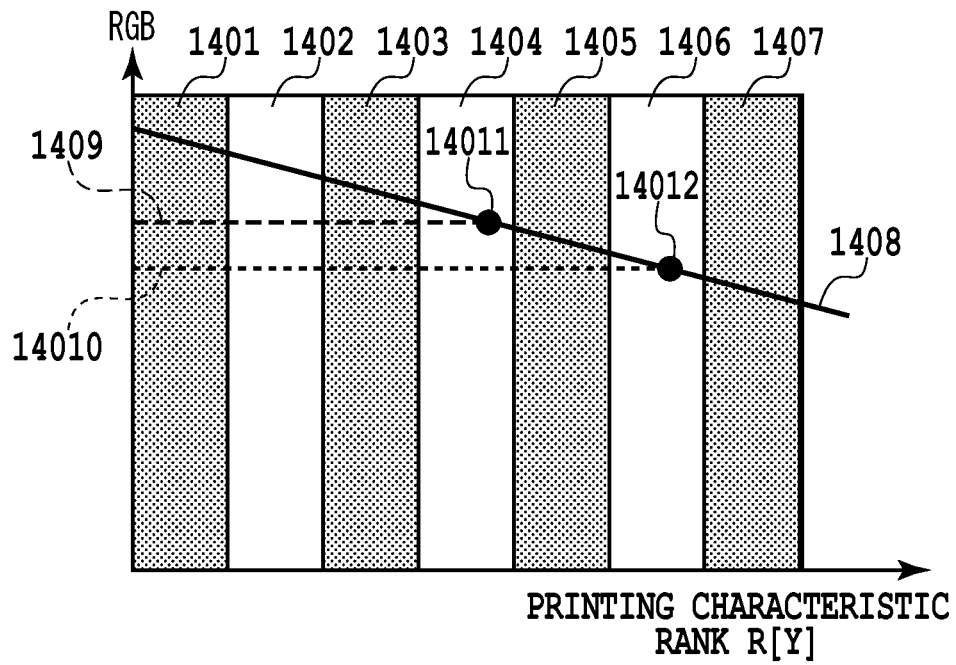
FIGS. 9A and 9B are diagrams illustrating printing characteristic ranks R[Y] according to one embodiment of the present invention.

FIG. 9A is a diagram illustrating a printing characteristic rank R[Y] according to the present embodiment. FIG. 9A illustrates an example of seven printing characteristic ranks 1401 to 1407 in the case of Y=1 to 7. These printing characteristic ranks are based on ejection volume information V[Y]; specifically, the range of nozzle ejection volume of each usable ink color printing head is divided into seven ranks in the above example.

In FIG. 9A, the horizontal axis indicates printing characteristic ranks R[Y] and the vertical axis indicates RGB values obtained with the scanner. In the printing characteristic ranks 1401 to 1407, the rank 1404 corresponds to a case where an ejection volume is standard; and the ranks 1401 to 1403 correspond to cases where ejection volumes are smaller than a standard volume, the rank 1401 corresponding to a case with smaller ejection volume in comparison with the rank 1403. Meanwhile, the ranks 1405 to 1407 correspond to cases where ejection volumes are larger than a standard volume, the rank 1407 corresponding to a case with larger ejection volume in comparison with the rank 1405.

In generating the table parameters corresponding to printing characteristic ranks [Y] as described above, for each of K, C, M, Y ink colors, the respective printing heads to eject ink of ejection volumes corresponding to seven ranks [Y] are first provided. Next, printing heads of 7^4 combinations that are composed of the combinations of four ink colors and seven ranks, are used to print images for measurement as described in step S502 of FIG. 5A. Then, as described with respect to steps S503 to S506 in FIG. 5A, 7^4 images for measurement are measured, and table parameters for the MCS processing section corresponding to 7^4 combinations are obtained on the basis of the measurement results.

In this way, table parameters corresponding to all combinations of the printing characteristic ranks R[Y] of each ink are generated and stored in the HDD 303 of the host PC 300. As apparent form the above, in the case where the number of printing characteristic ranks R[Y] of each ink color is seven, 7^4 (=2401) table parameters have only to be generated and stored in the memory.

Figure 9B:
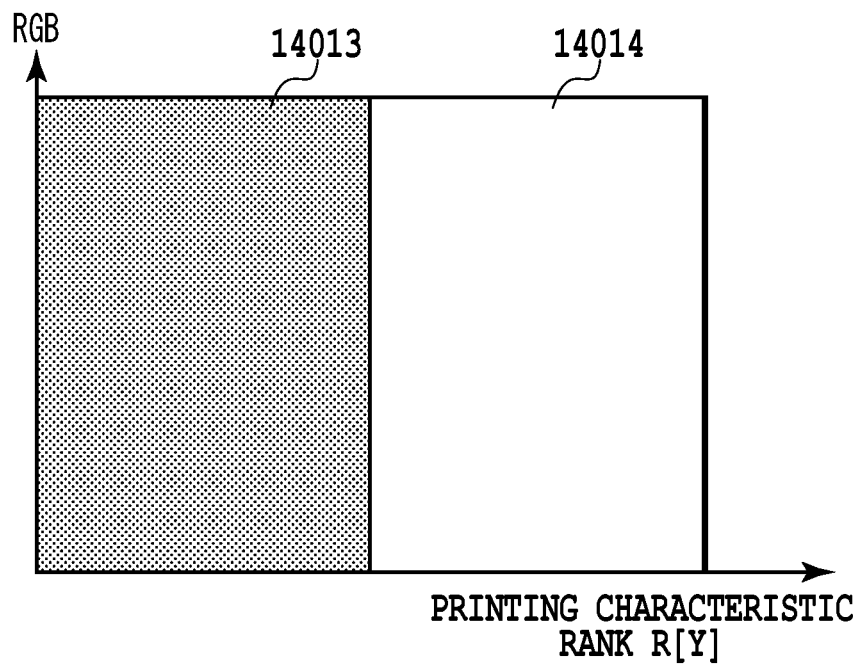

FIG. 9B is a diagram illustrating another example of printing characteristic ranks R[Y]. In this example, the range of ejection volumes is divided into two. In FIG. 9B, a rank 14013 corresponds to a case where an ejection volume is smaller than a standard volume, and a rank 19014 corresponds to a case where an ejection volume is larger than a standard volume. In this way, in the case where the number of the divided printing characteristic ranks R[Y] of each ink color is two, 2^4 (=16) table parameters have only to be generated and stored in the memory.

As illustrated in FIG. 9A, the more the number of the divided printing characteristic ranks R[Y] is, the more the number of combinations of ink colors and printing characteristic ranks R[Y] is, which increases the number of table parameters to be stored in the memory. On the contrary, as illustrated in FIG. 9B, the less the number of the divided printing characteristic ranks R[Y] is, the less the number of combinations of ink colors and printing characteristic ranks R[Y] is, which reduces the number of table parameters to be stored. In this case, however, a difference between the maximum ejection volume and the minimum ejection volume in an ejection volume range corresponding to one printing characteristic rank R[Y] becomes larger, as a result, reducing the accuracy of color shift correction with the use of table parameters. In this way, in the number of the divided printing characteristic ranks R[Y], there is a trade-off relation between the accuracy of color shift correction by table parameters for the MCS processing section and the number of generated parameters.

With respect to this accuracy, an ejection volume range covered by one printing characteristic rank R[Y] preferably has a size in which a color shift due to ejection volume variations cannot be visually recognized. The color difference value is preferably less than 0.8 as the color shift that cannot be visually recognized within the printing characteristic rank R[Y].

Next, a second processing, that is, processing for selecting a table parameter suitable for an actually-used printing head from the HDD 303 of the host PC 300 will be described in detail.

FIG. 10 is a flow chart illustrating the second processing. In FIG. 10, processing starts at step S1201. First, in step S1202, device color data C[X] is obtained by processing in the input color conversion processing section 903 in FIG. 4A, and an image for measurement is printed on a printing paper on the basis of this data. That is, in the same manner as processing S510 illustrated in FIG. 5A, the device color data C[X] is not subject to processing by the MCS processing section 404 and goes through a bypass processing path indicated by the dashed line 410 to the ink color conversion processing section 405 in FIG. 4A. Then, the device color data C[X] goes through the HS processing section 406, TRC processing section 407, quantization processing section 908 to the output section 409, where an image for measurement is printed on the printing paper 106.

This processing is different from processing S510 illustrated in FIG. 5A in that the device color data C[X] to print the image for measurement is only data that image data (K, C, M, Y) converted by the ink color conversion processing section 405 is (255, 0, 0, 0), (0, 255, 0, 0), (0, 0, 255, 0), (0, 0, 0, 255). That is, a primary color image is printed as the image for measurement.

Figure 11A:
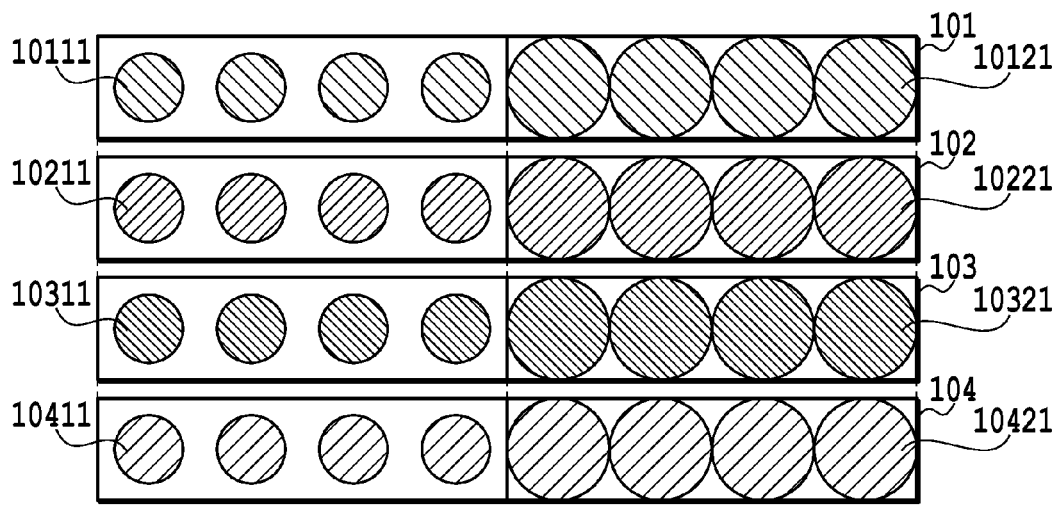
FIGS. 11A and 11B are diagrams illustrating printing examples of step S1202 of FIG. 10.
Figure 11B:
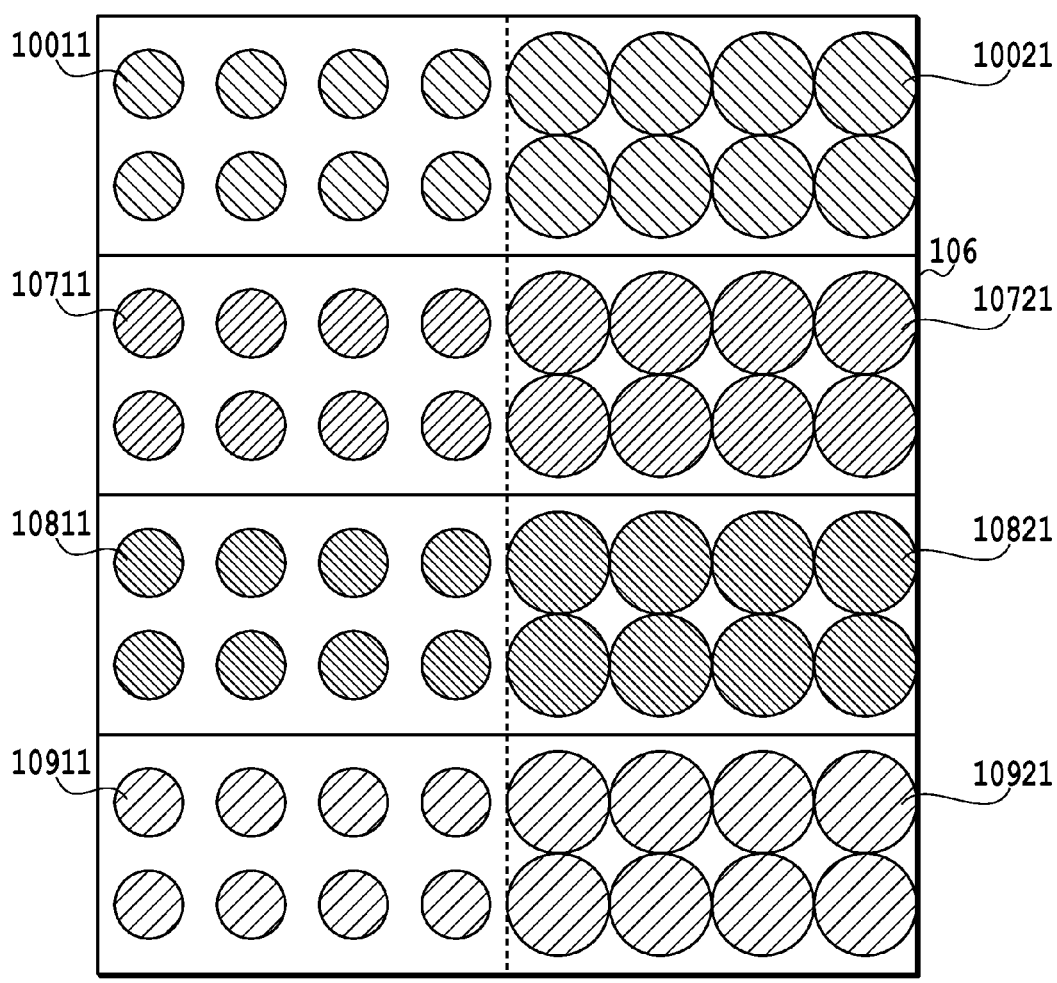

FIGS. 11A and 11B illustrate an example printed in step S1202. As illustrated in FIG. 11A, in all of the black ink printing head 101, cyan ink printing head 102, magenta ink printing head 103 and yellow ink printing head 109, four nozzles (10121, 10221, 10321, 10421) on the right in the FIG. 11A have larger ejection volumes than a standard ejection volume among eight nozzles. In this example, as illustrated in FIG. 11B, in all ink colors, four dots on the right in the FIG. 11B have larger size than a standard size.

Returning to FIG. 10, in step S1203, the image for measurement printed as described above is measured by the scanner to obtain ejection volume information V [X] for each area corresponding to respective nozzles. Similarly to processing S510 in FIG. 5A, this measurement has a measurement resolution of 600 dpi. Similarly to processing S510 in FIG. 5A, X of the ejection volume information V[X] is a value to specify an area whose resolution is 300 dpi. That is, ejection volume information is obtained for each area specified by X, and a printing characteristic rank R[X] is obtained on the basis of the information. The V[X] can be calculated from RGB values read by the scanner, L*a*b* measured by a colorimeter and so on. Alternatively, the ejection volume information V[X] may be obtained by measuring a nozzle diameter. If areas corresponding to four nozzles on the left and on the right in FIG. 11B are set to X=1 and X=2, respectively, V[2] is larger than V[1] for all of K, C, M, Y.

In FIG. 9A, reference numeral 1408 denotes a conversion parameter for converting RGB values read by the scanner to ejection volume information. This conversion parameter can be different from each other, depending on black, cyan, magenta and yellow inks. Here, in the case where the ejection volume of a nozzle A is smaller than that of a nozzle B due to ejection volume variations, the size of dots printed by the nozzle A is generally smaller than the size of dots printed by the nozzle B and therefore a printing density by the nozzle A is lower than that by the nozzle B. Therefore, RGB values obtained by measuring regions printed by the ejection nozzles A and B with the scanner and L*a*b obtained by measuring them by a colorimeter have the following relations.

$$L_A^* \geq L_B^*$$

$$R_A G_A B_A \text{value} \geq R_B G_B B_B \text{value}$$

Where $L_A^*$ is L value of the region printed by the nozzle A and $L_B^*$ is L* value of the region printed by the nozzle B; $R_A G_A B_A$ value is RGB value of the region printed by the nozzle A and $R_B G_B B_B$ value is RGB value of the region printed by the nozzle B. The RGB value also can be a complementary color for an ink color, for example, and has a higher sensitivity relative to the ink color. In the present embodiment, in an RGB value obtained by measuring a black ink with the scanner, since sensitivity of R, G, B all are similar, a value whose variation is larger depending on variations of ejection volumes is employed as the RGB value. In a cyan ink image, since R has a higher sensitivity, the value of R is employed as the RGB value. In a magenta ink image, the value of G is employed as the RGB value, and in an yellow ink image, the value of B is employed as the RGB value.

In FIG. 9A, a dashed line 1409 indicates $R_A G_A B_A$ value obtained by reading a region printed by a nozzle whose ejection volume is relatively small with the scanner. A dashed line 14010 indicates $R_B G_B B_B$ value obtained by reading a region printed by a printing head whose ejection volume is larger with the scanner. An intersection point of the RGB value read by the scanner and the conversion parameter 1408 is found. An intersection point 14011 indicates an intersection point of the $R_A G_A B_A$ value 1409 and conversion parameters 1908, and an intersection point 14012 indicates an intersection point of the $R_B G_B B_B$ value 14010 and conversion parameter 1908. The intersection point 14011 is within the rank 1909 in which an ejection volume is standard, and the intersection point 14012 is within the rank 1406 in which an ejection volume is larger than a standard ejection volume. This permits calculating that, in two printing heads having different ejection volumes, the printing head having relatively smaller ejection volume is within a rank of standard ejection volume and the printing head having relatively larger ejection volume is within a predetermined rank of larger ejection volume than a standard ejection volume. As described above, for each of K, C, M, Y ink colors, a printing characteristic rank R[Y] is calculated from ejection volume information V[X] for each area.

Next, in step S1204 of FIG. 10, a table parameter corresponding to the same combination of printing characteristic ranks as a combination of printing characteristic ranks of each of (a nozzle of) K, C, M, Y printing heads obtained in step S1203 are selected for each area from table parameters that correspond to all combinations of printing characteristic ranks of each of K, C, M, Y ink colors stored in the HDD 303 of the host PC. In the present embodiment, these selected table parameters for the MCS processing section are stored in the RAM 312 of the printer 100. It should be appreciated that these parameters may be transferred to the host PC 300 and stored in, e.g. the HDD 303. Alternatively, the processing in step S1204 may be performed as part of image processing illustrated in FIG. 4A during printing.

As described above, in the present embodiment, table parameters for the MCS processing section corresponding to all combinations of printing characteristic ranks R[Y] are previously stored in the memory, and a table parameter is selected depending on the printing characteristic rank R[Y] of an actually-used printing head (nozzle). This can reduce the operation time and printing cost for finding parameters.

(First Variation of First Embodiment)

Figure 4B:
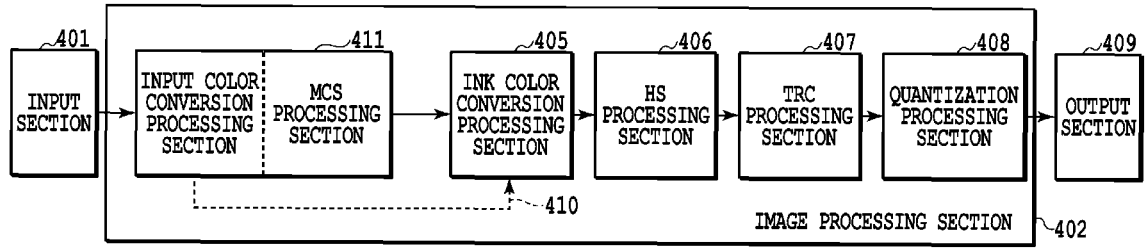

FIG. 4B is a block diagram illustrating a configuration of an image processing section in an inkjet printer according to a first variation. In FIG. 4B, since the respective sections indicated by Nos. 401 and 405 to 409 are identical to those indicated by the same Nos. in FIG. 4A, the explanation of them will be omitted. The configuration of the present variation is different from the configuration illustrated in FIG. 4A in that an input color conversion processing section and an MCS processing section are integrated as one processing section.

Specifically, an input color conversion processing & MCS processing section 411 uses one table generated by combining a table of the input color conversion processing section and a table of the MCS processing section. This allows for color shift correction processing directly on image data inputted from the input section 401, thereby outputting device color image data whose color shift has been reduced.

Figure 12A:
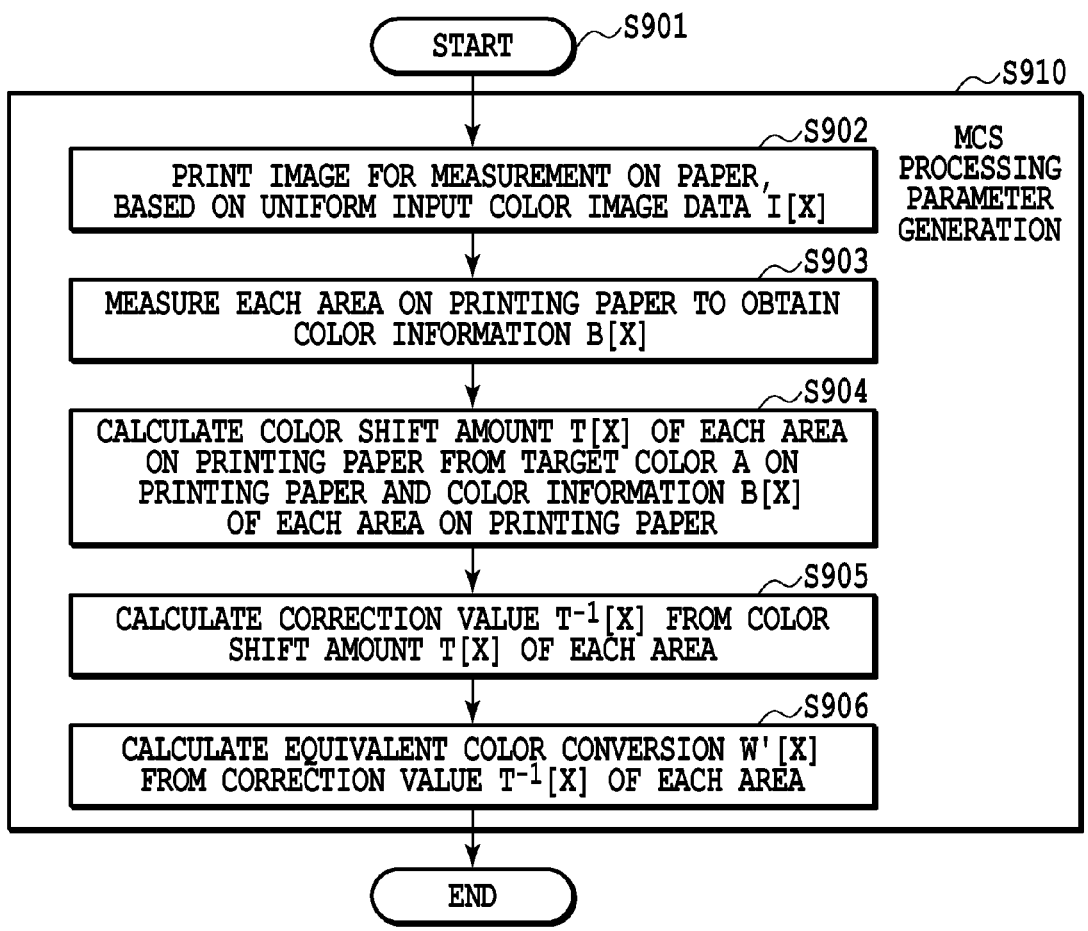
FIGS. 12A and 12B are flow charts, illustrating processing for generating table parameters for the MCS processing section and processing by the MCS processing section, respectively, according to a first variation of the first embodiment.
Figure 12B:
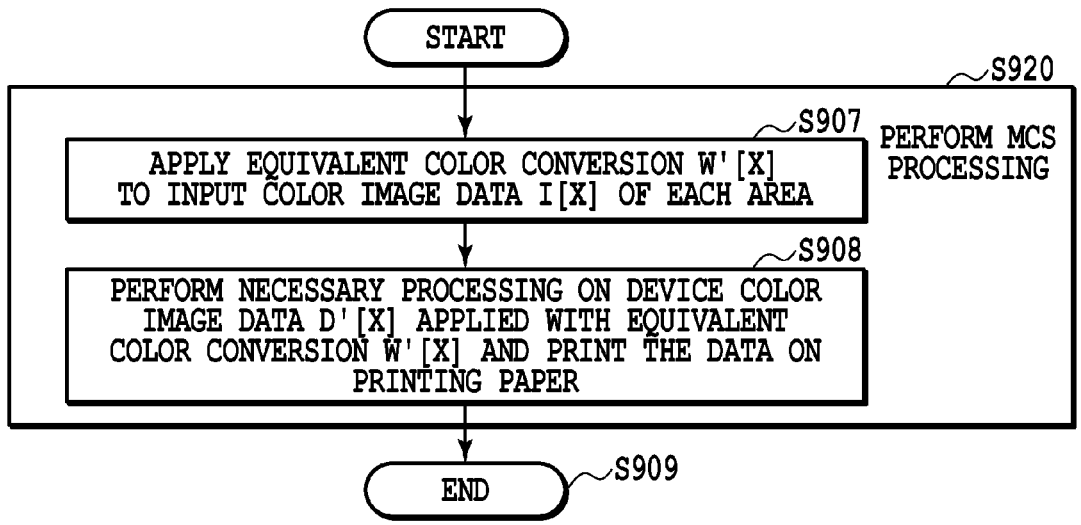

FIGS. 12A and 12B are flow charts, illustrating processing to generate table parameters for the MCS processing section and processing by the MCS processing section, respectively, according to the first variation, which are similar to those in FIGS. 5A and 5B. Processing S910 to generate table parameters for the MCS processing section in FIG. 12A are different from the processing S510 in FIG. 5A in processing of step S902 and step S906. The processing in step S902 and S906 will be described below.

In step S902, an image for measurement is printed for color shift correction on a printing paper, on the basis of color image data I[X] inputted from the input section 401. In doing so, in the input color conversion processing & MCS processing section 411, only a portion corresponding to the input color conversion processing section is made to function, and the MCS processing is skipped through a bypass processing path indicated by the dash line 410. Specifically, the input color conversion processing & MCS processing section 411 are configured to be able to use two tables by switching. That is, for input image data I[X], a table having color conversion W' in which the input color conversion processing and the processing of the MCS processing section are combined, which will be described below, as table parameters and a table having table parameters of only the input color conversion processing are switched to be used. In printing an image for measurement, the table of only the input color conversion processing is used by switching.

If a color conversion coefficient of input color conversion processing with this table used for printing an image for measurement is set to be a input color conversion W, then, the following expression is established: device color data D[X]=input color conversion W (input image data I[X]). Uniform device color image data D[X] obtained in this way, similarly to the first embodiment, proceeds through the ink color conversion processing section 405, HS processing section 406, TRC processing section 407 and quantization processing section 408 to the output section 409, where the data is printed on the printing paper 106 as an image for measurement.

In step S906, an equivalent color conversion W'[X] as a table parameter is calculated from a correction value $T^{-1}[X]$ for each area. This W'[X] is color conversion that combines the input color conversion W and equivalent color correction $Z^{-1}[X]$. Calculation processing of the equivalent color correction $Z^{-1}[X]$ is the same as that of the first embodiment and therefore will not be described.

In processing S920 in FIG. 12B, which are processing in the input color conversion processing & MCS processing section 411 in generating print data, the equivalent color conversion W'[X] generated as above as a table parameter is used to correct a color shift. That is, color shift correction is performed on input color image data I[X] corresponding to each area and device color image data D'[X] that was subject to color shift correction is outputted. Then, the device color image data D'[X] is subject to processing in the ink color conversion processing section 405 and the later sections, and printed on the printing paper in the output section 409.

According to the aforementioned variation, since equivalent color conversion W'[X] is set in step S906 so that device color image data D'[X] has the same value as that of the first embodiment, a color shift can be reduced in the same manner as the first embodiment. Combined color conversion $W^{-1}[X]$ of equivalent color correction $Z^{-1}[X]$ and input color conversion W is stored as one three-dimensional lookup table. This can reduce the number of times to see the lookup table from twice to once in generating print data in comparison with the first embodiment, thereby improving a processing speed.

According to the present variation, in the same manner as the first embodiment, on the basis of ranks of nozzle ejection volumes, table parameters for the input color conversion processing & MCS processing section 411 are previously obtained so that the table parameters correspond to combinations of the ranks and ink colors.

That is, the same processing as the processing illustrated in FIG. 10 according to the first embodiment is performed.

Specifically, similarly to steps S1202, S1203 in FIG. 10, table parameters for the MCS processing that correspond to all combinations of a printing characteristic rank R[Y] of each nozzle of KCMY ink are generated in the method described with reference to FIG. 12A, and stored in the HDD of the host PC.

In the same manner as step S1204, a table parameter for MCS processing that corresponds to a combination of printing characteristic rank R[Y] of each of K, M, C, Y for each area is selected from the table parameters for MCS processing that correspond to all combinations of KCMY printing characteristic ranks R[Y] stored in the HDD of the host PC.
(Second Variation of First Embodiment)

Figure 4C:
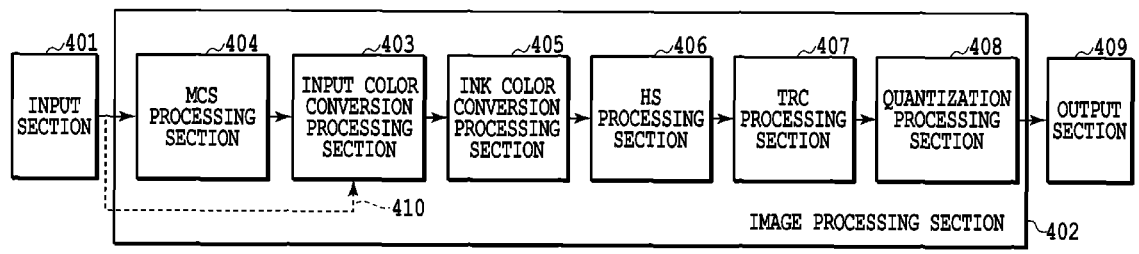

FIG. 4C is a block diagram illustrating a configuration of an image processing section according to a second variation of the first embodiment. As illustrated in FIG. 4C, in the present variation, processing by the MCS processing section 404 is performed before processing by the input color conversion processing section 403.

Figure 13A:
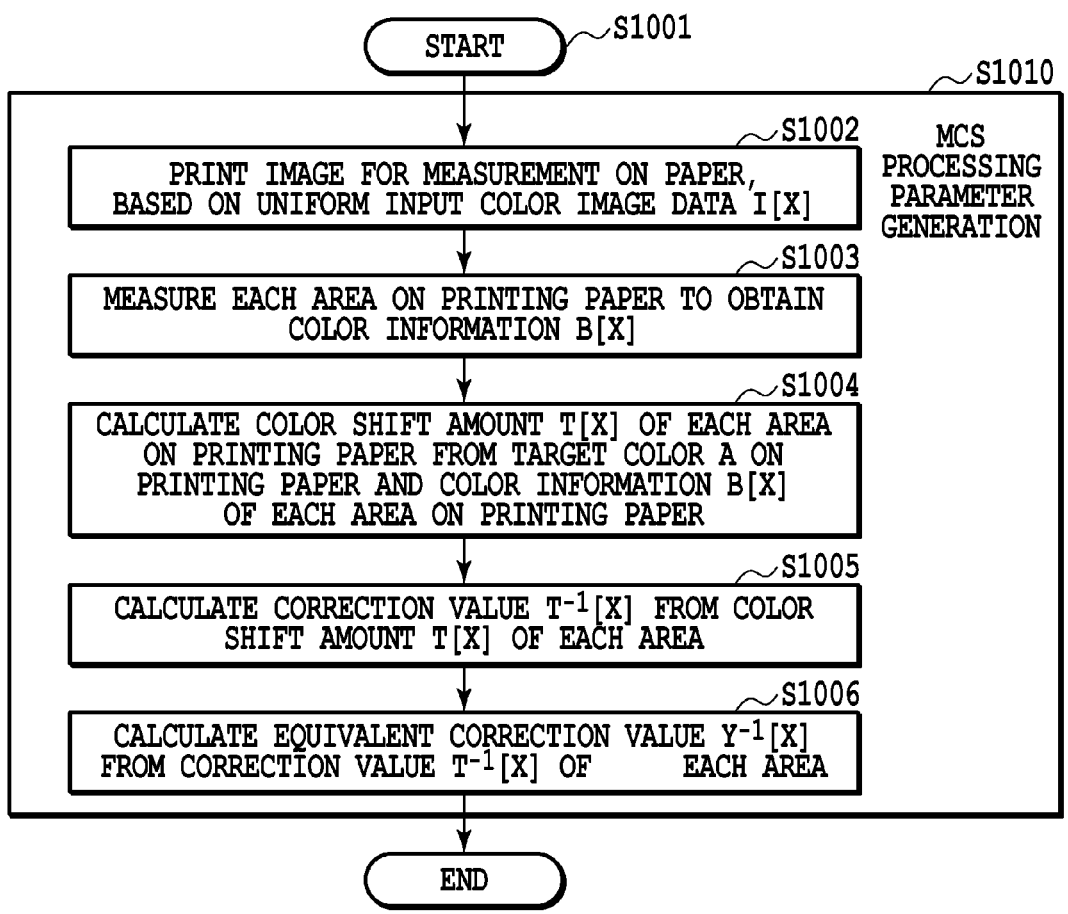
FIGS. 13A and 13B are flow charts, illustrating processing for generating table parameters for the MCS processing section and processing by the MCS processing section, respectively, according to a second variation of the first embodiment.
Figure 13B:
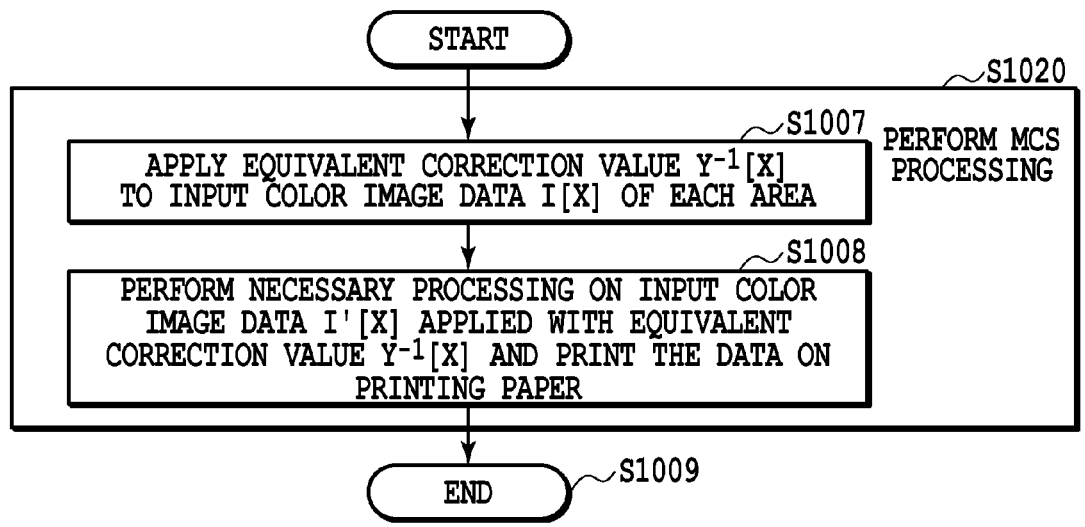

FIGS. 13A and 13B are flow charts, illustrating processing to generating table parameters for the MCS processing section and processing by the MCS processing section, according to the second variation, respectively, which illustrate the similar processing illustrated in FIGS. 5A and 5B. In processing S1010 in FIG. 13A, processing in steps S1002 and S1006 are different from processing in FIG. 5A, which will be described below.

In step S1002, input color image data I[X] from the input section 401 bypasses the MCS processing section 404 to the input color conversion processing section 403, where input color image data I[X] is converted to device color D[X]. After that, in the same manner as FIG. 5A according to the first embodiment, device color D[X] proceeds through the ink color conversion processing section 405, HS processing section 406, TRC processing section 407 and quantization processing section 408 to the output section 409, where an image for measurement is printed on the printing paper 106. Then, in step S1006, an equivalent correction value $Y^{-1}[X]$ to correct a color of an input color space is calculated. The equivalent correction value $Y^{-1}[X]$ is a correction value to correct an input color equivalent to an equivalent correction value $Z^{-1}[X]$, which is calculated in step S506 of FIG. 5A, to correct a color of a device color space. The calculation processing of the equivalent correction value $Y^{-1}[X]$ is the same as that of the first embodiment and therefore will not be described here.

Next, the procedure of processing S1020 in FIG. 13B will be as follows. In FIG. 13B, in step S1007, the MCS processing section 404 performs correction in such a way that an equivalent correction value $Y^{-1}[X]$ is applied to input color image data I[X] for each area, using the table generated in the processing S1010. Then in step S1008, the input color image data I'[X] that was corrected by the equivalent correction value $Y^{-1}[X]$ is converted to device color image data D'[X] in the input color conversion processing section 405. Processing later than that is the same as that of the first embodiment and therefore will not be described here.

According to the present variation, processing by the MCS processing section 404 is performed before processing by the input color conversion processing section 403, thereby improving independence of modules. For example, the present variation can be applied, as an expanded function, to an image processing section that does not include a MCS processing section. Or, the processing can be performed in the host PC.

In the present variation, in the same manner as the first embodiment, on the basis of ranks of nozzle ejection volumes, table parameters for the MCS processing section 404 are obtained in such a way that the table parameters correspond to combinations of the ranks and ink colors.

That is, the same processing as processing illustrated in FIG. 10 according to the first embodiment is performed. Specifically, in the same manner as steps S1202 and S1203 in FIG. 10, table parameters for the MCS processing section are generated in such a way that the table parameters correspond to all combinations of the printing characteristic rank R[Y] of each nozzle of KCMY inks in the method described with reference to FIG. 13A and stored in the HDD 303 of the host PC.

Then, in the same manner as step S1204, a table parameter for the MCS processing that corresponds to printing characteristic rank R[Y] of each of K, M, C, Y is selected for each area from the table parameters for the MCS processing that correspond to all combinations of the printing characteristic ranks R[Y] of KCMY stored in the HDD 303 of the host PC.

(Third Variation of First Embodiment)

Figure 4D:
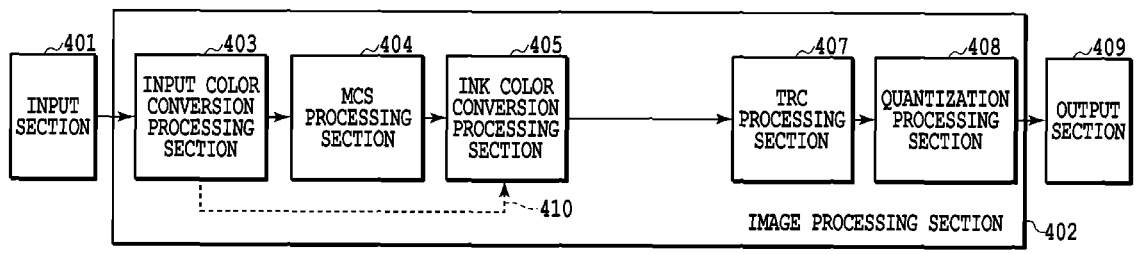

FIG. 4D is a block diagram illustrating a configuration of an image processing section according to a third variation of the first embodiment. As illustrated in FIG. 4D, the present variation relates to a mode in which the HS processing section 406 illustrated in FIG. 4A is not employed.

Processing to generate table parameters for the MCS processing section and processing by the MCS processing section in the present variation are the same as processing illustrated in FIGS. 5A and 5B according to the first embodiment except that head shading is not performed in the HS processing section in the present variation. That is, HS processing is not performed before step S502 illustrated in FIG. 5A.

Figure 14A:
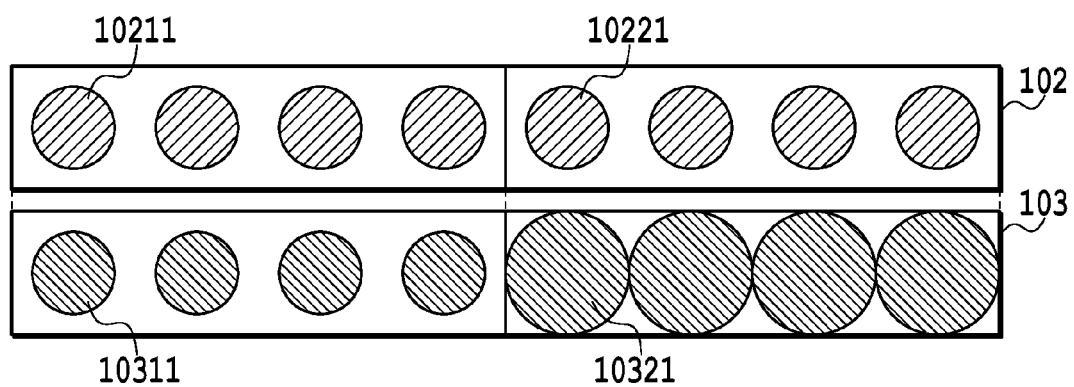
FIGS. 14A and 14B are diagrams illustrating printing examples of an image for measurement in step S502 of FIG. 5A according to a third variation of the first embodiment.
Figure 14B:
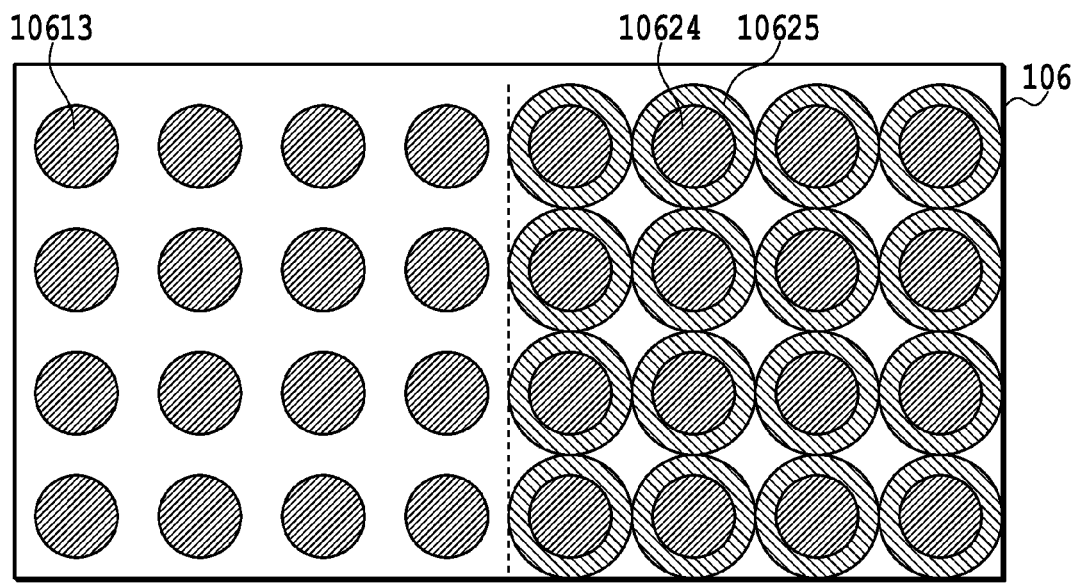

FIGS. 14A and 14B are diagrams illustrating printing examples of an image for measurement of step S502 in FIG. 5A according to the present variation, which are similar to the diagrams illustrated in FIGS. 6A and 6B. As illustrated in FIG. 143, since HS processing is not performed in printing of an image for measurement, the number of printed dots is the same between a region corresponding to four nozzles on the left in the FIG. 14B and a region corresponding to four nozzles on the right in the FIG. 14B. As a result, the color of the region on the right has a stronger magenta cast in comparison with the example illustrated in FIG. 6B according to the first embodiment. As a result, in generating table parameters in processing S510 illustrated FIG. 5A, a correction value to reduce magenta color is generated. This enables a correction value for obtaining a printing result illustrated in FIG. 7B to be a table parameter for the MCS processing, thereby reducing a color shift without performing HS processing.

In addition, direct effects of not performing HS processing include: the increase of a processing speed, the reduction of resources such as a table for HS processing, the reduction of processing steps without performing "printing", "measurement" or "correction parameter generation" for HS processing.

In the present variation, in the same manner as the first embodiment, on the basis of ranks of nozzle ejection volumes, table parameters for the MCS processing section 409 are previously obtained in such a way that the table parameters correspond to combinations of these ranks and ink colors.

That is, the same processing as processing illustrated in FIG. 10 according to the first embodiment is performed. Specifically, in the same manner as steps S1202 and S1203 illustrated in FIG. 10, table parameters for MCS processing are generated in such a way that the table parameters correspond to all combinations of printing characteristic rank R[Y] of each nozzle of KCMY inks by the method described with reference to FIG. 5A, and are stored in the HDD 300 of the host PC.

In the same manner as step S1204, a table parameter for the MCS processing corresponding to a combination of printing characteristic rank R[Y] of each of K, C, M, Y is selected for each area from table parameters for MCS processing that correspond to all combinations of printing characteristic ranks of K, C, M, Y stored in the HDD 303 of the host PC.

(Fourth Variation of First Embodiment)

With respect to the number of printing characteristic ranks R[Y] described with reference to the first embodiment, as the number of printing characteristic ranks R[Y] increases, the number of table parameters for MCS processing previously stored in the memory increases. On the other hand, as the number of printing characteristic ranks R[Y] is reduced, the accuracy to correct the color shift is reduced. Therefore, in the present variation, although the number of printing characteristic ranks R[Y] are increased as much as possible, a representative rank N (M>N≥1) is set from printing characteristic ranks R[Y] for each of K, C, M, Y. Then, table parameters for the MCS processing are generated for only combinations of the representative ranks of each of K, C, M, Y; and with respect to printing characteristic ranks R[Y] other than the representative ranks, table parameters are generated by interpolation operation using the table parameters of the representative ranks for the MCS processing. In this way, since table parameters of the MCS processing are generated only for the representative ranks, there is a benefit of reducing resources such as a table stored in the memory, in comparison with the first embodiment.

Figure 15:
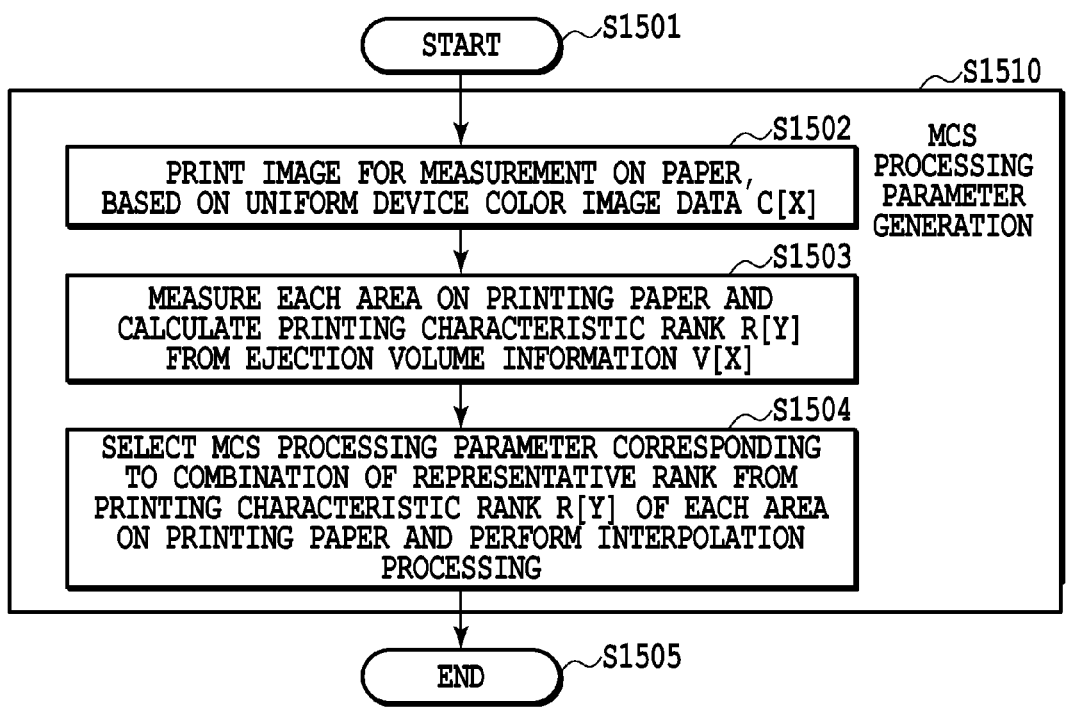
FIG. 15 is a flow chart illustrating processing for selecting table parameters suitable for a printing head by using printing characteristic ranks according to a fourth variation of the first embodiment.
Figure 16A:
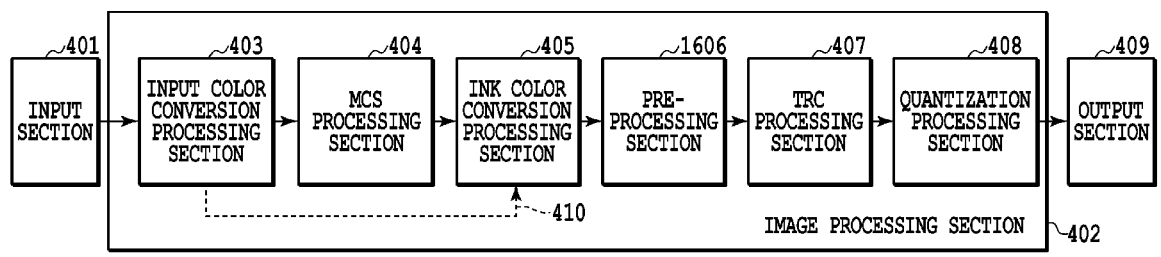
FIGS. 16A to 16C are block diagrams, each illustrating a configuration of an image processing section to perform image processing relating to print data generation according to the fourth variation of the first embodiment or variations thereof.

FIG. 15 is a flow chart illustrating processing to select a table parameter suitable for an actually-used printing head from the HDD 303 of the host PC 300, according to the present variation, which is similar to FIG. 10 according to the first embodiment. FIG. 16A is a block diagram illustrating a configuration of an image processing section to perform image processing relating to print data generation according to the present fourth variation, which is similar to FIG. 4A.

The configuration illustrated in FIG. 16A is different from that illustrated in FIG. 4A in that a preprocessing section 1606 is disposed instead of the HS processing section. This preprocessing section 1606 receives an input of ink color data and converts the ink color data to ink color data corresponding to an ejection volume of a nozzle composing each printing head for each ink color. The relation between the change of an ejection volume and a change of a printing density is not generally linear.

Figure 17A:
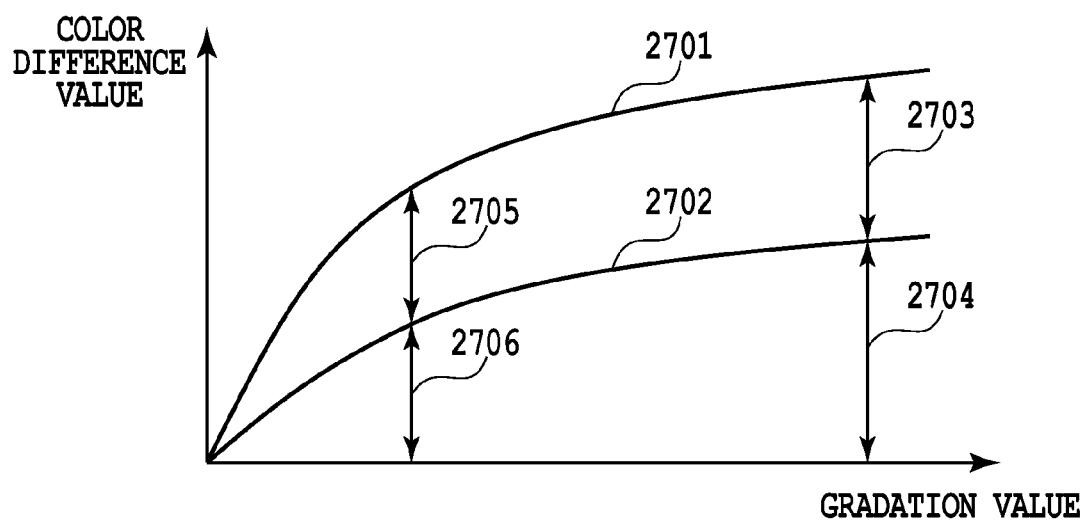
FIG. 17A is a diagram illustrating a color difference value between a color printed with a nozzle having a standard ejection volume and a color printed with a nozzle having a nonstandard ejection volume according to the fourth variation of the first embodiment.

FIG. 17A is a diagram illustrating a color difference value between a color printed with a nozzle having a standard ejection volume and a color printed with a nozzle having a nonstandard ejection volume. Specifically, FIG. 17A illustrates a color difference value between a color printed with a nozzle having a standard ejection volume of black ink and a color printed with a nozzle having a nonstandard ejection volume of black ink, for each color of gradation values of 0 to 255, based on the R, G, B signal values prior to being subject to processing by the preprocessing section 1606.

Here, a color difference value is a distance between (L1*, a1*, b1*) and (L2*, a2*, b2*) which are two colors in a CIEL*a*b* color space, which is represented by the following expression.

$$\text{color difference value} = (L2^* - L2^*)^2 + (a1^* - a2^*)^2 + (b1^* - b2^*)^2 \quad \text{[Expression 3]}$$

In the present example, a standard ejection volume is a target ejection volume in design. However, a standard ejection volume is not limited to this, but may be an ejection volume of the center of distribution of manufacturing tolerances as the result of performing manufacturing so as to be a design target ejection volume.

In FIG. 17A, reference numeral 2701 denotes a color difference values between a color printed with a nozzle whose ejection volume is different from a standard ejection volume by X[%] and a color with a nozzle having a standard ejection volume; and reference numeral 2702 denotes a color difference value between a color printed with a nozzle whose ejection volume is different from a standard ejection volume by 2X[%] and a color with a nozzle having a standard ejection volume. Here, with respect to nozzles whose color difference values are the values 2701 and 2702, differences of ejection volumes due to variations have a linear relation.

In FIG. 17A, reference numeral 2703 denotes a difference between the two color difference values 2701 and 2702 in a high gradation value region where the number of printed dots per unit area is larger, and reference numeral 2704 denotes the color difference value 2702 in the high gradation value region. Meanwhile, reference numeral 2705 denotes a difference between the two color difference values 2701 and 2702 in a low gradation value region where the number of printed dots per unit area is smaller, and reference numeral 2706 denotes the color difference value 2702 in the low gradation value region.

As can be seen from these color difference values and differences thereof, since the number of dots printed on the printing paper is larger in the high gradation value region, a change of density relative to a change of an ejection volume (change between X % and 2X %) is small. Therefore, the difference 2703 of the color difference values is not equal to the color difference value 2704. Meanwhile, since the number of dots printed on the printing paper is smaller in the low gradation value region, a change of density relative to a change of an ejection volume is relatively large in comparison with the high gradation value region. As a result, the difference 2705 of the color difference values is approximately equal to the color difference value 2706.

The preprocessing section 1606 performs correction processing to make a relation between the change of density and the change of an ejection volume depending on a gradation value linear. This processing is performed for each ink color.

Figure 17B:
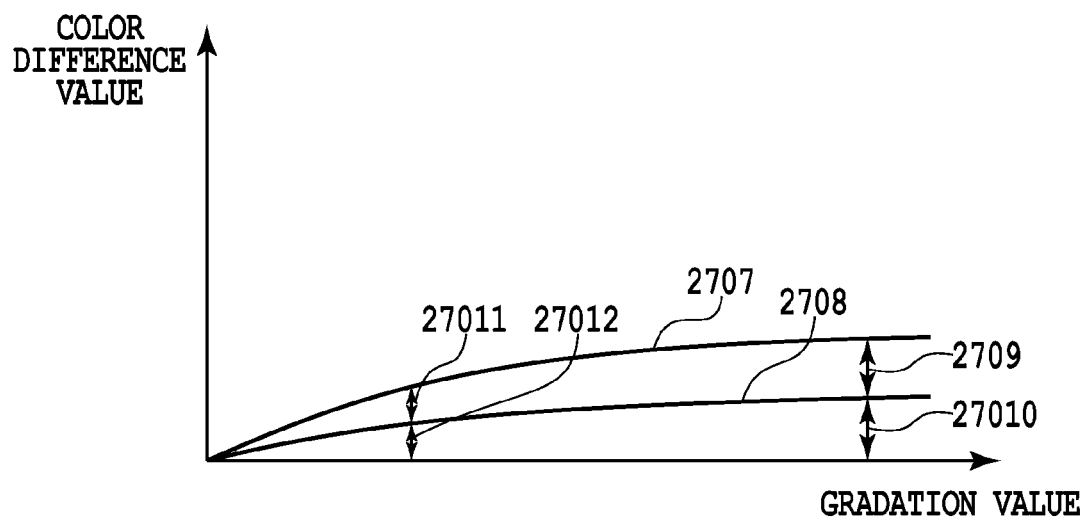
FIG. 17B is a diagram illustrating a color difference value between a color printed with a nozzle having a standard ejection volume and a color printed with a nozzle having a nonstandard ejection volume, based on ink color data that were subject to preprocessing.

FIG. 17B is a diagram illustrating a color difference value between a color printed with a nozzle having a standard ejection volume and a color printed with a nozzle having a nonstandard ejection volume, based on ink color data that has been subjected to preprocessing by the preprocessing section 1606, which is similar to FIG. 17A. In FIG. 17B, color difference values 2707 and 2708 correspond to values 2701 and 2702 in FIG. 17A, respectively.

As can be seen from FIG. 17B, preprocessing makes a difference 2709 of the color difference values and a color difference value 27010 approximately equal to each other even in the high gradation value region. Also in the low gradation value region, a difference 27011 of the color difference values and the color difference value 27012 are approximately equal to each other.

In this way, the preprocessing section 1606 performs processing so that the change of a printing density is linear relative to the change of an ejection volume. As the result, if interpolation processing is applied to ranks other than the ranks of the representative values of printing characteristic ranks R[Y], correction can be performed with a high accuracy. Specifically, in the preprocessing section, preprocessing is performed by a method such as processing that uses a one-dimensional lookup table in which an input value (ink color data) is associated with an output value (ink color data) for each printing characteristic rank R[Y].

Processing S1510 to generate table parameters for the MCS processing section according to the present variation will be described with reference to FIG. 15.

Generation of table parameters for the MCS processing section for combinations of the representative ranks, which is previously performed prior to the processing in FIG. 15, is performed in the method described with reference to the first embodiment. In this method, after application of HS processing, table parameters for the MCS processing section are generated. However, in the present variation, after preprocessing by the preprocessing section 1606, parameters for the MCS processing are generated for all combinations of the representative ranks.

In FIG. 15, step S1504 is different from processing illustrated in FIG. 10 according to the first embodiment and will be described below.

Printing characteristic ranks R[Y] of each color are obtained, and MCS processing parameters corresponding to the representative ranks to be used for interpolation processing are selected from the obtained printing characteristic ranks R[Y] and are subjected to interpolation processing. Interpolation processing will be described in detail below.

A dimension for selecting parameters for MCS processing corresponding to the representative ranks and performing interpolation operation varies depending on ink types that can be used by a printer for printing. In the present embodiment, since four inks of K, C, M, Y are used, a four-dimensional space is employed. Therefore, in the present variation, processing for selecting representative parameters for MCS processing and generating parameters for MCS processing by interpolation operation is performed in the four-dimensional space. To simplify description and illustration, an example of cyan and magenta printing heads in a two-dimensional space will be described, and will be extended to N-dimensional space, later. Interpolation processing in the four-dimensional space according to the present embodiment can be realized by setting N of N-dimensional to N=4.

Figure 18A:
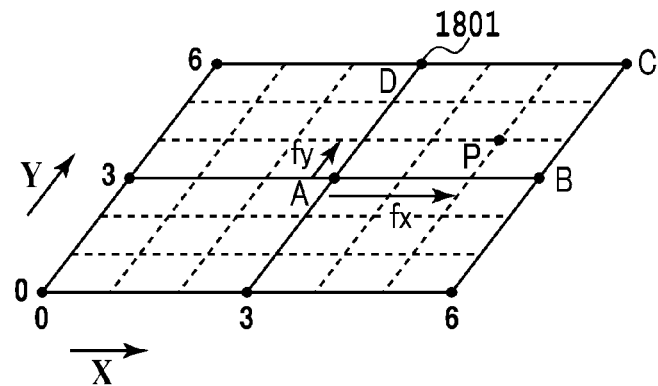
FIG. 18A is a diagram illustrating how to select table parameters when selecting the table parameters for MCS processing corresponding to a combination of representative ranks in step S1504 of FIG. 15.

FIG. 18A is a diagram illustrating how to select table parameters for MCS processing corresponding to combinations of representative ranks in step S1504 of FIG. 15. In FIG. 18A, X direction indicates a rank number of printing characteristic rank R[Y] of a cyan ink nozzle, and Y direction indicates a rank number of printing characteristic rank R[Y] of a magenta ink nozzle.

Respective values in X and Y directions are divided into k levels, and one lattice point is provided to each of these potions. In the present variation illustrated in FIG. 18A, the regions of values of the printing characteristic ranks R[Y] are divided into seven levels from zero to six, and by selecting k=3, three lattice points occur according to (7/3)+1=3. The numbers of these lattice points are set to be 0, 1, 2. This allocates 3×3=9 lattice points to a two-dimensional plane. Reference numeral 1801 denotes a lattice point having an MCS processing parameter corresponding to a representative rank. In FIG. 18A, representative MCS processing parameters of nine lattice points are parameters to correct a color shift, corresponding to combinations of representative ranks set from printing characteristic ranks R[Y].

Printing characteristic ranks of cyan and magenta nozzles calculated in step S1503 of FIG. 15 are set to be $R_C[Y]$ and $R_M[Y]$, respectively. In this case, an MCS processing table parameter $MCS_P$ that corresponds to printing characteristic rank of a point P having rank components $R_C[Y]$ and $R_M[Y]$ is calculated by interpolation processing. First, a sub-square ABCE containing the point P to be interpolated is obtained. Lattice points numbers of respective apexes of the sub-square ABCD are (XA, YA)=(1, 1), (XB, YB)=(2, 1), (XC, YC)=(2, 2), (XD, YD)=(1, 2). XA indicates a lattice point number of a lattice point A in the X direction, and YA indicates a lattice point number of a lattice point A in the Y direction. XB, YB, XC, YC, XD and YD are similar to XA and YA. In this case, components $R_C[Y]$ and $R_M[Y]$ are defined as follows, using a lattice point number, a multiple number of k and a remainder value.

$R_C[Y]=XA\times k+fx$ $R_M[X]=YA\times k+fy$ where remainder values fx, fy indicate a position of the point P within the sub-square ABCD.

Next, linear interpolation is performed in X and Y directions in order to calculate table parameters for the MCS processing. For example, the sub-square ABCD is divided into a triangle ABC and a triangle ACD by a diagonal AC. The linear interpolation in the X and Y directions is performed by using MCS processing parameters of apexes (lattice points) of the triangles. If fx≥fy, the point P is inside the triangle ABC. Therefore, the linear interpolation in the X and Y directions is performed using MCS processing parameters of apexes A, B, C. If fx<fy, the point P is inside the triangle ACD. Therefore, the linear interpolation in the X and Y directions is performed using MCS processing parameters of apexes A, C, D. In this way, a plane where the linear interpolation is performed varies depending on the remainder values, fx and fy.

First, a case in which fx≥fy will be described.

Figure 18B:
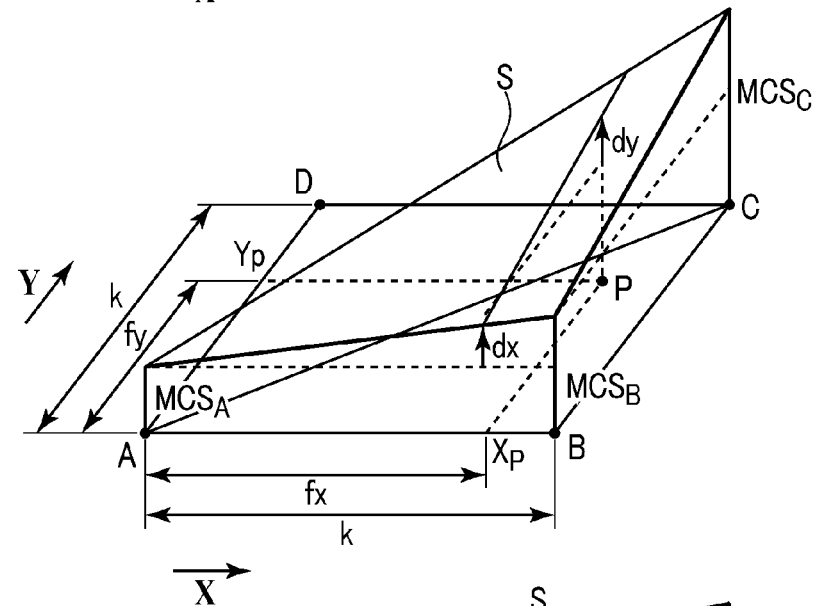
FIG. 18B is a diagram illustrating a sub-square ABCD in FIG. 18A, in which a point P is within a triangle ABC.

FIG. 18B is a diagram illustrating a sub-square ABCD in FIG. 18A, in which the point P is within the triangle ABC. MCS processing parameters of the apexes A, B, C are set to be holding values, and an interpolation surface S is developed among the holding values $MCS_A$, $MCS_B$ and $MCS_C$. The position of the point P relative to the point A as a reference point is determined based on the remainder values fx and fy. First, a point with a distance of fx from the point A in the X direction is set to the point $X_P$, and at the point $X_P$, an intermediate value $MCS_{XP}$ is interpolated. Next, a point with a distance of fy from the point A in the Y direction is set to the point $Y_P$, and at the point $Y_P$, an intermediate value $MCS_P$ is interpolated. From FIG. 18B, the following expression is established.

$MCS_{XP}=MCS_A+dx$ $MCS_P=MCS_{XP}+dy=MCS_A+dx+dy$ (Expression 1)

where dx can be obtained from holding values $MCS_A$ and $MCS_B$ by the relation between fx and k, as follows:

$dx=(MCS_B-MCS_A)\times fx/k$

And, dy can be obtained from holding values $MCS_B$ and $MCS_C$ by the relation between fy and k, as follows:

$dy=(MCS_C-MCS_B)\times fy/k$

By substituting dx and dy to Expression 1, Expression 1 becomes as follows:

$$\begin{aligned}MCS_P &= MCS_A + (MCS_A - MCS_A)\times fx/k + \\ &\quad (MCS_C - MCS_B)\times fy/k \\ &= 1/k\times\{MCS_A\times k + \\ &\quad (MCS_B - MCS_A)\times fx + \\ &\quad (MCS_C - MCS_B)\times fy\} \\ &= 1/k\times\{MCS_A\times(k-fx) + MCS_B\times \\ &\quad (fx-fy) + MCS_C\times fy\}\end{aligned}$$ (Expression 2)

Next, a case in which fx<fy will be described.

Figure 18C:
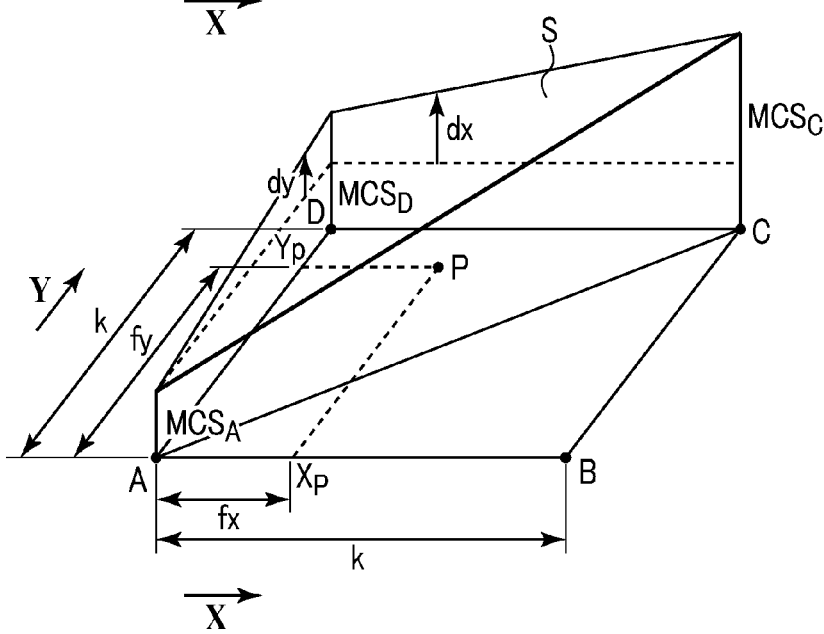
FIG. 18C is a diagram illustrating the sub-square ABCD in FIG. 18A, in which the point P is within a triangle ACD.

FIG. 18C is a diagram illustrating the sub-square ABCD in FIG. 18A, in which the point P is within a triangle ACD. MCS processing parameters of the apexes A, C, D are set to be holding values, an interpolation surface S is developed among the holding values $MCS_A$, $MCS_C$ and $MCS_D$. A position of the point P relative to the point A as a reference point is determined based on the remainder values fx and fy. First, a point with a distance of fx from the point A in the X direction is determined to be the point $X_P$, and at the point $X_P$, an intermediate value $MCS_{XP}$ is interpolated. Next, a point with a distance of fy from the point A in the Y direction is determined to be the point $Y_P$, and at the point $Y_P$, an intermediate value $MCS_P$ is interpolated. From FIG. 18C, the following expression is established.

$MCS_{xp}=MCS_A+dy$ $MCS_P=MCS_{xp}+dx=MCS_A+dy+dx$ (Expression 3)

Where dy can be obtained from the holding values $MCS_A$ and $MCS_D$ by the relation between fy and k as follows:

$dy=(MCS_D-MCS_A)\times fy/k$

And, dx can be obtained from the holding values $MCS_D$ and $MCS_C$ by the relation between fx and k as follows:

$dx=(MCS_C-MCS_D)\times fx/k$

By substituting dx and dy to Expression 3, Expression 3 becomes as follows:

$MCS_P=1/k\times\{MCS_A\times(k-fy)+MCS_D\times(fy-fx)+MCS_C\times fx\}$ (Expression 4)

In this way, if the point P is within the triangle ABC or ACD, interpolation can be performed for each of the triangles.

A larger one of the remainder values fx and fy is represented by fl, and a smaller one of those is represented by fs. $MCS_1$ indicates a holding value of an apex adjacent to a reference point A in a fl direction and $MCS_S$ indicates a holding value of an apex adjacent to the apex whose holding value is $MCS_1$ in a fs direction.

The remainder values fl and fs and holding values MCS and MCS can be used to integrate Expressions 2 and 4 into one interpolation rule indicated by the following Expression 5.

$MCS_P=1/k\times\{MCS_A\times(k-fl)+MCS_1\times(fl-fs)+MCS_S\times fs\}$ (Expression 5)

As described above, interpolation processing in the two-dimensional space can be performed in such a way that one-dimensional linear interpolation is performed twice using holding values in descending order from a larger remainder value.

Interpolation processing in the two-dimensional space has been described as above. Next, interpolation processing in a N-dimensional space that is extended to N-dimension will be described.

For a space having step-like lattice point intervals, holding value lattice points having $((7/k)+1)^n$ lattice points can be obtained. Accordingly, a sub-space where the point to be interpolated exists has $2^n$ apexes. A position of the sub-space can be obtained by expanding a component qs of the point P to a multiple number of k and the remainder value fs:

$$qs(P)=sA \times k+fs(s=1\sim n)$$

The apex A that is the origin of the sub-space is represented by a multiple value sA and the number of lattice points as follows:

$$\text{apex } A = \sum_{s=1}^{n} \text{number of lattice points}^{\wedge}(s-1) \times sA \quad \text{[Expression 4]}$$

The position of the point P in the sub-space can be obtained from the remainder value fs. As described in the two-dimensional space, remainder values fs are rearranged in the descending order by performing interpolation with the use of holding values in an order from a larger remainder value. The remainder values rearranged in the descending order are represented by f1, f2, f3 . . . fn in the descending order. Holding values adjacent to these remainder values in respective direction of the remainders are represented by $MCS_1$, $MCS_2$, $MCS_3$, . . . , $MCS_n$ in the same order.

Expression 5 can be generalized to the N-dimensional space, using these remainder values and holding values.

$$MCS_P = \quad \text{(Expression 6)}$$
$$1/k \times \{MCS_A \times (k-f1) + MCS_1 \times (f1-f2) + \ldots +$$
$$MCS_{n-1} \times (fn-1-fn) + MCS_n \times fn\}$$

Expression 6 is an interpolation expression in the N-dimensional space. The interpolation processing passes through n+1 apexes in the sub-space where the point P exists.

In the present variation, in order to perform interpolation processing in a four-dimensional space, the interpolation processing can be performed by substituting n=A to Expression 6. FIGS. 19A to 19C illustrate relation between a representative rank (lattice point) of each of K, C, M, Y used in the aforementioned interpolation processing and a table parameter for MCS processing. It should be appreciated that a dimension where the interpolation processing is performed is not limited to a four-dimensional space and varies depending on an ink type that can be used by a printer.

As described above, MCS processing parameters corresponding to the combinations of the representative ranks of printing characteristic ranks R[Y] of CMYK are selected, and then these selected parameters are used to perform interpolation operation, so that MCS processing parameters of other printing characteristic ranks can be calculated. These table parameters for the MCS processing section that correspond to respective areas are stored in the RAM 312. It should be appreciated that these table parameters may be stored in the HDD 300 of the host PC.

Processing as described in the first and second variations can also be applied to the present variation.

Figure 16B:
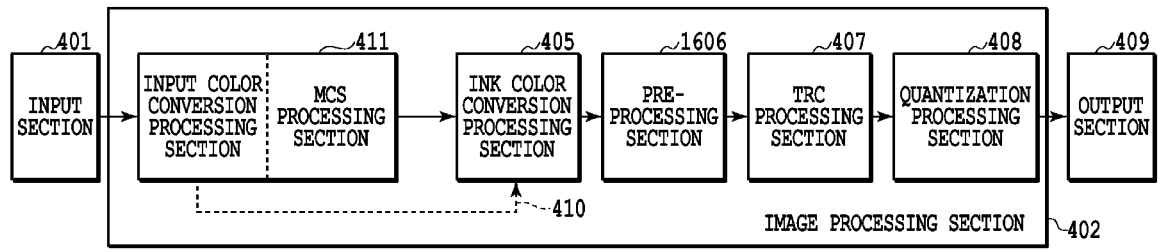

FIG. 16B illustrates a configuration in which input color conversion processing and MCS processing are integrated, which is the same as described above with reference to the first variation in FIG. 4B except for the aforementioned preprocessing. Selecting table parameters by representative ranks according to the present fourth variation can be also performed in this configuration of image processing.

Figure 16C:
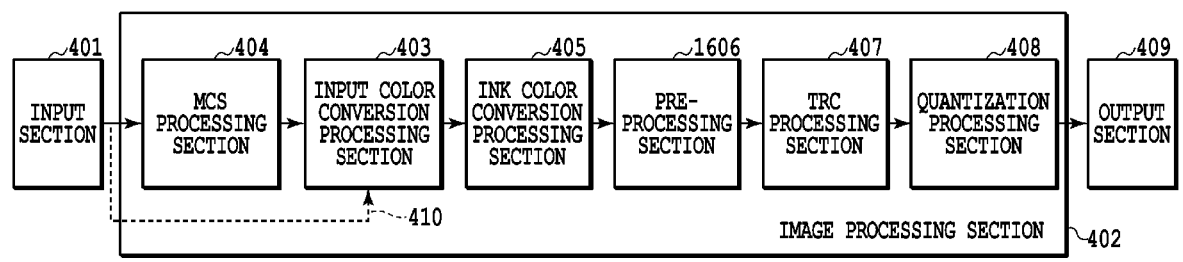

FIG. 16C illustrates a processing configuration in which the MCS processing section 404 is disposed prior to the input color conversion processing section 903, which is the same as described above with reference to the second variation in FIG. 4C except for the aforementioned preprocessing. Selecting table parameters by representative ranks according to the present fourth variation can be also performed in this configuration of image processing.

The first embodiment and the first to third variations thereof have been described. The content of each processing is only an example, but any configuration can be used as long as the configuration can realize the reduction of a color shift that is an effect of the present invention. For example, in processing to generate table parameters for the MCS processing section in FIGS. 5A, 5B, 12A, 12B, 13A and 13B, a method in which a color shift amount is first measured and then a correction value is calculated is used. However, other methods can be used. Since an object of the present invention is to reduce a color shift, it is not necessarily needed to set a target color A. That is, a correction value for each printing region may be set on the basis of a color shift between printing regions.

A region corresponding to four nozzles was set to one unit area, but the present embodiment is not limited to this. A region corresponding to more than four nozzles may be set to one unit area or a region corresponding to less than four nozzles, for example, one nozzle, may be set to one unit area. In one color nozzle array, the number of nozzles belonging to each area is not necessarily the same, but the number of nozzles belonging to one area may be different among the areas. This can be properly set depending on characteristics of a device and so on. The same applies to the following embodiments and variations.

(Second Embodiment)

Figure 20A:
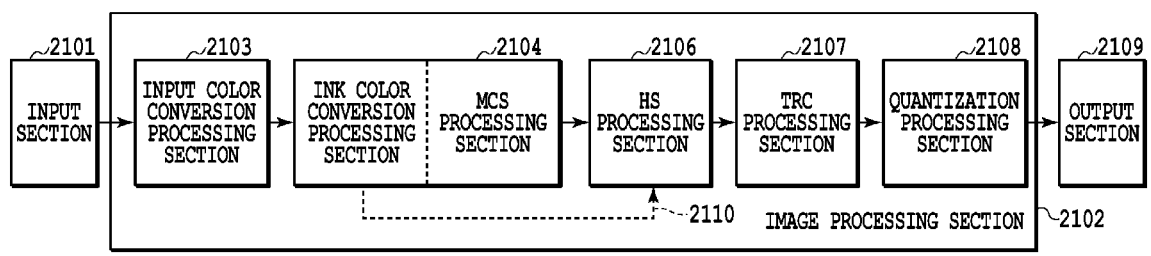
FIGS. 20A to 20C are block diagrams, each illustrating a configuration of an image processing section to generate print data according to a second embodiment of the present invention or variations thereof.

FIG. 20A is a block diagram illustrating a configuration of an image processing section to generate print data according to a second embodiment of the present invention. The configuration illustrated in FIG. 20A is different from the configuration according to the first embodiment illustrated in FIG. 4A in processing by an ink color conversion processing & MCS processing section 2104. The processing by this ink color conversion processing & MCS processing section 2104 will be described below.

The ink color conversion processing & MCS processing section 2109 performs ink color data conversion processing as well as color shift correction processing on device color image data obtained by input color conversion processing to output ink color data whose color shift has been reduced.

Figure 21A:
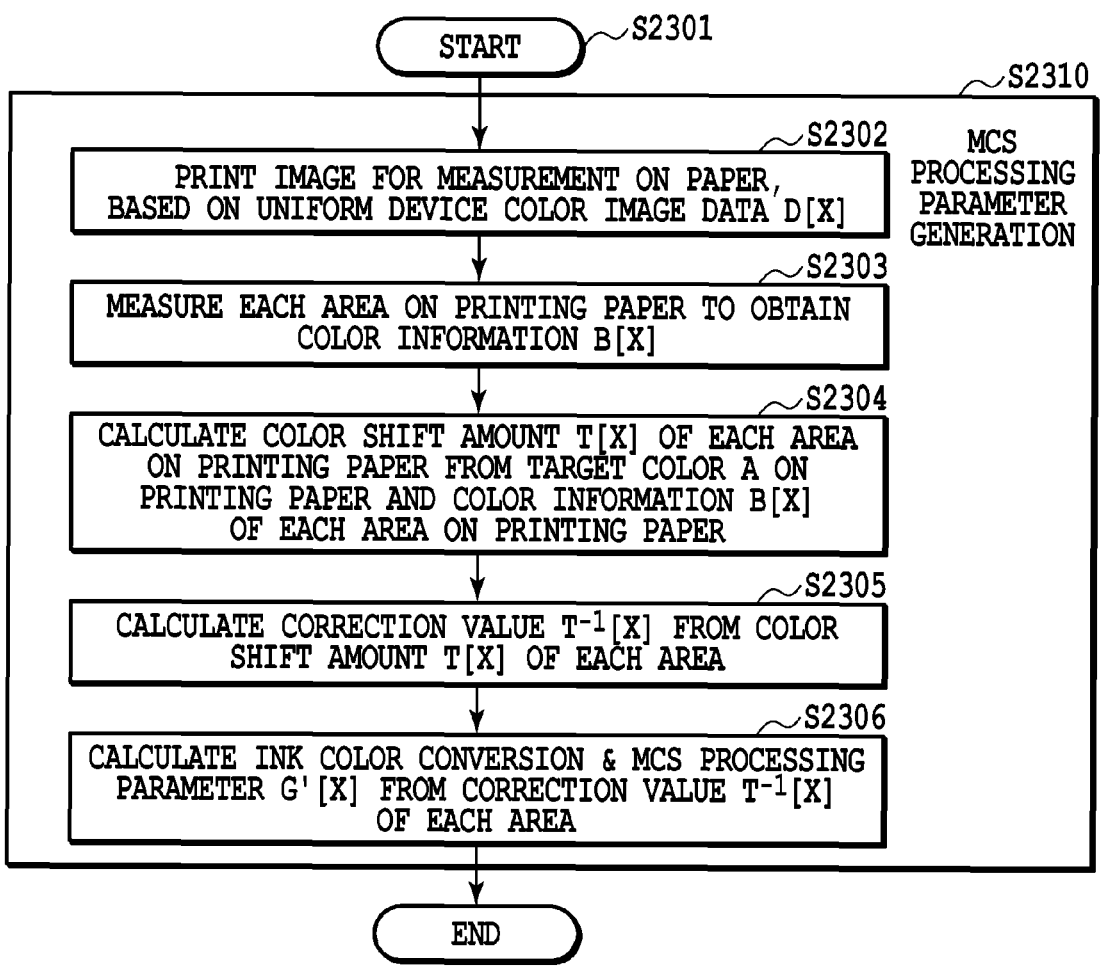
FIGS. 21A and 21B are flow charts illustrating processing for generating parameters of a table to be used in an ink color conversion processing & MCS processing section 2104 illustrated in FIG. 20A and processing by the ink color conversion processing & MCS processing section 2104 using the table, respectively.
Figure 21B:
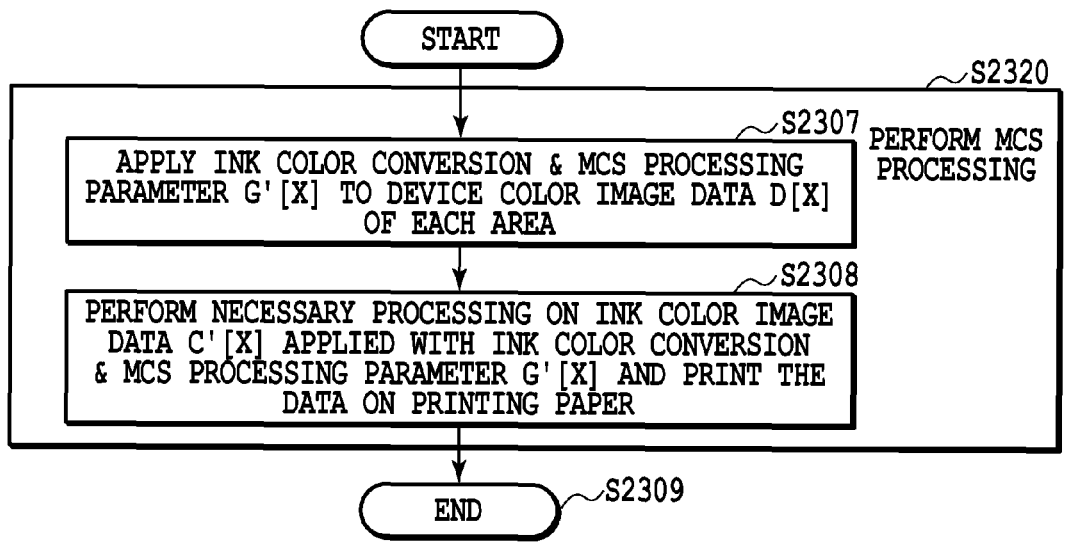

FIGS. 21A and 21B are flow charts illustrating processing to generate parameters of a table to be used by the ink color conversion processing & MCS processing section 2104 illustrated in FIG. 20A and processing by the ink color conversion processing & MCS processing section 2104 using the table, respectively.

In FIGS. 21A and 21B, processing in steps S2306, S2307 and S2308 is essentially different from the processing according to the first embodiment illustrated in FIGS. 5A and 5B, and which will be described below.

In step S2306 of FIG. 21A, an ink color conversion & MCS processing parameter Gt[X] is calculated from a correction value $T^{-1}[X]$ for each area. This calculation processing are roughly composed of two processing: processing to calculate an equivalent correction value $Z^{-1}[X]$ from a correction value $T^{-1}[X]$ and processing to calculate an ink color conversion & MCS processing parameter G'[X] from the equivalent correction value $Z^{-1}[X]$.

First, an equivalent correction value $Z^{-1}[X]$ is calculated from a correction value $T^{-1}[X]$. If the correction value $T^{-1}[X]$ is a correction value of blue color in a measurement color space, an equivalent correction value $Z^{-1}[X]$ that corrects blue color of a device color space by the same amount of this correction value $T^{-1}[X]$ in a device color space is calculated on the basis of this correction value.

Here, an equivalent correction value $Z^{-1}[1]$ is an equivalent correction value in a region corresponding to four nozzles in FIG. 6B and is ideally zero. Meanwhile, an equivalent correction value $Z^{-1}[2]$ is an equivalent correction value of the region on the right in FIG. 6B and is a correction value to reduce cyan color.

If a measurement color space perfectly coincides with a device color space, the following expression is established similarly to the first embodiment.

$$Z^{-1}[1]=T^{-1}[1]=T[1]=A-B[1]=(Rt-R1, Gt-G1, Bt-B1)$$

$$Z^{-1}[2]=T^{-1}[2]=T[2]=A-B[2]=(Rt-R2, Gt-G2, Bt-B2)$$

However, in many cases, they do not coincide with each other. In such cases, color space conversion is necessary.

If linear conversion is possible between both the color spaces, a known method such as matrix conversion described in the first embodiment can be used. If linear conversion is impossible between both the color spaces, a known method such as a method using a three-dimensional lookup table described in the first embodiment can be used.

If the relation between a correction value $T^{-1}[X]$ and an equivalent correction value $Z^{-1}[X]$ varies depending on a color, the equivalent correction value $Z^{-1}[X]$ can be obtained as described in the first embodiment as follows:

$$Z^{-1}[1]=F(Rt, Gt, Bt)-F(R1, G1, B1)$$

$$Z^{-1}[2]=F(Rt, Gt, Bt)-F(R2, G2, B2)$$

In this case, next, a table parameter G'[X] of ink color conversion & MCS processing is obtained from the equivalent correction value $Z^{-1}[X]$ as follows. F (Rt, Gt, Bt) is set to device color information D[X], (dR, dG, dB), that is inputted to the ink color conversion processing & MCS processing section 2104 illustrated in FIG. 20A in printing an image for measurement. In this case, the following expression is established.

$$Z^{-1}[1]=(dR, dG, dB)-F(R1, G1, B1)$$

$$Z^{-1}[2]=(dR, dG, dB)-F(R2, G2, B2)$$

Next, corrected ink color information C'[X] that is obtained in such a way that an equivalent correction value was applied to inputted device color information D[X], then which is subject to ink color conversion processing G, is found as follows:

$$C'[1]=G((dR, dG, dB) \times 2-F(R1, G1, B1))$$

$$C'[2]=G((dR, dG, dB) \times 2-F(R2, G2, B2))$$

where corrected ink color information C'[1] corresponds to a region on the left in FIG. 7B and is ideally equivalent to G (dR, dG, dB). Meanwhile, corrected ink color information C'[2] corresponds to a region on the right in FIG. 7B and whose cyan color component has been reduced.

Lastly, a parameter G'[X] of ink color conversion & MCS processing is decided so as to convert input device color data D[X] to corrected ink color information C'[X] as follows:

$$G'[1](dR, dG, dB)=C'[1]$$

$$G'[2](dR, dG, dB)=C'[2]$$

As described above, in ink color conversion & MCS processing parameter generation processing S2310 illustrated in FIG. 21A, a table parameter G'[X] for the ink color conversion & MCS processing section can be generated for each area. Then, this table parameter G'[X] for the ink color conversion & MCS processing section for each area is stored in the HOD 303 of the host PC.

Next, correction processing S2320 by the ink color conversion & MCS processing section illustrated in FIG. 21B will be described.

In step S2307 of FIG. 21B, first, the parameter G'[X] of ink color conversion & MCS processing generated in the processing S2310 is applied to device color image data D[X] for each pixel corresponding to the area, thereby correction being performed.

Specifically, which area includes an object pixel to be subject to image processing is first decided to obtain a printing region number n of the area including the object pixel. Suppose that n-th area is an area of interest. An equivalent correction value $Z^{-1}[n]$ associated with this area of interest is obtained by selecting from among equivalent correction values stored in the HDD 303 of the host PC. Then, the parameter G'[X] of ink color conversion & MCS processing is applied to the device color image data of the object pixel as follows. That is, processing in the ink color conversion & MCS processing section 2104 applies the parameter G'[X] to the device color image data D[X] to generate corrected ink color data C'[X].

$$C'[1]=G((dR, dG, dB) \times 2-F(R1, G1, B1))$$

$$C'[2]=G((dR, dG, dB) \times 2-F(R2, G2, B2))$$

Where the corrected ink color data C'[1] corresponds to a region on the left in FIG. 7B and is ideally the same blue color as the target color A. The corrected ink color data C'[2] corresponds to a region on the right in FIG. 7B and becomes blue color as a result of reducing cyan color thereof.

Next, in step S2308 of FIG. 21, corrected color ink data goes through an HS processing section 2106, a TRC processing section 2107 and a quantization processing section 2108 to an output section 2109, where the data is printed on the printing paper 106.

As described in FIG. 7B, since in each printing region of the printing paper 106, a color shift amount T[X] occurs due to variations of ejection volumes during printing, the following relations are observed.

Color information on the left in the printing paper≈a color of printing paper corresponding to C'[1]+T[1]≈A Color information on the right in the printing paper≈a color of printing paper corresponding to C'[2]+T[2]≈A where C'[1] is ideally the same blue color as the target color A and T[1] is ideally zero; and C'[2] is a blue color whose cyan color is reduced by T[2] relative to the target color A and T[2] is a shift amount to increase cyan color. In this way, the blue color on the left and that of the right in the printing region are approximately the same, so that a color unevenness can be reduced.

As another example of MCS processing parameter generation processing 2310, the method described with reference to FIG. 8 may be used.

Also in the second embodiment of the present invention, a table parameter to be used in the ink color conversion & MCS processing section 2104 is selected depending on a nozzle ejection rank, instead of the aforementioned basic configuration.

In the same manner as the first embodiment, in the present embodiment, prior to this table selection, table parameters (table) to be used in the ink color conversion & MCS processing section are generated for all combinations of the printing characteristic ranks of each of four colors K, C, M, Y and are stored in the HDD 303 of the host PC. Then, a table parameter for the ink color conversion & MCS processing section 2104 is selected by processing illustrated in FIG. 22 in an actually-used printer.

Figure 22:
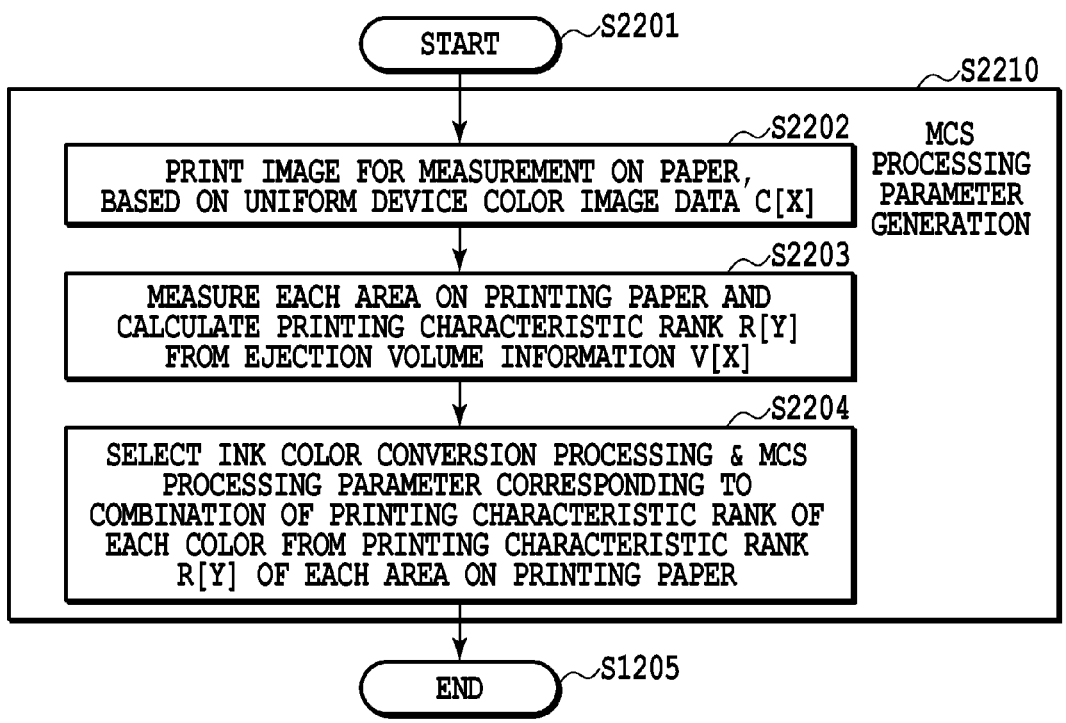
FIG. 22 is a flow chart illustrating processing for selecting table parameters suitable for a printing head depending on a printing characteristic rank according to the second embodiment of the present invention.

FIG. 22 is a flow chart illustrating the same processing as illustrated in FIG. 10 according to the first embodiment, that is, processing to select a table parameter suitable for an actually-used printing head according to a rank from the HDD 303 of the host PC 300. Processing in step S2204 illustrated in FIG. 22 is different from processing in FIG. 10 and will be described below.

In step S2204, in the HDD 303 of the host PC, a parameter for the ink color conversion & MCS processing section corresponding to the same combination of that of printing characteristic ranks R[Y] of each color nozzle for each area obtained in step S2203 is selected.

(First Variation of Second Embodiment)

Figure 20B:
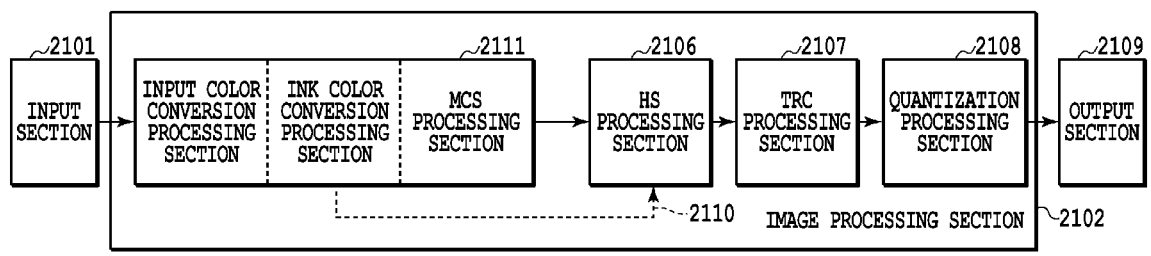

The present variation relates to a mode corresponding to the first variation of the first embodiment. FIG. 20B is a block diagram illustrating an image processing configuration in which input color conversion processing and ink color conversion processing & MCS processing are integrated, according to the present variation. This mode also can increase a processing speed similarly to the first variation of the first embodiment.

(Second Variation of Second Embodiment)

Figure 20C:
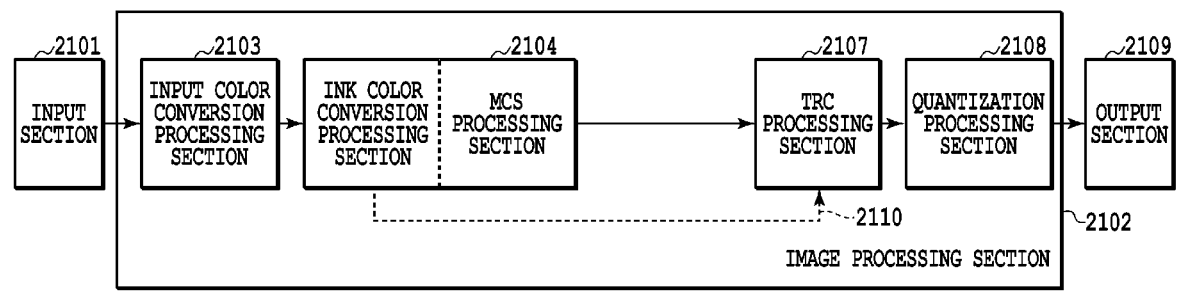

The present variation relates to a mode corresponding to the third variation of the first embodiment. FIG. 20C is a block diagram illustrating an image processing configuration in which HS processing is excluded, according to the present variation.

Processing according to the present variation is the same as processing illustrated in FIGS. 5A and 5B except that in the present variation HS processing is not performed as described in the third variation of the first embodiment.

(Third Variation of Second Embodiment)

The present variation relates to a mode corresponding to the fourth variation of the first embodiment.

That is, a representative ranks N (M≥N≥2) for each K, C, M, Y is set from printing characteristic ranks R[Y], and representative table parameters for ink color conversion & MCS processing are generated in such a way that the representative table parameters correspond to combinations of the representative ranks of each of K, C, M, Y. Then, with respect to printing characteristic ranks R[Y] other than representative ranks, parameters for ink color conversion & MCS processing are generated by interpolation operation using representative parameters of ink color conversion & MCS processing.

(Third Embodiment)

Figure 23A:
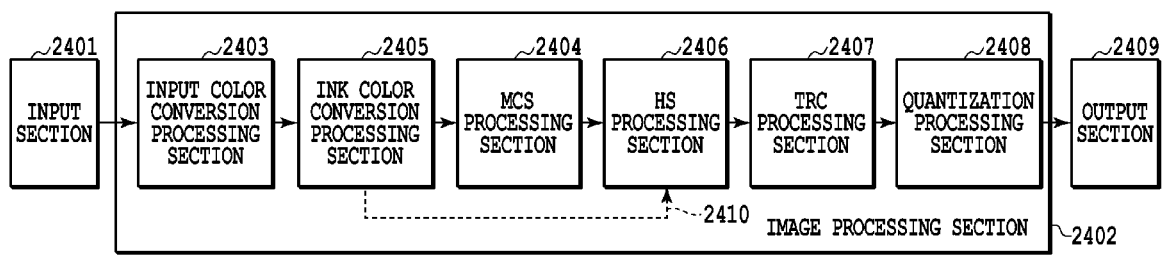
FIGS. 23A and 23B are block diagrams, each illustrating a configuration example of image processing to generate print data according to a third embodiment of the present invention and a variation thereof.

FIG. 23A is a block diagram illustrating an example of an image processing configuration to generate print data according to a third embodiment of the present invention. The present embodiment is different from the configuration illustrated in FIG. 4A according to the first embodiment in that an MCS processing section 2404 performs MCS processing on ink color data obtained in an ink color conversion processing section 2405, as illustrated in FIG. 23A. Accordingly, table contents (table parameters) for MCS processing or a method to generate the table contents (table parameters) are different from those of the first embodiment.

Figure 24A:
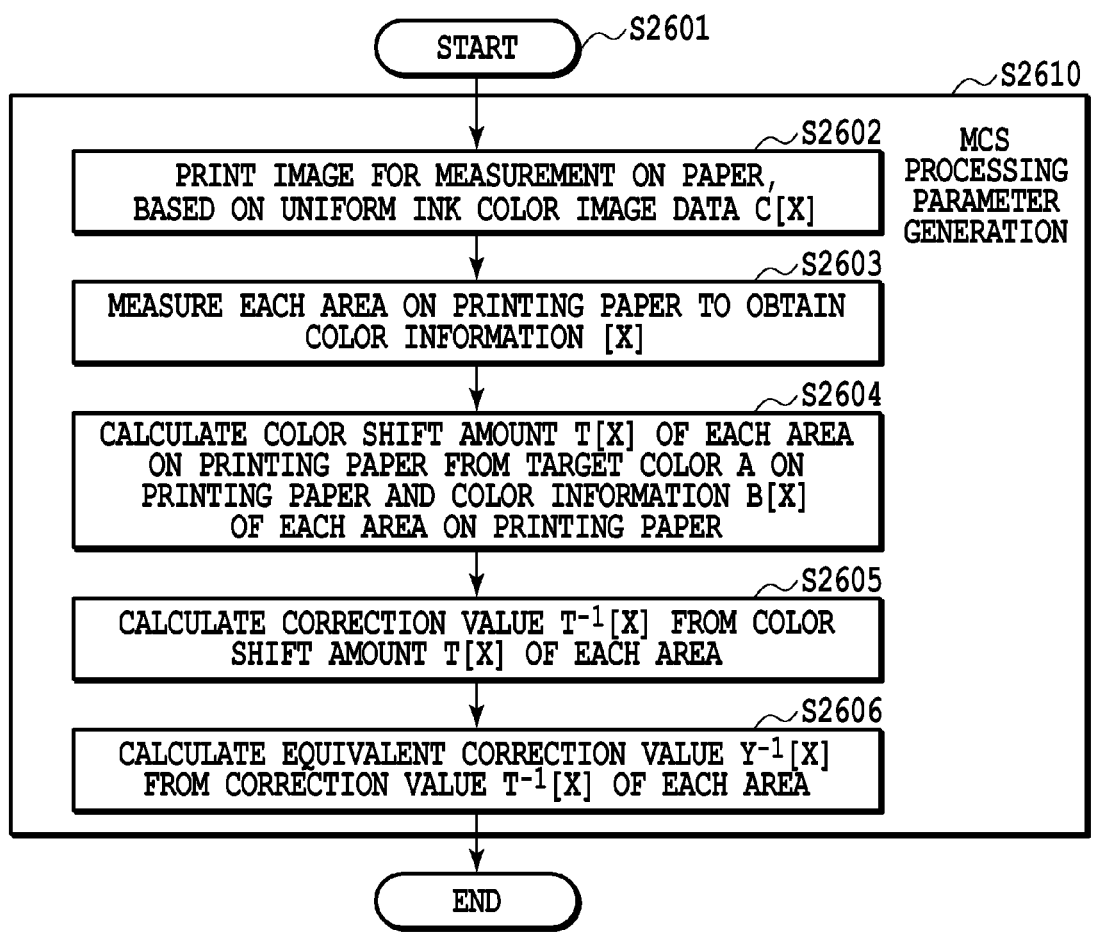
FIGS. 24A and 24B are flow charts, illustrating processing for generating parameters of a table to be used by the MCS processing section and processing by the MCS processing section 2404 using the table according to the third embodiment.
Figure 24B:
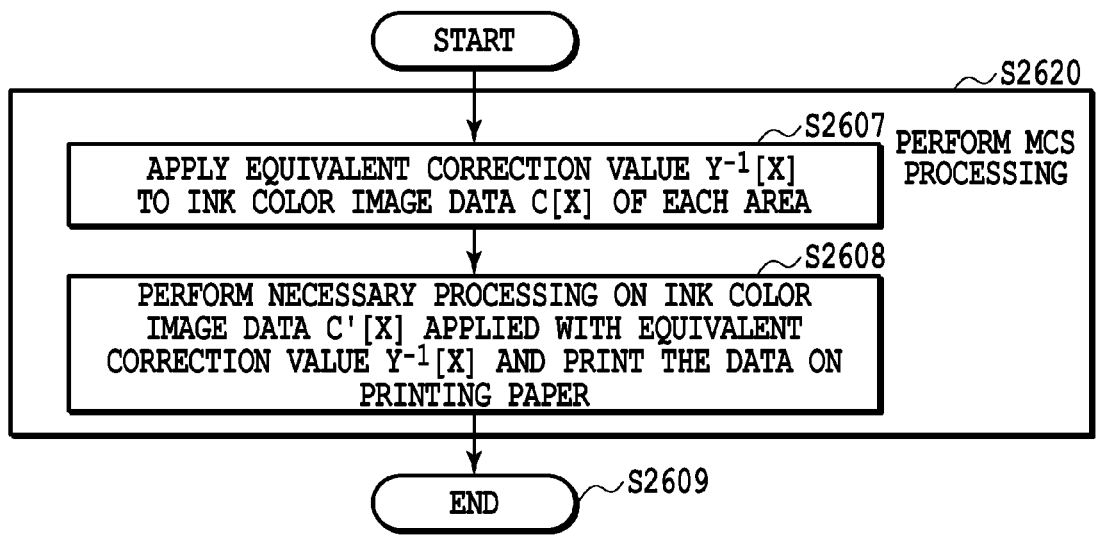

FIGS. 24A and 24B are flow charts illustrating processing to generate parameters of a table to be used in the MCS processing section and processing in the MCS processing section 2404 using the table, respectively, according to the third embodiment, which is the same as processing illustrated in FIGS. 5A and 5B. In FIGS. 24A and 24B, processing in steps S2602, S2604, S2606, S2607 and S2608 is different from processing illustrated in FIGS. 5A and 5B and will be mainly described below.

Also in parameter generation illustrated in FIG. 24A according to the present embodiment, when processing to generate parameters is performed, HS processing parameters have been already generated. In step S2602, an image for measurement is printed on a printing paper, on the basis of ink color data C[X] from an ink color conversion processing section 2405. That is, input image data I[X] for each area corresponding to four nozzles illustrated in FIG. 3B that is inputted from the input section 401 is converted to uniform device color image data D[X] in the input color conversion processing section 2403. Next, the uniform device color image data D[X] is subject to ink color conversion in the ink color conversion processing section 2405 and converted to uniform ink color data C[X]. An ink color conversion coefficient in this processing to convert device color image data D[X] to ink color data C[X] will be hereinafter referred to as G. The uniform ink color image data C[X] passes, without being subject to processing by the MCS processing section 2404, through a bypass path illustrated in a dash line 2410 to an HS processing section 2406, a TRC processing section 2407, a quantization processing section 2408, and then to an output section 2409, where an image for measurement is printed on the printing paper 106. In the HS processing section 2406, if, for example, nozzles of the magenta printing head 103 have printing characteristics as illustrated in FIG. 3A, correction is performed so as to reduce the number of dot data corresponding to four nozzles on the right by half, as illustrated in FIG. 3A. An image for measurement described with reference to FIG. 6B, for example, is printed by the aforementioned processing in step S2602. That is, in the image for measurement, the blue color on the right in the printing paper has a color shift and therefore is different from the blue color on the left in the printing paper.

Next, in step S2604, a color shift amount T[X] for each area is calculated from the target color A=(Rt, Gt, Bt) and color information B[X] for each area in the image for measurement obtained in step S2603.

Here, the target color A is a color that corresponds to uniform ink color image data C[X] and is printed on printing paper 106 and measured if each ink color printing head has a standard ejection volume. That is, (Rt, Gt, Bt) are values of the target color A measured by a scanner. Therefore, color shift amounts in areas 1 and 2 illustrated in FIG. 66 is represented by the following expressions.

$$\text{color shift amount } T[1] = B[1] - A = (R1 - Rt, G1 - Gt, B1 - Bt)$$

color shift amount $T[2]=B[2]-A=(R2-Rt, G2-Gt, B2-Bt)$

In the present embodiment, a color formed by blue dots generated by overlapping cyan ink of a standard ejection volume and magenta ink of a standard ejection volume is a target blue color.

The color shift amount T[1] is a color shift amount from blue color, on the left in FIG. 68, that is generated by a combination of cyan and magenta inks of a standard ejection volume. The color shift amount T[1] is ideally zero except for a measurement error, that is, fulfills the relations: R1=Rt, G1=Gt, B1=Bt. Meanwhile, the color shift amount T[2] is a color shift amount of blue color on the right in FIG. 6B, which is generated by combination of cyan ink of a standard ejection volume and magenta ink of a larger ejection volume than a standard, from the target blue color. For example, in the example illustrated in FIG. 6B, color generated by a combination of cyan areas 10623 and magenta areas 10625 has a stronger cyan cast in comparison with the target blue color. In this case, color shift amount T[2] is a color shift amount to increase cyan color, that is, fulfills the relations: R2<Rt, G2=Gt, B2=Bt.

Next, in step S2606, an equivalent correction value $Y^{-1}[X]$ is calculated from the correction value $T^{-1}[X]$ for each area obtained in step S2605. Since the correction value $T^{-1}[X]$ is a correction value of blue color in a measurement color space, an equivalent correction value $Y^{-1}[X]$ to correct ink color data by the same amount of blue color as this correction value is calculated on the basis of this correction value. Here, an equivalent correction value $Y^{-1}[1]$ corresponds to an area on the left in FIG. 6B and is ideally zero. Meanwhile, an equivalent correction value $Y^{-1}[2]$ corresponds to an area on the right in FIG. 68 and reduces cyan color.

Here, if a measurement color space and an ink color space can be linearly converted, the equivalent correction values $Y^{-1}[1]$ and $Y^{-1}[2]$ can be obtained by using a known method such as matrix conversion, as follows:

$$Y^{-1}[1] = \begin{vmatrix} C1 \\ M1 \\ Y1 \\ K1 \end{vmatrix} = \begin{vmatrix} a1 & a2 & a3 \\ a4 & a5 & a6 \\ a7 & a8 & a9 \\ a10 & a11 & a12 \end{vmatrix} \times \begin{vmatrix} Rt-R1 \\ Gt-G1 \\ Bt-B1 \end{vmatrix}$$

$$Y^{-1}[2] = \begin{vmatrix} C2 \\ M2 \\ Y2 \\ K2 \end{vmatrix} = \begin{vmatrix} a1 & a2 & a3 \\ a4 & a5 & a6 \\ a7 & a8 & a9 \\ a10 & a11 & a12 \end{vmatrix} \times \begin{vmatrix} Rt-R2 \\ Gt-G2 \\ Bt-B2 \end{vmatrix}$$

where, a1 to a12 are conversion coefficients to convert colors in a measurement color space to ink colors. If the both spaces cannot be linearly converted, the equivalent correction values $Y^{-1}[1]$ and $Y^{-1}[2]$ can be obtained by using a known method such as a three-dimensional lookup table, as follows:

$Y^{-1}[1]=H(Rt-R1, Gt-G1, Bt-B1)$ $Y^{-1}[2]=H(Rt-R2, Gt-G2, Bt-B2)$ where H is a conversion function to convert a measurement color space to an ink color space. If the relation between a correction value $T^{-1}[X]$ and an equivalent correction value $Y^{-1}[X]$ varies depending on a color, the equivalent correction values $Y^{-1}[1]$ and $Y^{-1}[2]$ can be obtained as follows:

$Y^{-1}[1]=H(Rt,Gt,Bt)-H(R1, G1, B1)$ $Y^{-1}[2]=H(Rt,Gt,Bt)-H(R2, G2, B2)$ where H is also a conversion function to convert a measurement color space to a device color space.

An equivalent correction value $Y^{-1}[X]$ as a table parameter for each area obtained as above is stored in the HDD 303 of the host PC 300.

Next, processing S2620 by the MCS processing section using the aforementioned table will be described with reference to FIG. 24B.

In step S2607 of FIG. 24B, an equivalent correction value $Y^{-1}[X]$ generated as above as a table parameter is applied to ink color data C[X] of a pixel corresponding to an area X. Specifically, first, it is determined which area X includes a object pixel to be subject to image processing to obtain an area number n=X that includes the object pixel. Then, an equivalent correction value $Y^{-1}[n]$ corresponding to this area of the object pixel is read and obtained from the HDD of the host PC. After that, the equivalent correction value $Y^{-1}[n]$ is applied to ink color data of the object pixel, and thereby correction is performed.

By way of example, suppose that input image data I[X] inputted from an input section 2401 in FIG. 23A represents a blue color as indicated on the right in FIG. 6B. This input image data I[X] is converted to device color image data D[X] in the input color conversion processing section 403, and then becomes ink color data C[X] by being subject to ink color conversion in the ink color conversion processing section 2405. Then, the ink color data C[X] is subject to correction by an equivalent correction value $Y^{-1}[n]$ as described above in an MCS processing section 2609 to generate equivalent-corrected ink color data C'[X]. For two areas illustrated in FIG. 6B, the following expressions are established.

equivalent-corrected ink color data $C'[1]=C[1]+Y^{-1}[1]$ equivalent-corrected ink color data $C'[2]=C[2]+Y^{-1}[2]$ where the equivalent-corrected ink color data C'[1] corresponds to an area on the left in FIG. 78 and is ideally the same blue color as the target color A, and the equivalent-corrected ink color data C'[2] corresponds to an area on the right in FIG. 7B and is a blue color whose cyan color has been reduced.

Next, in step S2608, the equivalent-corrected ink color data are subject to processing by the HS processing section 2406, TRC processing section 2407 and quantization processing section 2408, and lastly printing is performed on the printing paper 106 in the output section 2409.

As illustrated in the printing example in FIG. 78, magenta dots 10626 on the right show that the number of cyan printing dots has reduced as the result of cyan color reduction of equivalent-corrected ink color image data C'[2] by MCS processing. As a result, the following expressions are established.

color information on the left in FIG. 7B≈color on the printing paper corresponding to $C'[1]+ T[1]\approx A$ color information on the right in FIG. 7B≈color on the printing paper corresponding to $C'[2]+ T[2]\approx A$ Where C'[1] is ideally the same blue color as the target color A and T[1] is ideally zero; and C'[2] is blue color whose cyan color has been reduced by T[2] relative to the target color A and T[2] is a shift amount to increase cyan color. As describe above, the blue color on the left and the blue color on the right are approximately the same, so that a color unevenness due to a color shift can be reduced.

As another example of MCS processing parameter generation processing 2610, a method described with reference to FIG. 8 may be used.

Also in the third embodiment of the present invention, a table parameter to be used in the MCS processing section 2404 is selected depending on a nozzle ejection rank, instead of the aforementioned basic configuration.

In the same manner as the first embodiment, in the present embodiment, prior to this table selection, table parameters (table) to be used in the ink color conversion & MCS processing section are generated for all of combinations of the printing characteristic ranks of each of four colors K, C, M, Y and are stored in the HDD 303 of the host PC. Then, the table parameter to be used in the MCS processing section 2404 is selected by processing illustrated in FIG. 25 in an actually used printer.

Figure 25:
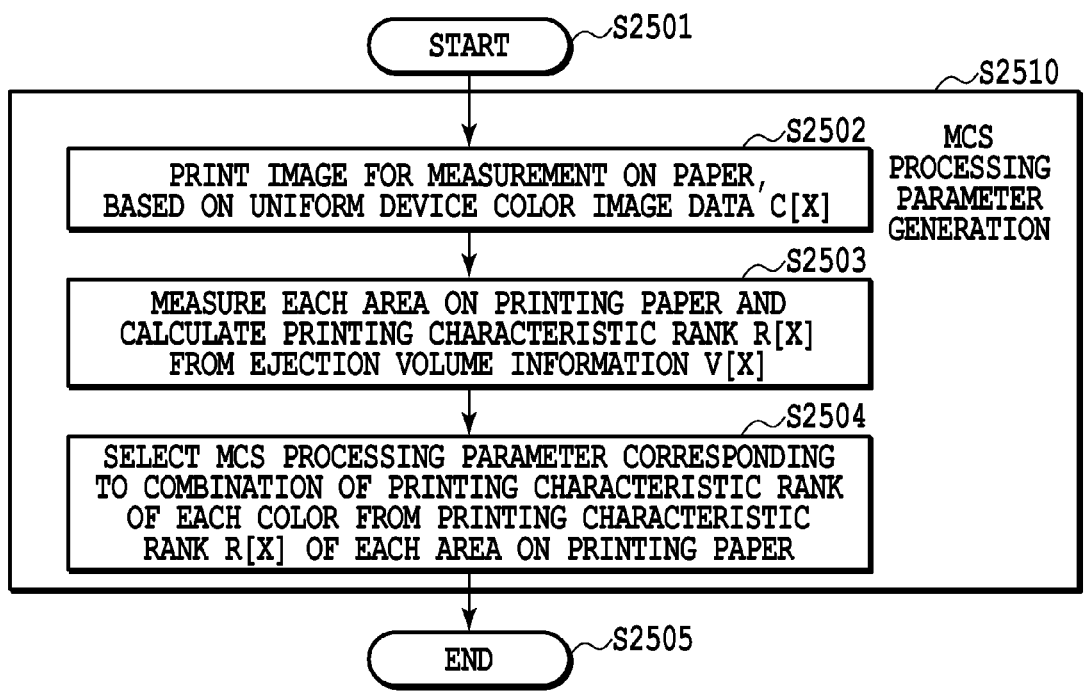
FIG. 25 is a flow chart illustrating processing for selecting table parameters suitable for a printing head, depending on a printing characteristic rank according to the third embodiment of the present invention.

FIG. 25 is a flow chart illustrating the same processing as illustrated in FIG. 10 according to the first embodiment, that is, processing to select a table parameter suitable for an actually used printing head according to a rank from the HDD 303 of the host PC 300. In FIG. 25, processing in step S2504 is different from processing in FIG. 10 and will be described below.

In step S2504 of FIG. 25, in the HDD 303 of the host PC, a parameter for the MCS processing section corresponding to the same combination as the combination of printing characteristic ranks R[Y] of each color nozzle for each area obtained in step S2503, is selected.

(First Variation of Third Embodiment)

Figure 23B:
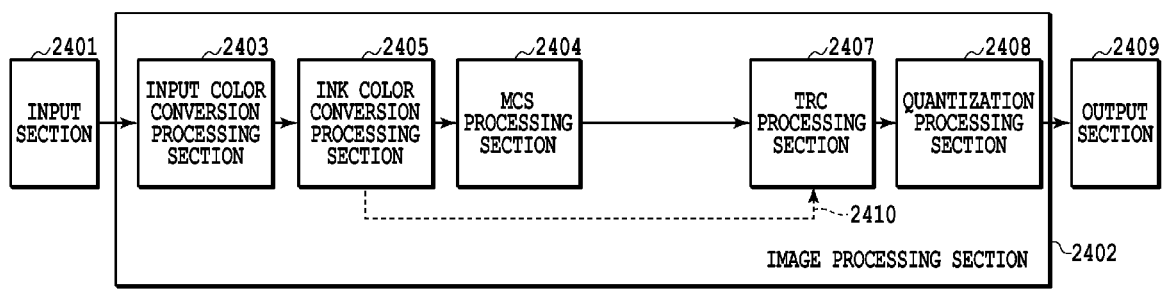

The present variation relates to a mode corresponding to the third variation of the first embodiment. FIG. 23B is a block diagram illustrating an image processing configuration in which HS processing is excluded according to the present variation.

Accordingly, in this variation HS processing is not previously performed in FIG. 24A.

(Second Variation of Third Embodiment)

The present variation relates to a mode corresponding to the fourth variation of the first embodiment. That is, a representative rank N (M≥N≥2) for each K, C, M, Y is set from printing characteristic ranks R[Y], and representative table parameters for MCS processing are generated in such a way that they correspond to combinations of the representative ranks of each K, C, M, Y. Then, with respect to printing characteristic ranks R[Y] other than the representative ranks, parameters for MCS processing are generated by interpolation operation using the representative parameters for ink color conversion & MCS processing.

Application of methods described in the above first to third embodiments and variations thereof can reduce a color shift caused by printing characteristic variations among nozzles due to variations among nozzle ejection volumes in an image using two or more colors (secondary color image, tertiary color image). Also if an ejection amount of a nozzle has changed from its as-manufactured ejection volume with time by using the nozzle, a color shift in an image using two or more colors (secondary color image, tertiary color image) can be reduced.

(Other Embodiments)

The aforementioned embodiments and variations thereof relate to a mode in which printing is performed using different color inks, K, C, M, Y, but the application of the present invention is not limited to this mode. With respect to gray, for example, when a dot is formed by overlapping black and gray inks, gray color shift, that is, gray density unevenness may occurs by the same principle as described with reference to FIGS. 3A and 3B. The present invention can also reduce such a color shift. In this way, the present invention can reduce a color shift caused by variations of printing characteristics among nozzles due to variations of ejection volumes among nozzles when not only different colors of inks but also a plurality of types of inks are used.

In the aforementioned embodiments and variations, correction for reducing a color shift is performed for all areas corresponding to nozzles of each ink nozzle array, but the present invention is not limited to this mode. For example, the aforementioned color shift correction may be performed for only an area corresponding to a specified nozzle. In this case, correction processing by the MCS processing section is performed on only image data of this area.

(Further Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118672, filed May 24, 2010, which is hereby incorporated by reference herein in its entirety.

What is claimed is:

1. An image processing apparatus that generates image data for printing an image by ejecting plural colors of ink from a plurality of nozzles, for each of a plurality of areas on a print medium, said apparatus comprising:

an acquiring unit configured to acquire information on respective ejection amounts by nozzle groups respectively corresponding to the plurality of areas, for each of the plural colors of ink having different colors and different light absorption characteristics on the print medium;

a selecting unit configured to select a correction parameter for generating the image data in response to an input of data having a plurality of color components of different colors from among a plurality of correction parameters that correspond to combinations of the information on respective ejection amounts for the respective plural colors of ink and are retained in a memory, according to a combination of the acquired information on respective ejection amounts for the respective plural colors of ink, for each of the plurality of areas, wherein each of the plurality of correction parameters defines a correspondence relationship between a combination of the plurality of color components in the input data and a combination of a plurality of color components for the image data, and the correction parameter for each of the plurality of areas is used for correcting a color indicated by the input data and selected so that a difference of color appearance of colors between the plurality of areas, which is caused by a difference between light absorption characteristics of the ink dots that are formed on the print medium by overlapping a plurality of inks having different colors and light absorption characteristics of the ink dots each of which is formed on the print medium with an ink of single color, is reduced; and a generating unit configured to generate the image data based on the correction parameters selected by the selecting unit.

2. The image processing apparatus according to claim 1, further comprising an obtaining unit configured to obtain the information for each of the plurality of areas based on measurement results of a plurality of test patterns printed respectively for the plural colors of ink.

3. The image processing apparatus according to claim 2, further comprising:
a printing unit including nozzle arrays for ejecting respective colors on ink, in each of which the plurality of nozzles are arranged, and printing on the print medium by using the nozzle arrays based on the image data generated by the generating unit; and
a measuring unit configured to measure the plurality of test patterns for obtaining the measurement results.

4. The image processing apparatus according to claim 1, wherein the information is a printing characteristic rank that is defined as one of levels of ink amounts ejected from a nozzle, and the memory retains the correction parameters to be made correspond to all of combinations of printing characteristic ranks of nozzles with respect to inks of different colors.

5. The image processing apparatus according to claim 1, wherein the memory retains the correction parameters to be made correspond to a smaller number of the combinations among all of combinations of printing characteristic ranks of nozzles with respect to inks of different colors than that of the all of combinations of printing characteristic ranks,
in the case that the combination of printing characteristic ranks obtained correspondingly to the respective one or plurality of nozzles is a combination other than the combinations of printing characteristic ranks of the correction parameters retained in the memory, said selecting unit selects the correction parameter of the combination of printing characteristic ranks obtained correspondingly to the respective one or plurality of nozzles by performing an interpolation operation using the combinations of printing characteristic ranks of the correction parameters retained in the memory and said generating unit generates the image data corresponding to the respective one or plurality of nozzles on the basis of obtained correction parameter.

6. The image processing apparatus according to claim 5, wherein said generating unit converts an input value of each of the inks of different colors so that a relation of a change in print density to a change in ejection volume is made linear, prior to correcting the value of the image data corresponding to the respective one or plurality of nozzles.

7. The image processing apparatus according to claim 1, wherein said generating unit generates the image data represented by R, G and B signals.

8. The image processing apparatus according to claim 1, wherein said generating unit generates the image data in a process of converting an image data represented by R, G and B to an image data represented by ink color signals.

9. The image processing apparatus according to claim 1, further comprising a printing unit including nozzle arrays for ejecting respective colors on ink, in each of which the plurality of nozzles are arranged, and printing on the print medium by using the nozzle arrays based on the image data generated by the generating unit.

10. The image processing apparatus according to claim 1, wherein each of nozzle arrays for ejecting respective colors on ink, in each of which the plurality of nozzles are arranged in a predetermined direction, includes the nozzle groups, printing to the print medium is performed by the nozzle arrays during a relative scan of the nozzle arrays to the print medium in a direction intersecting the predetermined direction, and printing to each of the plurality of areas is performed by the nozzle groups corresponding to the plurality of areas respectively during one time of the relative scan.

11. The image processing apparatus according to claim 1, wherein in a case where a correction parameter corresponding to the combination of the acquired information for the respective plural colors is not the correction parameter of the plurality of correction parameters that correspond to combinations of the information for the respective plural colors of ink and are retained in the memory, said selecting unit select the correction parameter obtained by performing an interpolation operation using the combination of the acquired information and a part of the plurality of correction parameters retained in the memory.

12. The image processing apparatus according to claim 1, wherein said generating unit generates the image data by correcting together the plurality of color components in the input data that shows a color of an image formed with the plural colors of ink.

13. The image processing apparatus according to claim 1, wherein each of the a plurality of correction parameters defines a correspondence relationship between a combination of each of values of the plurality of color components in the input data and a combination of each of values of the plurality of color components in an output data.

14. The image processing apparatus according to claim 13, wherein each of the plurality of color components in the input data is R, G and B.

15. The image processing apparatus according to claim 1, wherein the plurality of correction parameters are defined as table parameters of a three-dimensional lookup table.

16. The image processing apparatus according to claim 15, further comprising an ink color conversion processing unit configured to convert data generated by the generating unit into signals corresponding to the plural colors.

17. An image processing method of generating image data for printing an image by ejecting plural colors of ink from a plurality of nozzles, for each of a plurality of areas on a print medium, said method comprising:
an acquiring step of acquiring information on respective ejection amounts by nozzle groups respectively corresponding to the plurality of areas, for each of the plural colors of ink having different colors and different light absorption characteristics on the print medium;
a selecting step of selecting a correction parameter for generating the image data in response to an input of data having a plurality of color components of different colors from among a plurality of correction parameters that correspond to combinations of the information on respective ejection amounts for the respective plural colors of ink and are retained in a memory, according to a combination of the acquired information on respective ejection amounts for the respective plural colors of ink, for each of the plurality of areas, wherein each of the plurality of correction parameters defines a correspondence relationship between a combination of the plurality of color components in the input data and a combination of a plurality of color components for the image data, and the correction parameter for each of the plurality of areas is used for correcting a color indicated by the input data and selected so that a difference of color appearance of colors between the plurality of areas, which is caused by a difference between light absorption characteristics of the ink dots that are formed on the print medium by overlapping a plurality of inks having different colors and light absorption characteristics of the ink dots each of which is formed on the print medium with an ink of single color, is reduced; and a generating step of generating the image data based on the correction parameters selected in the selecting step.

18. A non-transitory computer readable storage medium storing a program that makes the computer function as an image processing apparatus according to claim 1.

19. The image processing apparatus according to claim 1, wherein each of the correction parameters is a parameter for converting data shown by components of R, G and B into data shown by components of R, G and B, as a whole.

20. The image processing apparatus according to claim 1, wherein each of the correction parameters is a parameter for converting data shown by components of R, G and B into data shown by components corresponding to respective plural colors of ink.

21. The image processing apparatus according to claim 1, wherein each of the correction parameters is a parameter for correcting data shown by components corresponding to respective plural colors of ink.

22. An image processing apparatus that generates image data for printing an image on a print medium by ejecting plural colors of ink from a plurality of nozzles, said apparatus comprising:

an acquiring unit configured to acquire information on respective ejection amounts by the plurality of nozzles for each of plural colors of ink having different colors and different light absorption characteristics on the print medium;

a selecting unit configured to select a correction parameter for generating the image data in response to an input of data having a plurality of color components of different colors from among a plurality of correction parameters that correspond to combinations of the information on respective ejection amounts for the respective plural colors of ink and are retained in a memory, according to a combination of the acquired information on respective ejection amounts for the respective plural colors of ink, for each of a plurality of areas of the print medium, wherein each of the plurality of correction parameters defines a correspondence relationship between a combination of the plurality of color components in the input data and a combination of a plurality of color components for the image data, and the correction parameter for each of the plurality of areas is used for correcting a color indicated by the input data and selected so that a difference of color appearance of colors between the plurality of areas, which is caused by a difference between light absorption characteristics of the ink dots that are formed on the print medium by overlapping a plurality of inks having different colors and light absorption characteristics of the ink dots each of which is formed on the print medium with an ink of single color, is reduced; and a generating unit configured to generate the image data based on the selected correction parameters.

23. An image processing apparatus that generates image data for printing an image by ejecting plural colors of ink from a plurality of nozzles, for each of a plurality of areas on a print medium, said apparatus comprising:

an acquiring unit configured to acquire information on respective ejection characteristics by nozzle groups respectively corresponding to the plurality of areas, for each of the plural colors of ink having different colors and different light absorption characteristics on the print medium;

a selecting unit configured to select a correction parameter for generating the image data in response to an input of data having a plurality of color components of different colors from among a plurality of correction parameters that correspond to combinations of the information on respective ejection amounts for the respective plural colors of ink and are retained in a memory, according to a combination of the acquired information on respective ejection amounts for the respective plural colors of ink, for each of the plurality of areas, wherein each of the plurality of correction parameters defines a correspondence relationship between a combination of the plurality of color components in the input data and a combination of a plurality of color components for the image data, and the correction parameter for each of the plurality of areas is used for correcting a color indicated by the input data and selected so that a difference of color appearance of colors between the plurality of areas, which is caused by a difference between light absorption characteristics of the ink dots that are formed on the print medium by overlapping a plurality of inks having different colors and light absorption characteristics of the ink dots each of which is formed on the print medium with an ink of single color, is reduced; and a generating unit configured to generate the image data based on the correction parameters selected by the selecting unit.

* * * * *